(12) United States Patent
MacLean-Blevins

(10) Patent No.: US 7,866,626 B1
(45) Date of Patent: Jan. 11, 2011

(54) HYDRAULICALLY CONTROLLED IN-LINE VALVE APPARATUS

(76) Inventor: Mark MacLean-Blevins, 679 Arbor Dr., Westminster, MD (US) 21158

(*) Notice: Subject to any disclaimer, the term of this patent is extended or adjusted under 35 U.S.C. 154(b) by 401 days.

(21) Appl. No.: 11/680,904

(22) Filed: Mar. 1, 2007

Related U.S. Application Data

(63) Continuation-in-part of application No. 11/432,517, filed on May 12, 2006.

(60) Provisional application No. 60/777,535, filed on Mar. 1, 2006.

(51) Int. Cl.
F16K 31/00 (2006.01)

(52) U.S. Cl. .......... 251/61; 239/353; 239/407; 239/415; 239/570; 137/522; 137/843

(58) Field of Classification Search .......... 137/614.7, 137/516.13, 489.5, 614.2, 485, 488, 522, 137/843, 844, 846; 239/310, 318, 353, 354, 239/407, 413–415, 416.2, 416.3, 570, 574, 239/581.1; 251/61
See application file for complete search history.

(56) References Cited

U.S. PATENT DOCUMENTS

| 260,829 | A | 7/1882 | Bradley |
|---|---|---|---|
| 372,503 | A | 11/1887 | Wheeler |
| 2,719,704 | A | 10/1955 | Anderson et al. |
| 2,770,501 | A | 11/1956 | Coanda |
| 2,780,232 | A | 2/1957 | Ney |
| 2,788,244 | A | 4/1957 | Gilmour |
| 2,988,139 | A | 6/1961 | Coanda |
| 3,255,972 | A | 6/1966 | Hultgren et al. |
| 3,381,899 | A | 5/1968 | Forsman |
| 3,561,680 | A | 2/1971 | Ott |
| 3,572,375 | A * | 3/1971 | Rosenberg ............... 137/512 |
| 3,666,150 | A | 5/1972 | Liljeholm |
| 3,763,888 | A | 10/1973 | Duecker |
| 3,770,205 | A | 11/1973 | Procter et al. |
| 3,863,843 | A | 2/1975 | Hechler, IV |
| 3,929,150 | A | 12/1975 | Flinner et al. |
| 3,940,069 | A | 2/1976 | Gunzel, Jr. et al. |
| RE29,405 | E | 9/1977 | Gunzel, Jr. et al. |
| 4,047,541 | A | 9/1977 | Mercier et al. |
| 4,105,044 | A | 8/1978 | Davitt |
| 4,142,545 | A | 3/1979 | Billigmeier |

(Continued)

OTHER PUBLICATIONS

"Miracle-Gro Liqua Feed".

Primary Examiner—Len Tran
Assistant Examiner—Jason J Boeckmann
(74) Attorney, Agent, or Firm—Rosenberg, Klein & Lee

(57) ABSTRACT

An apparatus for failsafe control of liquid material passage through a line is provided. The apparatus includes a dispensing control unit for coupling to the line, which includes a housing having an inlet, an outlet, and a conduction port extending therebetween for selectively passing the liquid material received from the line therethrough. A control port is disposed in the housing to direct a flow path of at least a portion of a pressurized fluid stream received thereby. A response valve portion also disposed in the housing is reconfigurable between first and second states responsive to the pressurized fluid stream directed thereto, such that in the first state it seals the conduction port against passage of the liquid material, and in the second state opens the conduction port for passage of the liquid material. The response valve portion is resiliently biased to the first state.

19 Claims, 76 Drawing Sheets

U.S. PATENT DOCUMENTS

| | | | |
|---|---|---|---|
| 4,142,681 A | 3/1979 | Hechler, IV | |
| 4,154,258 A | 5/1979 | Duda et al. | |
| 4,176,680 A * | 12/1979 | de Launay | 137/496 |
| 4,197,872 A | 4/1980 | Parker | |
| 4,244,494 A | 1/1981 | Colgate et al. | |
| 4,369,921 A | 1/1983 | Beiswenger et al. | |
| 4,446,887 A | 5/1984 | Redmon et al. | |
| 4,475,689 A | 10/1984 | Hauger et al. | |
| 4,508,272 A | 4/1985 | Thompson | |
| 4,527,740 A | 7/1985 | Gunzel, Jr. et al. | |
| 4,736,891 A | 4/1988 | Chow et al. | |
| 4,750,674 A | 6/1988 | Chow et al. | |
| 4,775,241 A | 10/1988 | Stuckey | |
| 4,811,900 A | 3/1989 | LaRosa et al. | |
| 4,826,085 A | 5/1989 | Chow et al. | |
| 4,827,974 A * | 5/1989 | Coulter | 137/549 |
| 4,883,086 A | 11/1989 | Lejnar | |
| 4,901,923 A | 2/1990 | McRoskey et al. | |
| 4,971,105 A | 11/1990 | McGuire | |
| 5,007,588 A | 4/1991 | Chow et al. | |
| 5,039,016 A | 8/1991 | Gunzel, Jr. et al. | |
| 5,085,039 A | 2/1992 | Shekleton | |
| 5,100,059 A | 3/1992 | Englhard et al. | |
| 5,129,730 A | 7/1992 | Someah et al. | |
| 5,213,129 A | 5/1993 | Someah et al. | |
| 5,213,265 A | 5/1993 | Englhard et al. | |
| 5,293,946 A | 3/1994 | Besson et al. | |
| 5,303,853 A | 4/1994 | Nye | |
| 5,320,288 A | 6/1994 | Ketcham, Jr. | |
| 5,372,310 A | 12/1994 | Ketcham | |
| 5,375,769 A | 12/1994 | Schultz | |
| 5,383,603 A | 1/1995 | Englhard et al. | |
| 5,388,767 A | 2/1995 | Moses | |
| 5,533,546 A | 7/1996 | Dixon | |
| 5,799,688 A | 9/1998 | Yie | |
| 5,799,831 A | 9/1998 | Spriggs et al. | |
| 5,881,955 A | 3/1999 | Styne | |
| 5,996,700 A | 12/1999 | Sulmone | |
| 6,012,650 A | 1/2000 | Hadar | |
| 6,283,385 B1 | 9/2001 | Beaver et al. | |
| 6,345,773 B1 | 2/2002 | Shanklin et al. | |
| 6,378,785 B1 | 4/2002 | Dodd | |
| 6,425,534 B2 | 7/2002 | Ketchard et al. | |
| 6,471,141 B2 | 10/2002 | Smith et al. | |
| 6,578,776 B1 | 6/2003 | Shanklin et al. | |
| 6,681,418 B1 * | 1/2004 | Bierend et al. | 4/661 |
| 6,772,966 B2 | 8/2004 | Foster et al. | |
| 2002/0189694 A1 * | 12/2002 | Katayama et al. | 137/846 |

* cited by examiner

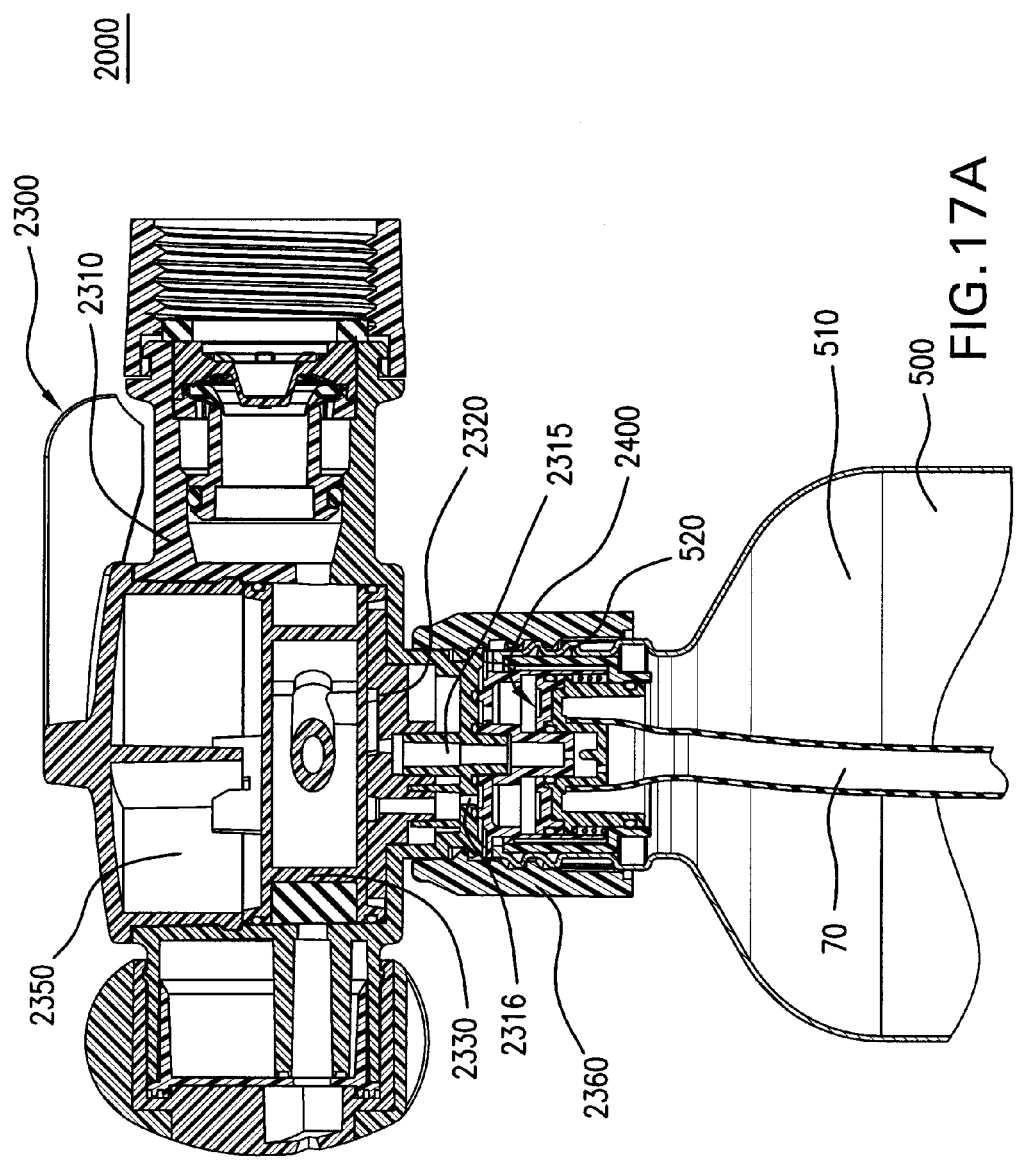

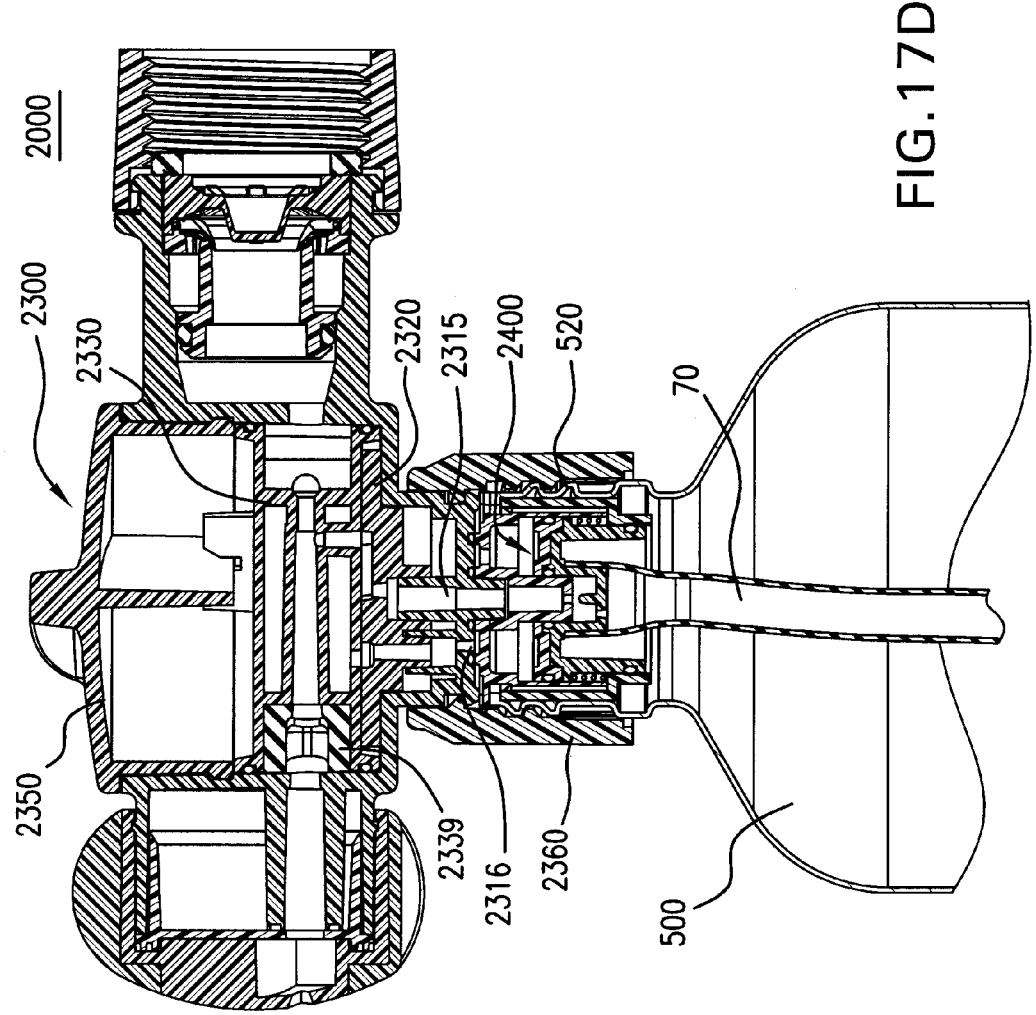

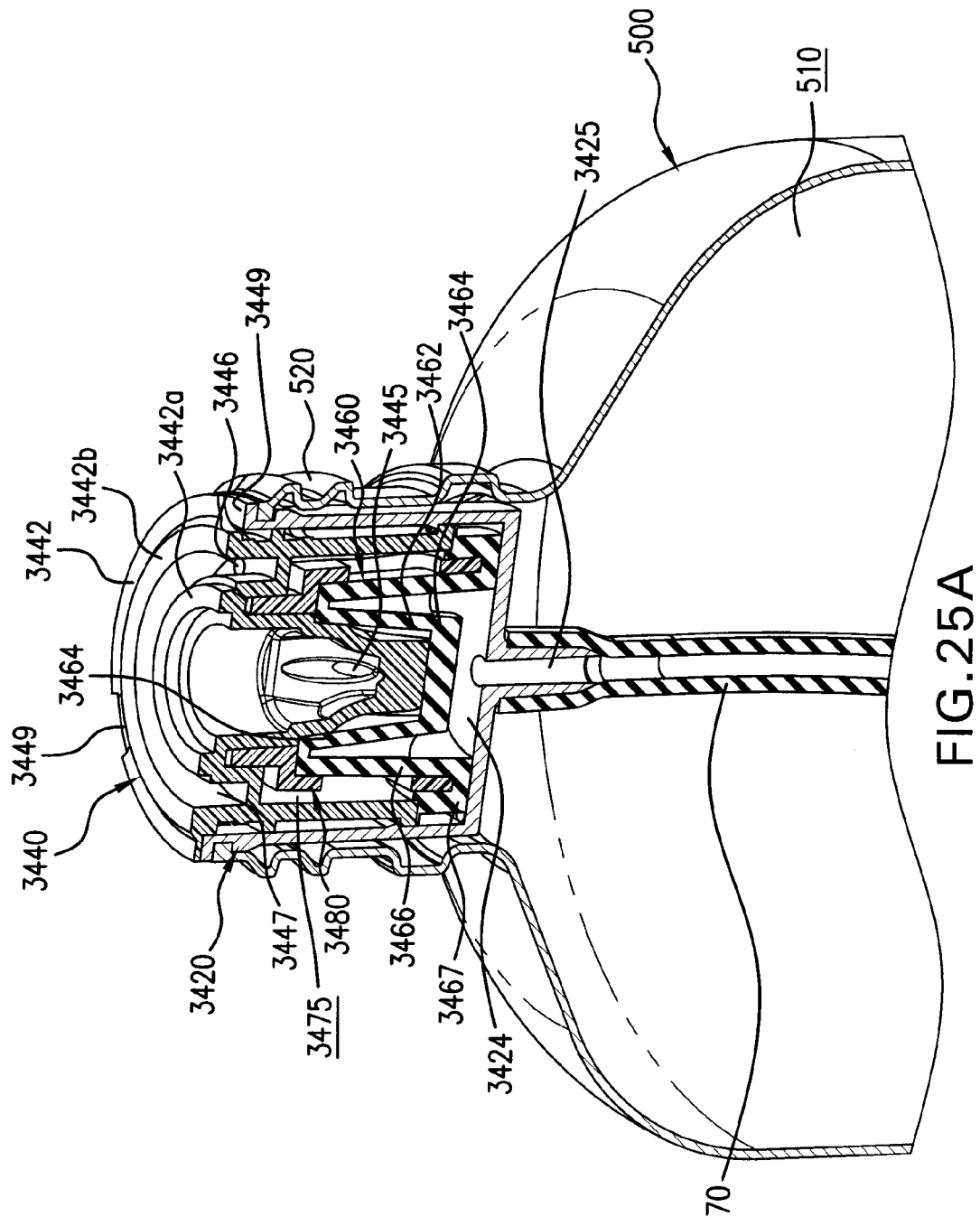

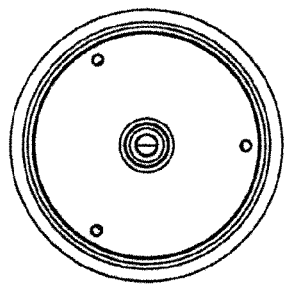
FIG. 28-A1
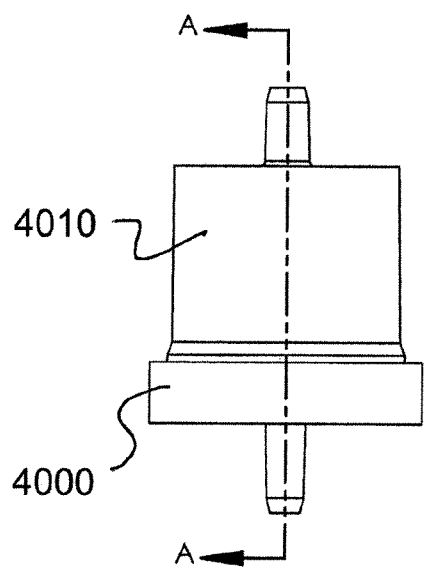
FIG. 28-A
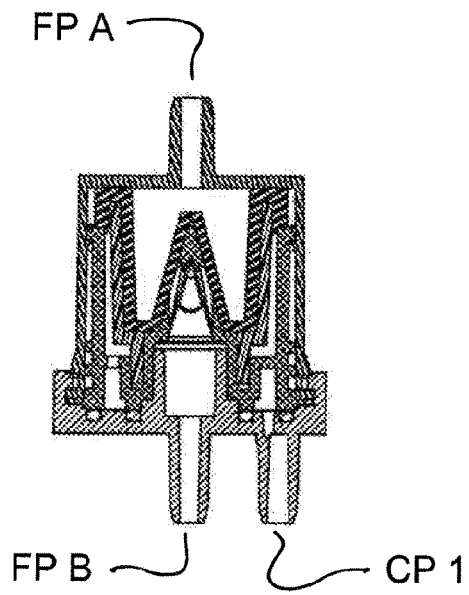
FIG. 28-AA
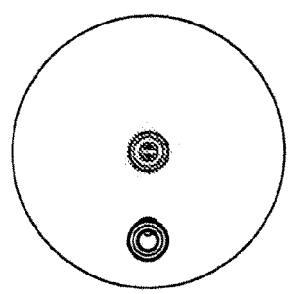
FIG. 28-A2

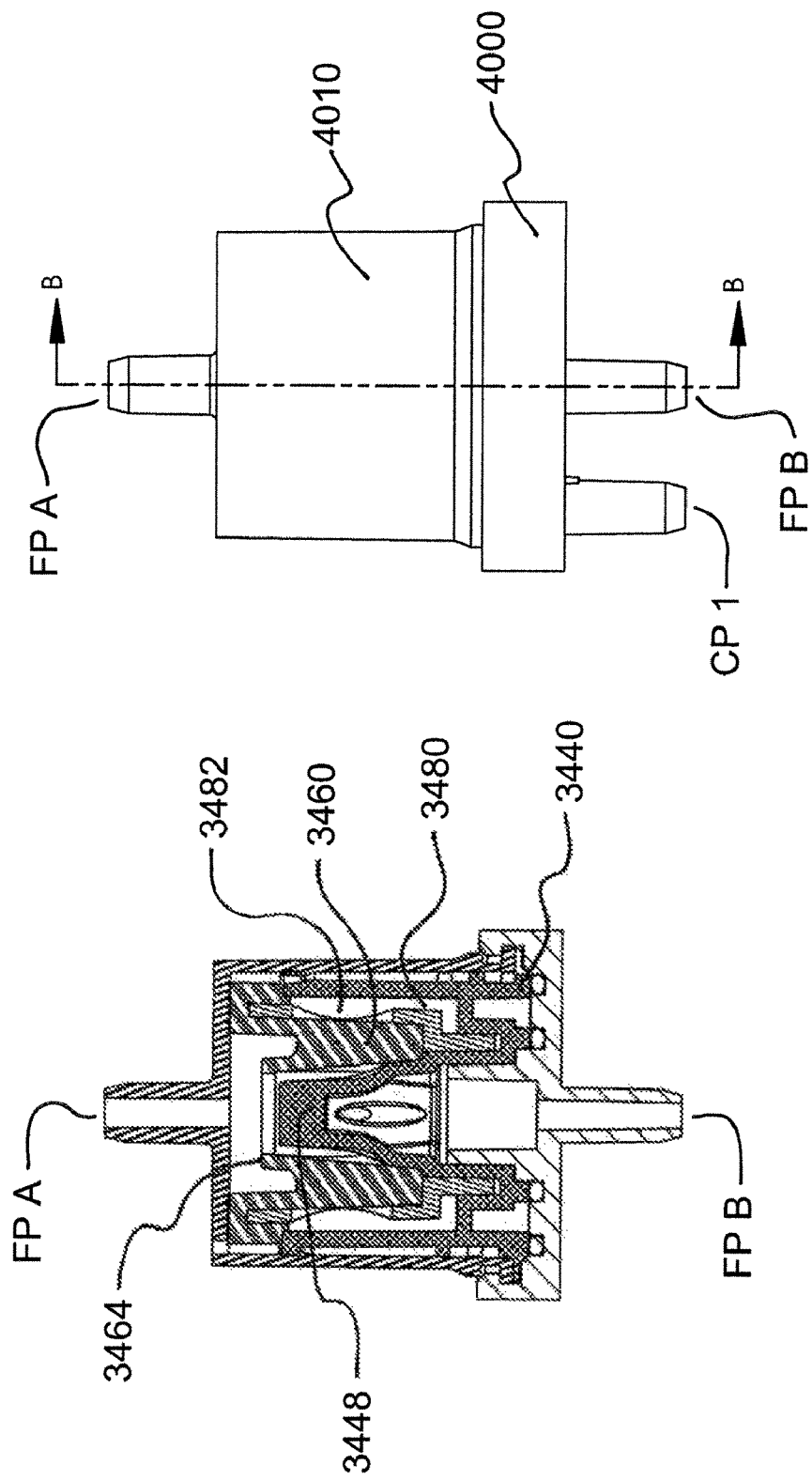

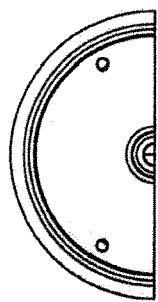
FIG. 29-A1
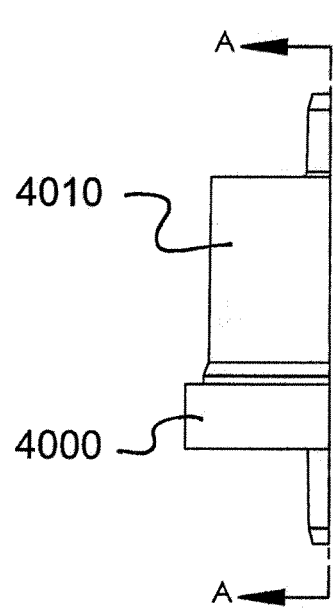
FIG. 29A
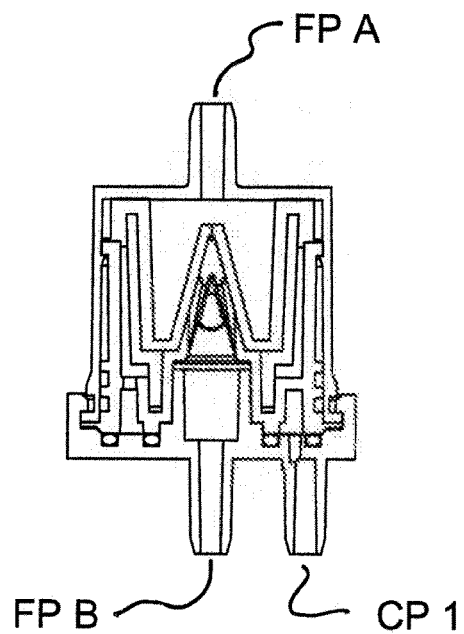
FIG. 29-AA
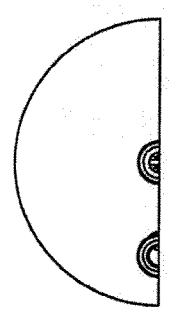
FIG. 29-A2

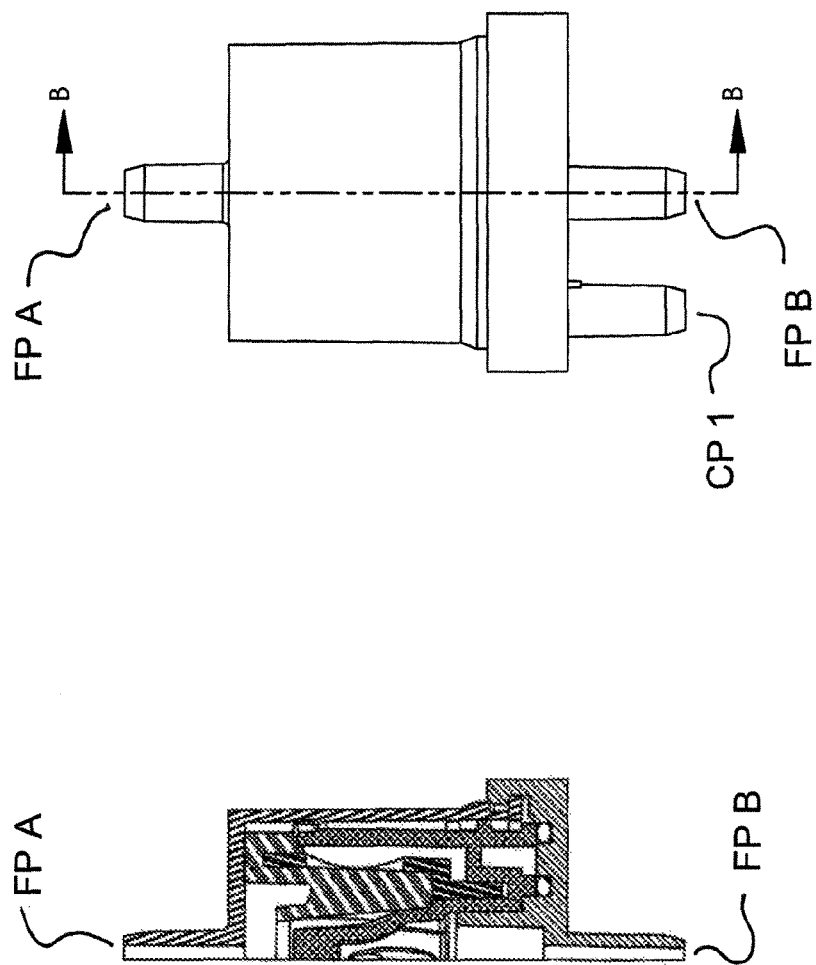
FIG. 29B
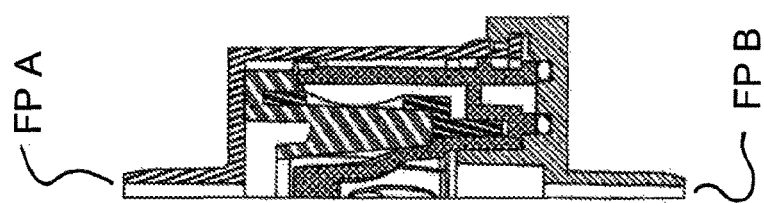
FIG. 29-BB

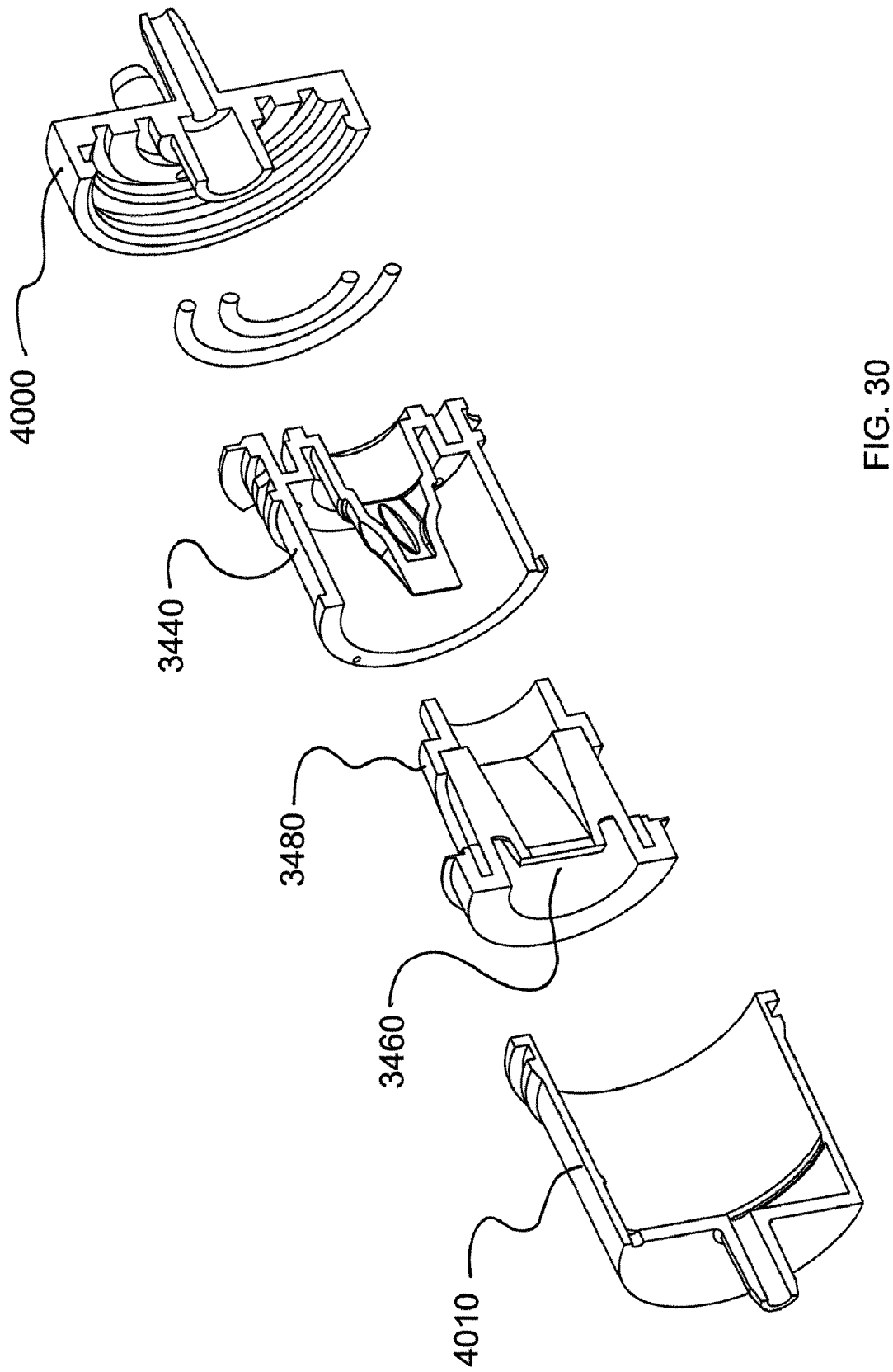

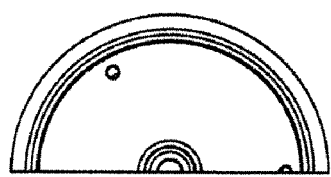
FIG. 30-A1
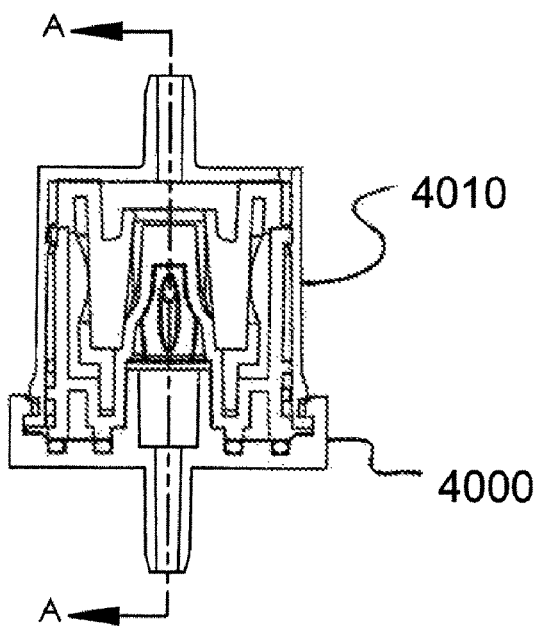
FIG. 30A
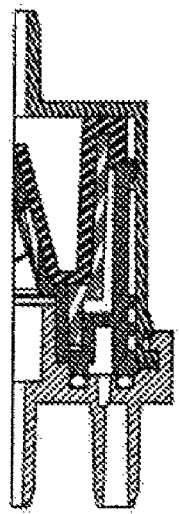
FIG. 30-AA
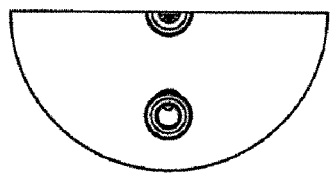
FIG. 30-A2

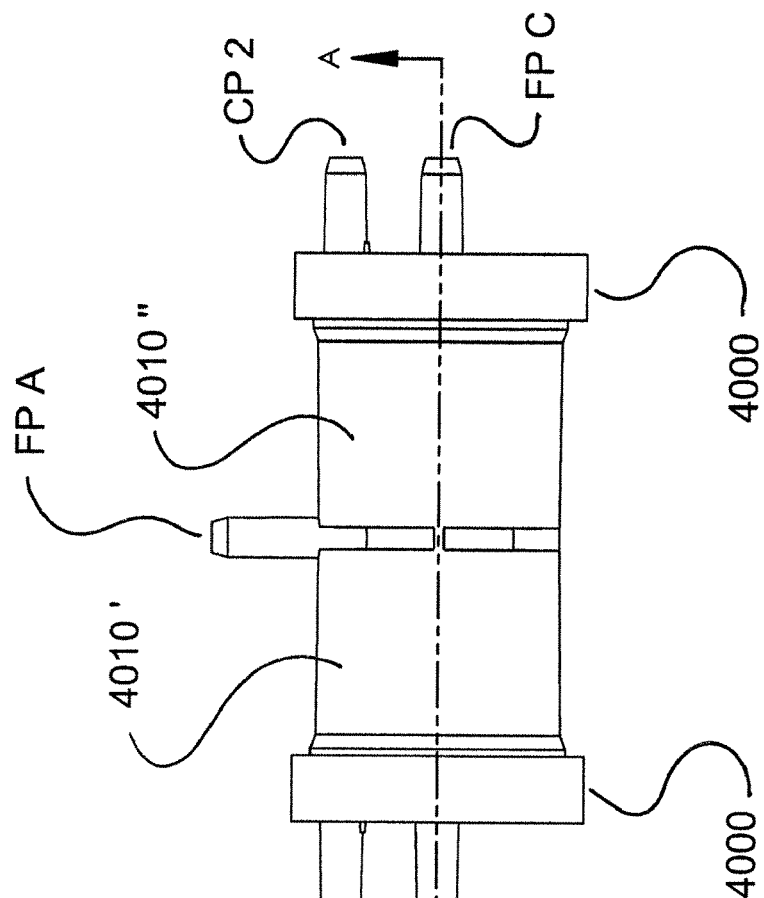
FIG. 31A
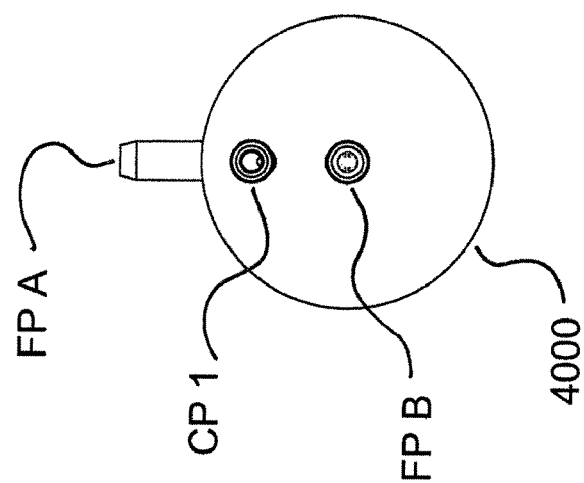
FIG. 31-A1

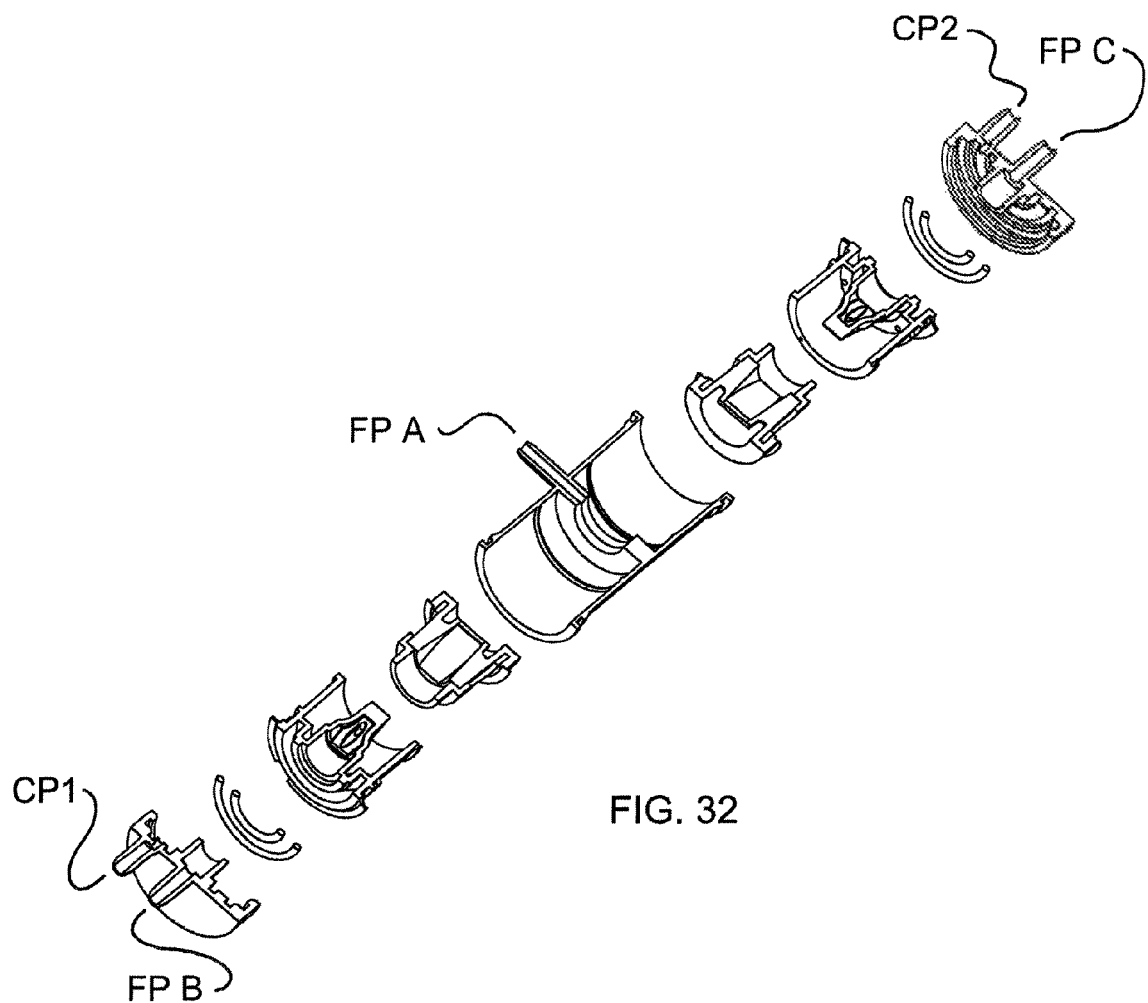
FIG. 32
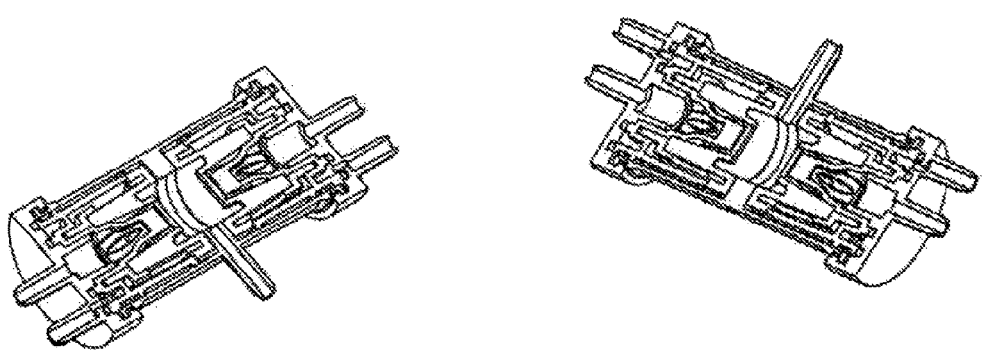
FIG. 32C
FIG. 32D

FIG. 32-A2
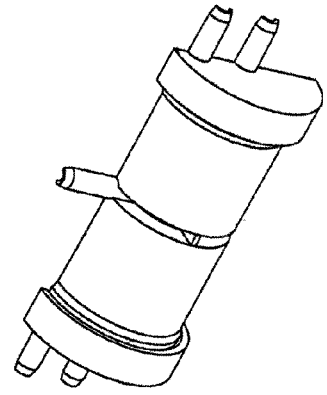
FIG. 32F
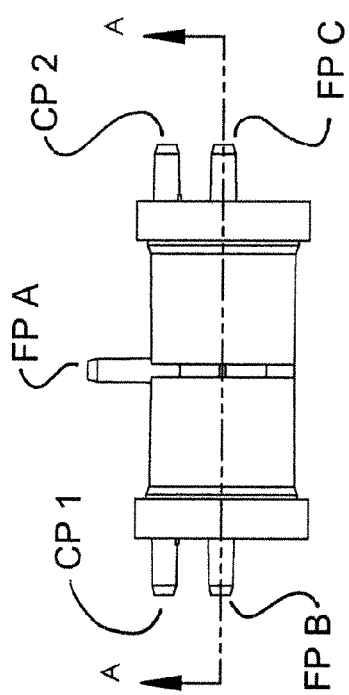
FIG. 32A
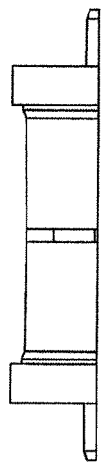
FIG. 32E
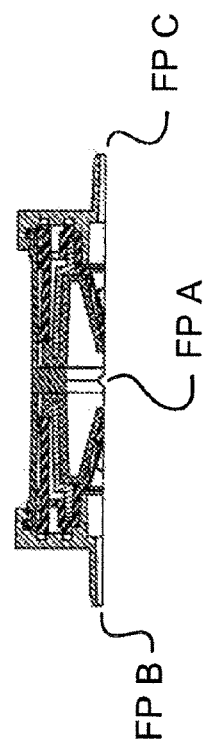
FIG. 32-AA
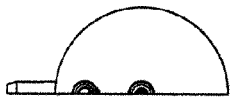
FIG. 32-A1

FIG. 32-BB

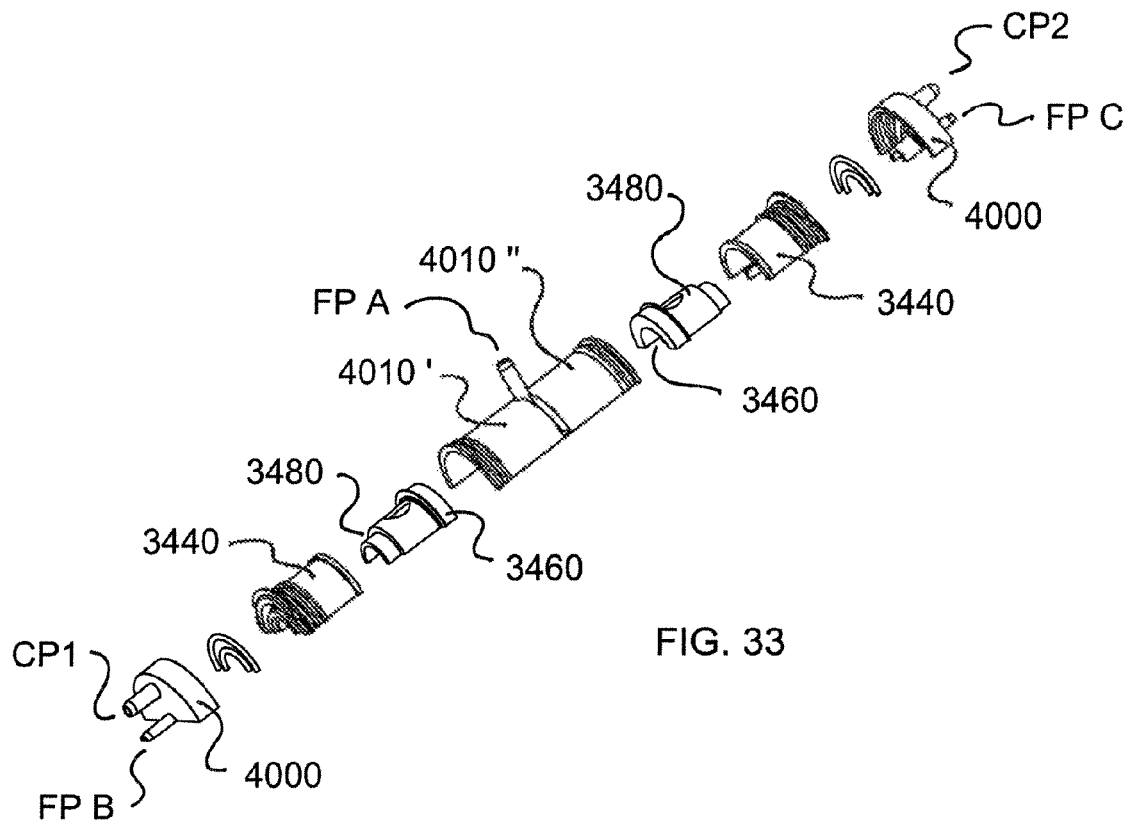
FIG. 33
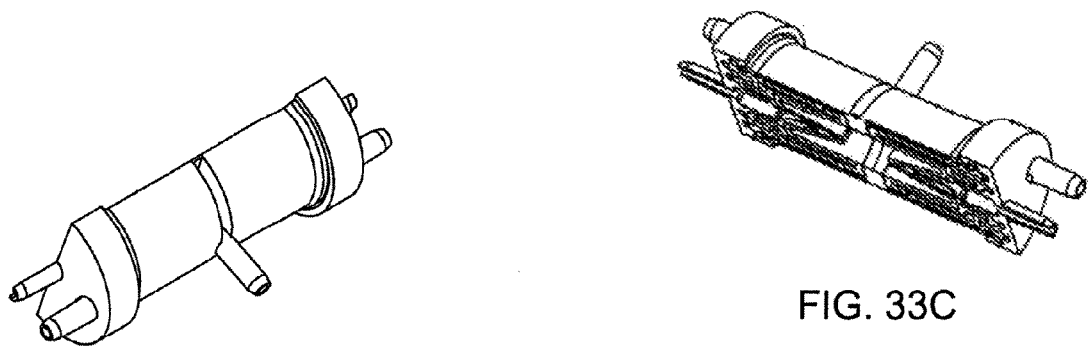
FIG. 33D
FIG. 33C
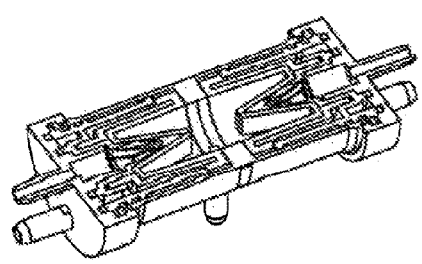
FIG. 33E

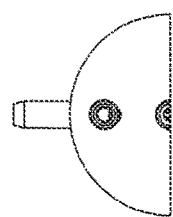
FIG. 33-A2
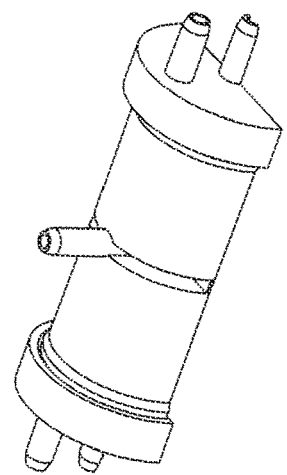
FIG. 33G
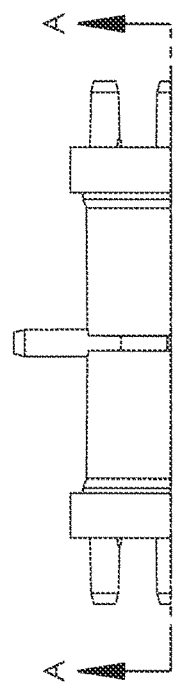
FIG. 33A
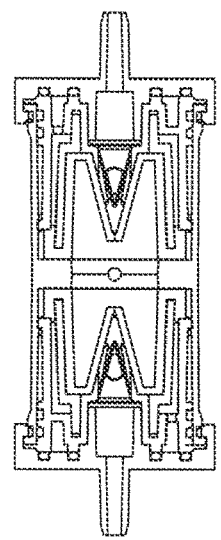
FIG. 33F
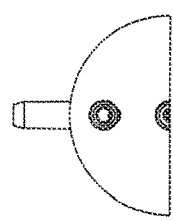
FIG. 33-A1

FIG. 33-BB

HYDRAULICALLY CONTROLLED IN-LINE VALVE APPARATUS

RELATED APPLICATION DATA

This Application is based on Provisional Application No. 60/777,535 filed 1 Mar. 2006, and is a Continuation-in-Part of application Ser. No. 11/432,517 filed 12 May 2006, pending.

BACKGROUND OF THE INVENTION

1. Field of the Invention

The present invention is generally directed to the controlled dispensing of liquid materials. More specifically, it is directed to the failsafe control of such dispensing, reliably guarding against the inadvertent or unauthorized release of such liquid materials as potentially hazardous chemical compositions from containment, except when appropriate. The present invention is directed, moreover, to a system and method by which dispensing is effected in a manner responsive to a suitable pressurized stream of fluid.

Dispensing control devices of the type used with a pressurized stream of fluid, such as water provided through a conventional garden hose or other delivery means, are widely used in many applications. One example is a spray nozzle attachment for a garden hose which serves also as a dispensing assembly and capping means for a container of fertilizer, weed/pest control, or other highly concentrated lawn or garden treating chemical. Another example of the many applications is a sprayer attachment which controls the sprayed dispensing of liquid material from an air pump-type container.

Such dispensing control devices are typically activated to dispense the given material properly only when a pressurized stream of water or other appropriate fluid is provided. In situations where the pressurized fluid stream is not present, dispensing of the liquid material would invariably be inappropriate and all too often quite hazardous. On store shelves, for instance, containers of various liquid chemicals are displayed within easy reach of even small children. Despite the chemical materials' toxicity and noxious properties, the containers are often displayed in ready-to-use form, capped by nothing more than the dispensing control devices already placed on them.

The dispensing control devices are usually equipped with closure mechanisms and seals; however, they are prone to accidental or mischievous opening when knocked over, carelessly handled by a curious customer, or otherwise tampered with. The closures and seals of the type heretofore known may be defeated in this manner, whereupon potentially hazardous release of the contained chemical liquid may occur. Such a chemical spill is hazardous to the child as well as to other persons and animals in the area, including those who must clean up such a toxic spill. The resultant risk of serious, even fatal, injury due to poisoning, chemical burn, toxic inhalation, and the like potentially occurring in that event is self-evident.

There exists, therefore, a need for an approach to dispensing a liquid material which cannot be readily defeated by tampering or other disturbance. There exists a need, moreover, for a system and method of controlled dispensing which safely guards against the inadvertent or unauthorized release of the given liquid material until and unless the conditions for its safe release and use are actually present.

2. Prior Art

Closure devices for liquid product containers are known in the art, as are devices for controlling the dispensing of liquid products from containment. The best prior art known to Applicant include: U.S. Pat. Nos. 3,863,843; 4,244,494; 5,996,700; 4,971,105; 4,527,740; 5,007,588; 4,811,900; 4,508,272; 4,901,923; 5,375,769; 6,471,141; 6,435,773; 5,388,767; 4,142,681; 6,012,650; 5,533,546; 5,881,955; 3,940,069; 3,929,150; 3,763,888; 3,561,680; 4,176,680; 4,883,086; 4,105,044; 4,142,545; 4,154,258; 4,197,872; 4,775,241; 5,799,688; 4,047,541; 5,039,016; 5,100,059; 5,213,265; 5,320,288; 5,372,310; 5,383,603; 6,283,385; 6,378,785; 6,578,776; 4,826,085; 5,303,853; 3,666,150; 5,213,129; 5,129,730; 2,770,501; 5,293,946; 5,085,039; 2,988,139; 4,971,105; 3,863,843; 372,503; and, No. RE29,405. Such devices fail to provide the unique combination of features and advantages for failsafe closure and controlled dispensing of liquid materials to the degree provided by the present invention.

Numerous concentrated liquid products are now manufactured and sold in a retail environment in ready-to-use packaged containers (including bottles). Many are capped with sprayer type dispensing mechanisms configured for attachment to the end of a hose. Such sprayer type mechanisms serve to dilute the concentrated liquid product as it is dispensed, by an appropriate mixture ratio with the pressurized stream of water emerging from the hose. They serve also to expel the diluted mixture for appropriate application. Examples of uses widely found for this type of storage and dispensing of liquid products include lawn or garden care and weed/pest control, automobile cleaning, structural siding material cleaning, and so on.

A notable problem plaguing mechanisms of this type derive from the fact that they function as the ultimate closure for the concentrated chemical liquid product's container. Most of the currently available sprayer devices provide for some degree of chemical containment in that they offer an "off" setting, whereby the container is sealed for shipping and storage. Some mechanisms provide additional safety measures—like hydrophobic venting means to allow "breathing" of the container contents and thereby prevent the generation or build up of noxious vapors while stored. Others incorporate protective measures such as child-proof locking structures.

Still, the mechanisms heretofore known in the art fail to provide adequate safeguards against mechanical defeat and manipulation inappropriately away from its "off" setting. Nor do they adequately ensure failsafe re-sealing of the container following initial use of its product.

Hence, there remains a need for a controlled dispensing approach whereby dispensing is ultimately enabled independent of any mechanical means externally accessible to user manipulation. There remains a need for such controlled dispensing approach which actuates automatically, to control dispensing in a certain condition-responsive manner.

SUMMARY OF THE INVENTION

It is a primary object of the present invention to provide a system and method for controlled dispensing of a liquid material which cannot be readily defeated by tampering or other disturbance.

It is another object of the present invention to provide a system and method which permits the liquid material to be dispensed only at the time of actual intended use.

It is another object of the present invention to provide a system and method for controlled dispensing of the liquid material in a manner responsive to a suitably pressurized stream of fluid directed thereto.

These and other objects are attained by the present invention in a system for failsafe controlled dispensing of a predetermined liquid material from a source container. The system generally comprises a housing for receiving a pressurized fluid stream and a selectively operable valve assembly disposed in a flow path defined therein. The housing includes an inlet, an outlet, and an intermediate portion extending therebetween, which is formed with an admission port for admitting the predetermined liquid material. The valve assembly is disposed between the housing's inlet and outlet, and may be selectively operated to alternatively open and close access of the predetermined liquid material into the housing. The valve assembly is operably actuated responsive at least in part to the pressurized fluid stream in the flow path, whereby admission of the predetermined liquid material into said housing is keyed by introduction of the pressurized fluid stream into the flow path.

In accordance with one aspect of the present invention, various embodiments incorporate a method for selectively containing and dispensing a predetermined liquid material in failsafe manner which generally comprises among its combination of steps that of establishing a first source containing the predetermined liquid material and establishing a second source of a pressurized fluid stream. The method also includes the steps of attaching a housing to the first and second sources for receiving the pressurized fluid stream and controlling responsive thereto release of the predetermined liquid material from the first source. The housing defines an admission port for selectively admitting the predetermined liquid material therethrough, as well as a flow path for the pressurized fluid stream. The method further includes the step of selectively operating a valve assembly disposed in the housing's flow path, the valve assembly being selectively operated to alternatively open and close access of the predetermined liquid material into the housing. When the pressurized fluid stream is directed into the flow path, the valve assembly is operably actuated responsive at least in part to such pressurized fluid stream. Admission of the predetermined liquid material into the housing is thereby keyed by introduction of the pressurized fluid stream into the housing's flow path.

In certain embodiments, the valve assembly may be selectively enabled/disabled and set between active and inactive configurations. Full operable actuation of the valve assembly requires in those embodiments both enabling and setting to the active configuration. In some of those embodiments, the selective enabling of the valve assembly is automatically controlled responsive to the pressurized fluid stream directed into the housing. In others of those embodiments, the selective setting of the valve assembly to its active configuration is automatically controlled responsive to the pressurized fluid stream directed into the housing.

In certain other embodiments, an in-line apparatus for failsafe control of liquid material passage through a line is provided. The apparatus includes a dispensing control unit for coupling to the line, which includes a housing having an inlet, an outlet, and a conduction port extending therebetween for selectively passing the liquid material received from the line therethrough. The control unit further includes a control port disposed in said housing to direct a flow path of at least a portion of a pressurized fluid stream received thereby, and a response valve portion also disposed in the housing. The response valve portion is reconfigurable between first and second states responsive to the pressurized fluid stream selectively directed thereto, such that in the first state it seals the conduction port against passage of the liquid material, and in the second state opens the conduction port for passage of the liquid material. The response valve portion is resiliently biased to the first state, whereby release of the liquid material therethrough is prevented in the absence of suitable fluid pressure actuation.

BRIEF DESCRIPTION OF THE DRAWINGS

FIG. 17A is a sectioned elevational view, partially cut away, of the embodiment illustrated in FIG. 16A in the "OFF" configuration, with an incoming flow of pressurized fluid;

FIG. 17D is a sectioned elevational view, partially cut away, of the embodiment illustrated in FIG. 16A in the "MIX" configuration, with an incoming flow of pressurized fluid;

FIG. 25A is a perspective sectional view of the portion of the embodiment shown in FIG. 24, taken along a first sectional plane offset from center;

FIG. 28A is a front elevational view of the embodiment shown in FIG. 28, fully assembled;

FIGS. 28-A1 and 28-A2 are respectively top and bottom plan views of the assembled embodiment shown in FIG. 28A;

FIG. 28-AA is a sectional view of the embodiment shown in FIG. 28A;

FIG. 28B is a side elevational view of the embodiment shown in FIG. 28A;

FIG. 28-BB is a sectional view taken through the embodiment as shown in FIG. 28B;

FIGS. 29A, 29-A1, 29-A2, and 29-AA are cut away versions corresponding to the views shown in FIGS. 28A, 28-A1, 28-A2, and 28-AA;

FIGS. 29B and 29-BB are partially cut away versions corresponding to the views shown in FIGS. 28B and 28-BB;

FIG. 30 is an exploded perspective view of the embodiment shown in FIG. 28, partially cut away along a vertical axial plane;

FIGS. 30A, 30-A1, 30-A2, and 30-AA are cut away versions corresponding to the views shown in FIGS. 28A, 28-A1, 28-A2, and 28-AA;

FIG. 31A is a front elevational view of the embodiment shown in FIG. 31, fully assembled;

FIG. 31-A1 is a side elevational view of the embodiment as shown in FIG. 31A;

FIG. 31-AA is a sectional view taken through the assembled embodiment shown in FIG. 31A;

FIG. 31-BB is a sectional view taken through the embodiment as shown in FIG. 31B;

FIG. 32 is an exploded perspective view of the embodiment shown in FIG. 31, partially cut away along a vertical axial plane;

FIG. 32A is a front elevational view of the cut away version of the embodiment shown in FIG. 31A;

FIGS. 32-A1, 32-A2 are respective side elevational views of the cut away assembled embodiment as shown in FIG. 32A;

FIGS. 32C and 32D are cut away perspective views taken from different perspectives of the embodiment shown in FIG. 31;

FIG. 32-AA is a sectional view of the cut away assembled embodiment as shown in FIG. 32A;

FIG. 32-BB is a sectional view taken corresponding to the cutaway assembled embodiment as shown in FIG. 32B;

FIG. 32E is a bottom plan view of the cutaway assembled embodiment as shown in FIG. 32A;

FIG. 32F is a perspective view of the cut away assembled embodiment as shown in FIG. 32A;

FIG. 33 is an exploded view of the embodiment shown in FIG. 31 partially cut away along a horizontal axial plane;

FIG. 33A is a front elevational view of the cut away version of the embodiment shown in FIG. 31A;

FIGS. 33-A1 and 33-A2 are respective side elevational views of the cut away assembled embodiment as shown in FIG. 33A;

FIG. 33-BB is a sectional view corresponding to the view shown in FIG. 33B;

FIGS. 33C, 33D, 33E, and 33G are perspective views, taken from different perspectives, of the assembled cut away embodiment as shown in FIG. 33A; and, FIG. 33F is another sectional view taken through the assembled cut away embodiment as shown in FIG. 33A.

DETAILED DESCRIPTION OF THE PREFERRED EMBODIMENTS

In overall operation, the failsafe dispensing system of the present invention serves the crucial function of controlling the safe release of potentially hazardous liquid materials from containment. It safeguards against the accidental or unauthorized release of the liquid material by operably coupling to the liquid material's source a valve assembly which cannot be fully actuated to permit the material's release without sufficient exposure to a suitably pressurized stream of fluid. In the absence of such pressurized fluid stream, the valve assembly remains un-actuated, preserving the closure of a container or other source from which the liquid material is to be dispensed. In accordance with the present invention, this closure cannot be readily defeated by manipulating or otherwise tampering with the valve assembly mechanically, by tipping the container, or by such other common means.

In many applications, a pressurized flow of water or other fluid is necessary in any event at the time of the liquid material's dispensing and use. In typical lawn and garden applications, for instance, the contained liquid material may be a highly concentrated fertilizer, insecticide, weed killer, or other such chemical formulation requiring a stream of water for dilution and/or transport. Release of the contained liquid material is then actuable only after the necessary preparations for the material's use, like attaching a garden hose or other conduit to deliver the pressurized fluid stream to the valve assembly, have actually been made. That is, dispensing of the liquid material is advantageously permitted only at the time of actual intended use.

Preferably, certain other measures are employed with the valve assembly for not only directing the pressurized fluid stream to and from the valve assembly effectively, but also for disabling the valve assembly from actuation, even when the pressurized fluid stream is present. This serves as an added safeguard which also enhances the degree of selectivity and control to the user. Such measures may be realized in the form of a simple locking mechanism upon the valve assembly, for example, or in various other forms as illustrated in following paragraphs.

Figure 11:
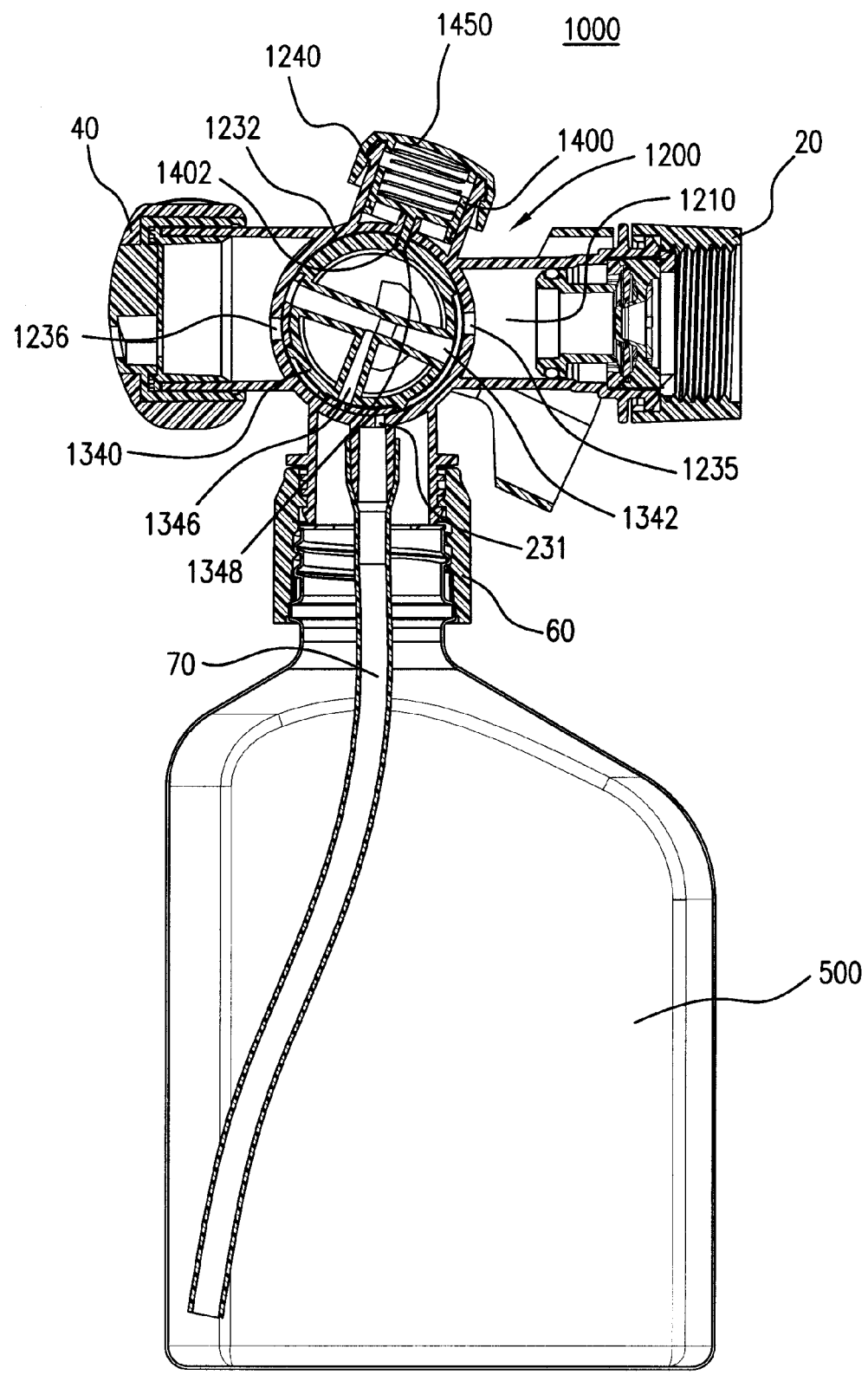
FIG. 11 is an elevational sectional view of the embodiment as shown in FIG. 8 attached to a liquid material container.

The source container for the liquid material (such as illustratively shown in FIGS. 8 and 11) may be of any suitable type known in the art. One common type is that of a portable dispensing jar which attaches to the system's housing to remain during use suspended therefrom, at the end of the hose. In certain other embodiments, the container may be formed to actually house the given valve assembly, the integrated valve assembly enjoying the added protection of the container against direct unwanted access.

Referring now to FIGS. 1-4, there is shown one exemplary embodiment of a failsafe dispensing system 100 for safe controlled dispensing of a liquid material from its container or other storage source. In the disclosed embodiment, the system is of the type which invokes an aspiration-based technique (exploiting a Venturi effect, a flow-by effect, a Coanda effect, or the like) to draw the liquid material from its container for mixing and delivery to the targeted organism or material. This is but one example of numerous embodiments in which the failsafe controlled dispensing system 100 may be realized in accordance with the present invention.

In the illustrative embodiment shown, system 100 is formed as a sprayer attachment of a type typically fitted to the end of a garden hose, which expels with the fluid stream supplied by the hose a liquid material drawn from an attached holding container. As such, system 100 generally comprises a housing 200 preferably having a hose coupling 20 and back-flow prevention device 80 connected at its inlet 210, and a spray nozzle 40 connected at its outlet 220. An intermediate portion 230 of the housing 200 is formed with a coupling structure 240 which surrounds and extends from an admission port 231. An adapter 60 is preferably provided at a neck portion of the coupling structure 240 to facilitate attachment of, for example, a bottle-like container supplying the given liquid material. During use, the liquid material is drawn through the admission port 231 and into the housing's intermediate portion 230 for mixture with the hose-supplied fluid stream.

Devices such as the back-flow prevention device and spray nozzle 40 are shown in the FIGS. for illustrative purposes only, as they are not important to the present invention. The structure and function of such devices are well known to those skilled in the art, are not further described herein. Moreover, in the interest of brevity and clarity, they are not necessarily shown in the FIGS. in precise configurational detail.

System 100 also includes a control valve mechanism 300 and a response valve mechanism 400, both disposed within the housing's intermediate portion 230. In the exemplary embodiment shown, the control valve 300 serves the general function of selectively directing a pressurized fluid stream received through the inlet 210 in accordance with one of numerous configurations. Preferably, the control valve 300 may be alternatively set at least to open, bypass, and closed configurations. Depending in part on the prevailing configuration of the control valve 300, and in part on the supply of a suitably pressurized flow of fluid (typically though not necessarily water in the embodiment shown) through the inlet 210, the response valve 400 is maintained in one of at least two operational configurations—namely, active and inactive configurations. The response valve 400 in either configuration conveys any fluid received from the control valve 300 on to the outlet 220 for expulsion, but only in the active configuration permits the liquid material to be admitted into the housing 200 for mixture and expulsion with that fluid.

Figure 1:
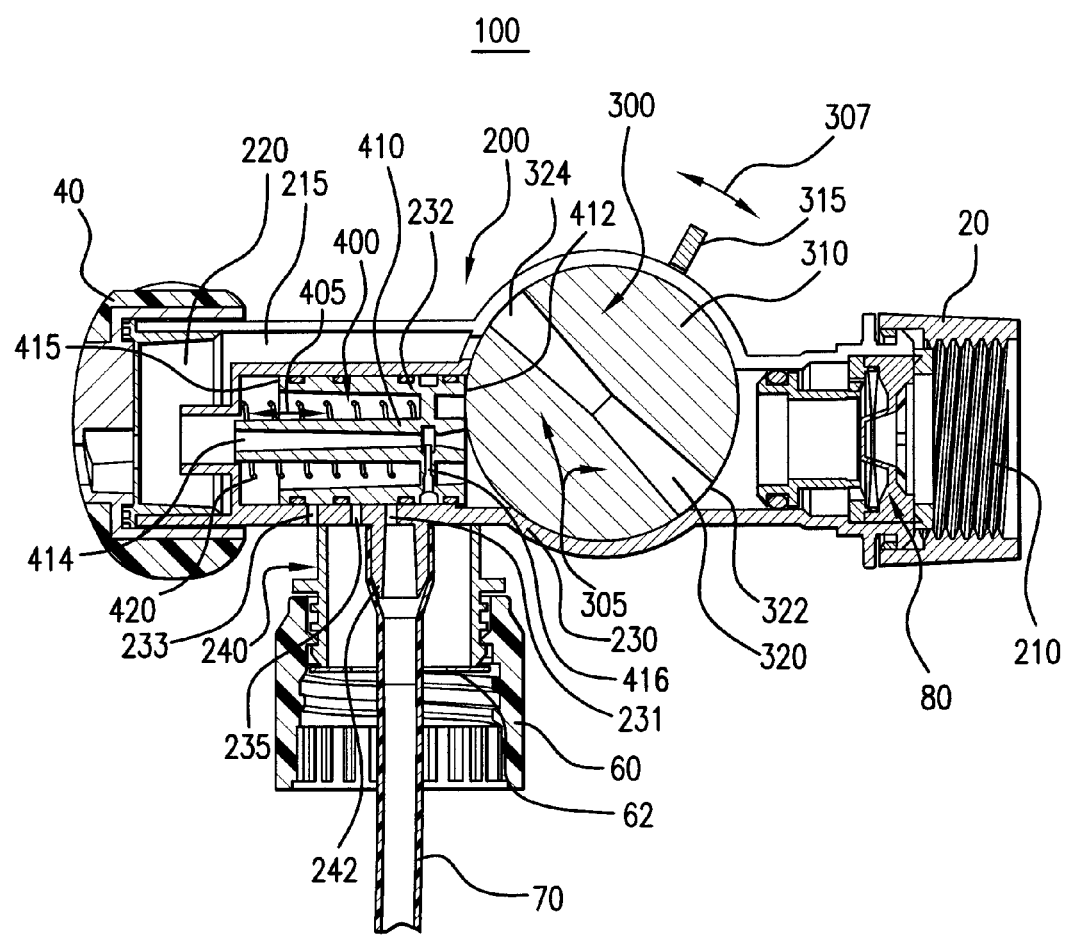
FIG. 1 is a sectional view of one embodiment of a system formed in accordance with the present invention, in an off configuration.
Figure 1A:
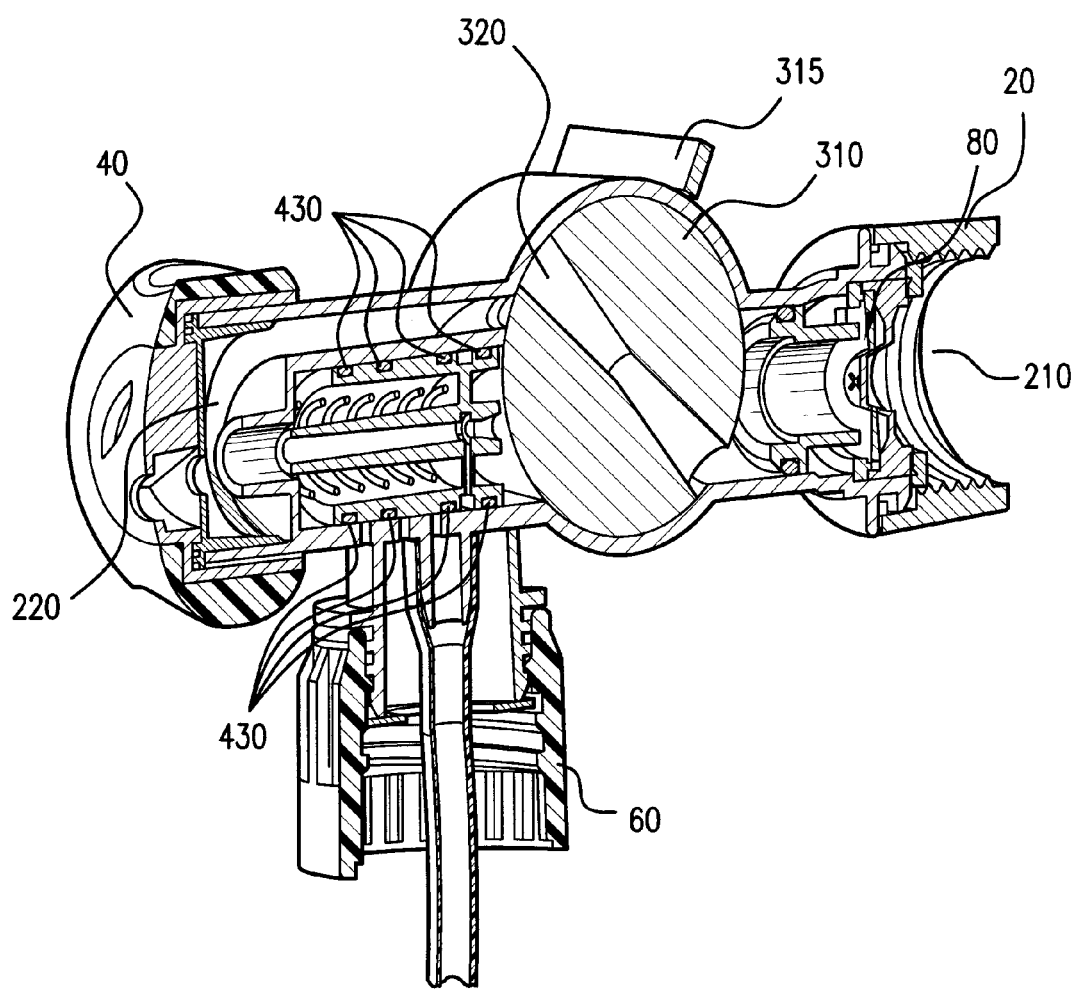
FIG. 1A is a front perspective sectional view corresponding to the embodiment as illustrated in FIG. 1.
Figure 2:
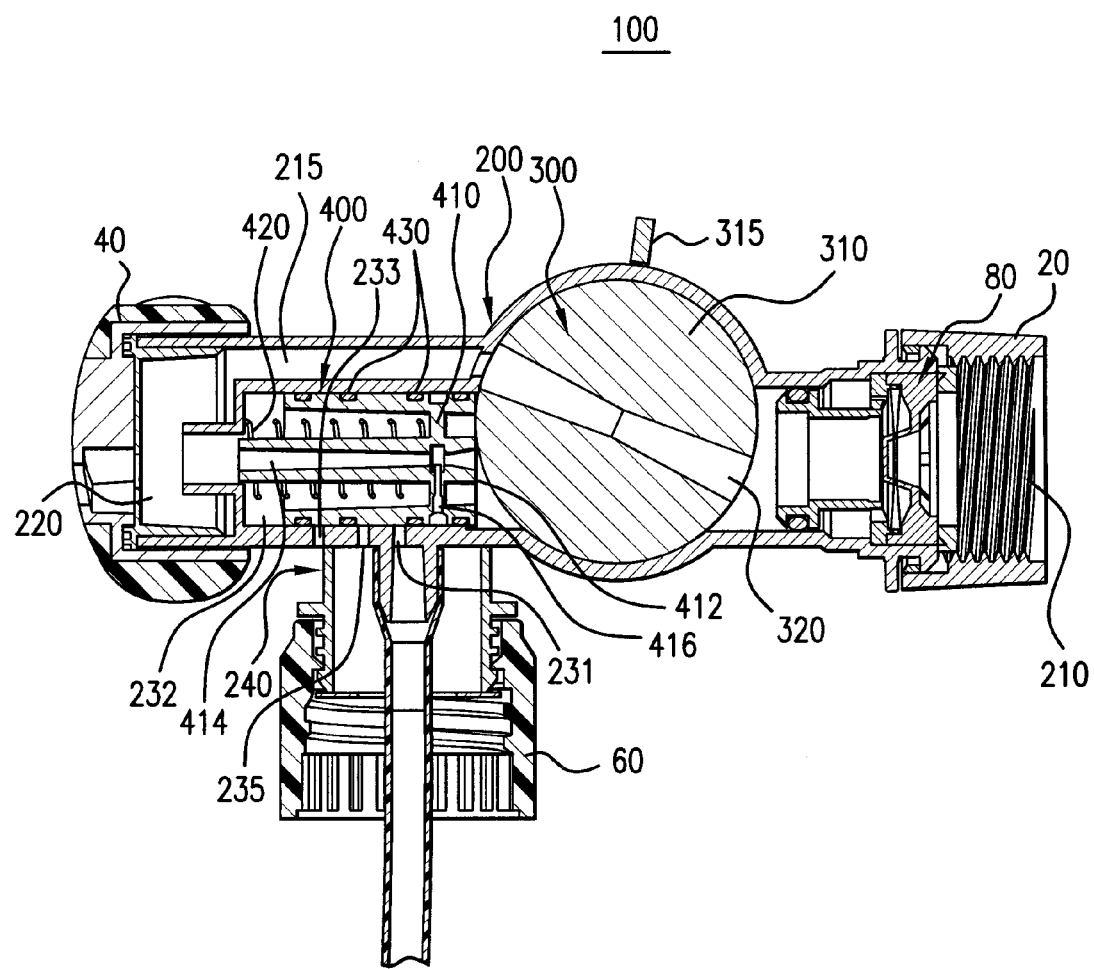
FIG. 2 is a sectional view of the embodiment shown in FIG. 1, in a bypass configuration.
Figure 2A:
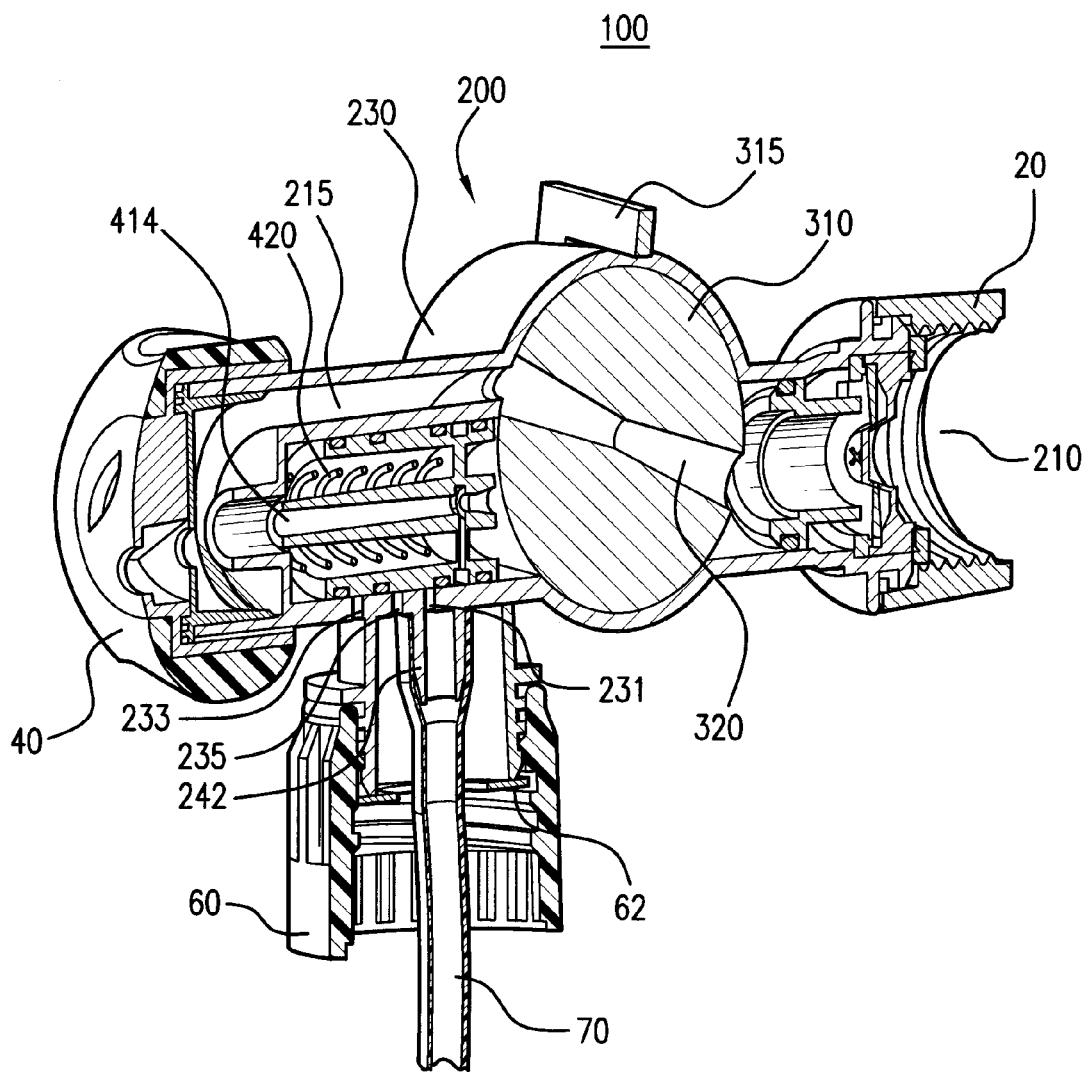
FIG. 2A is a front perspective sectional view corresponding to the embodiments as illustrated in FIG. 2.
Figure 3:
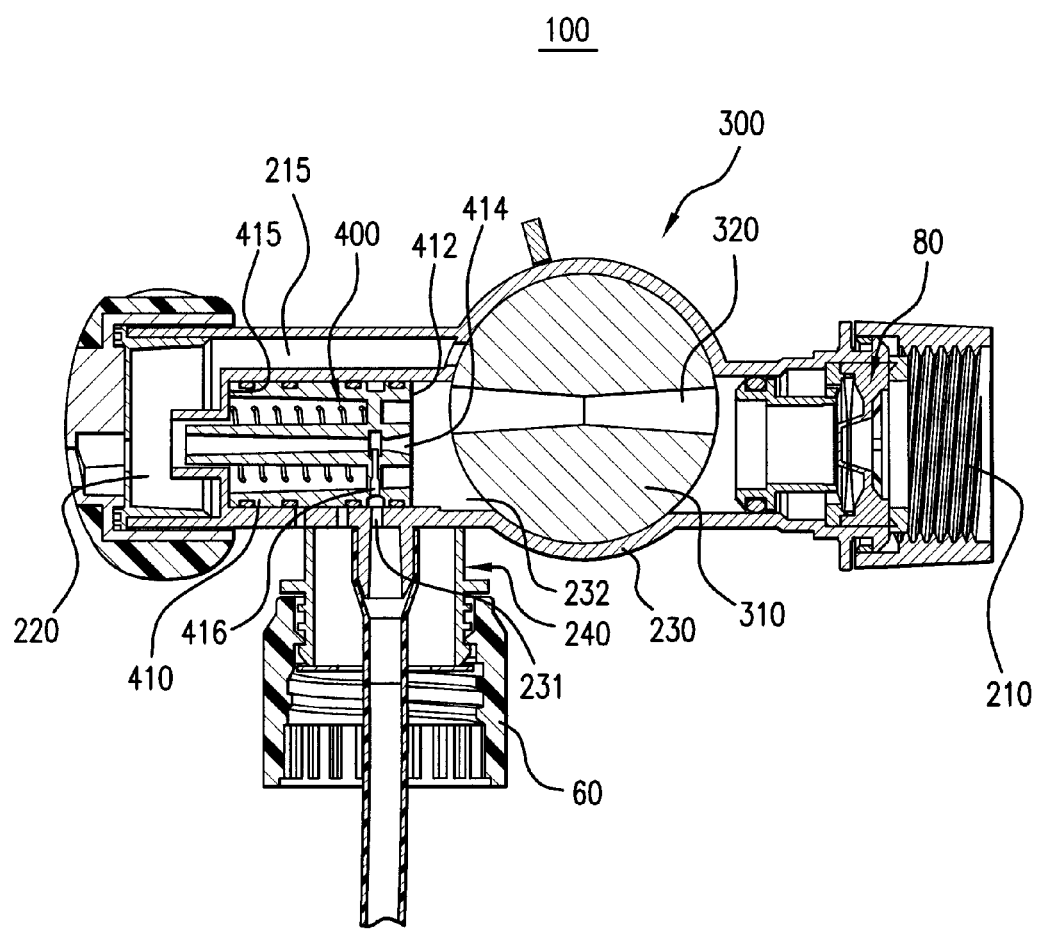
FIG. 3 is a sectional view of the embodiment show in FIG. 1, in an ON configuration.
Figure 3A:
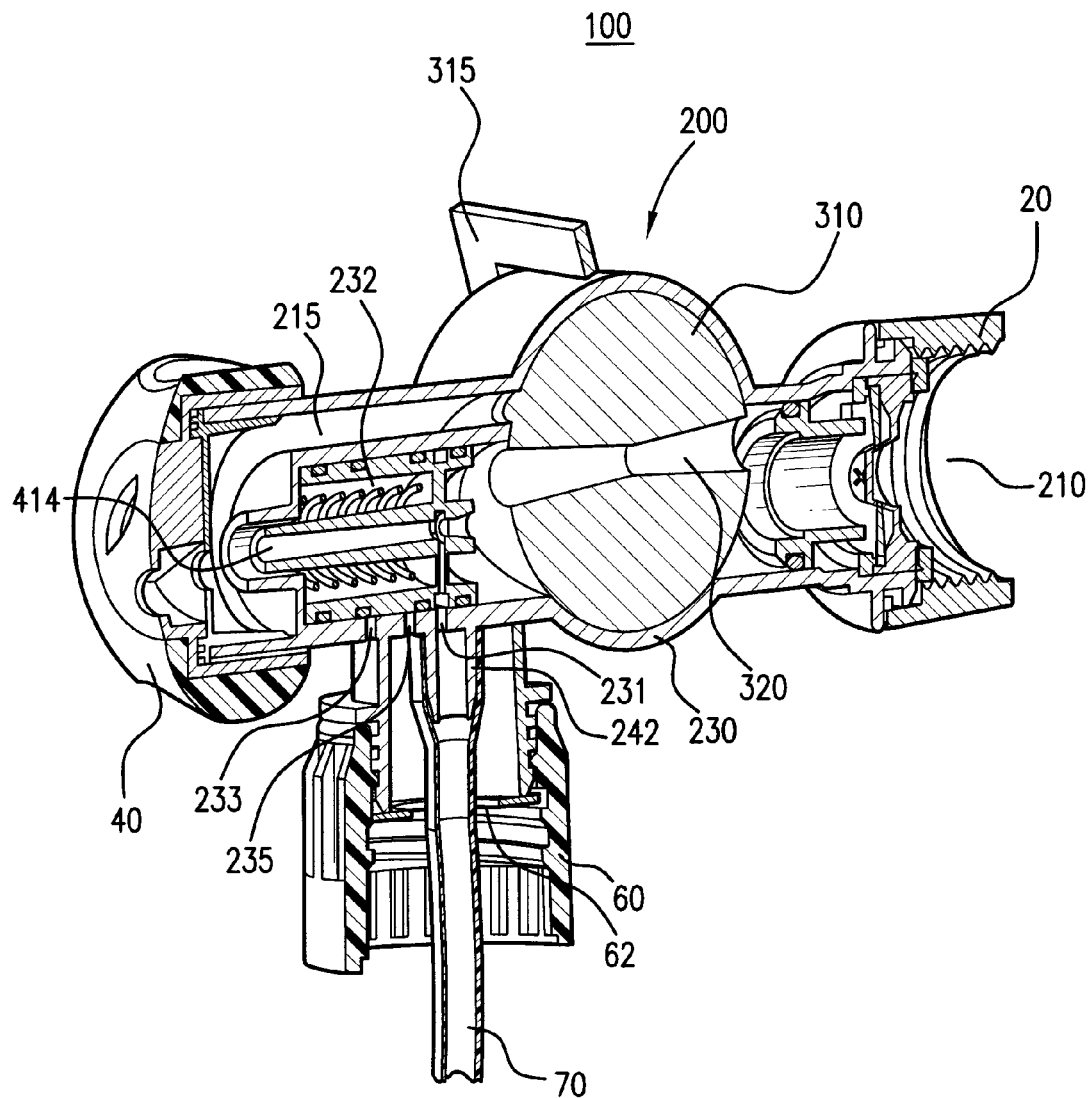
FIG. 3A is a front perspective sectional view corresponding to the embodiments as illustrated in FIG. 3.
Figure 4:
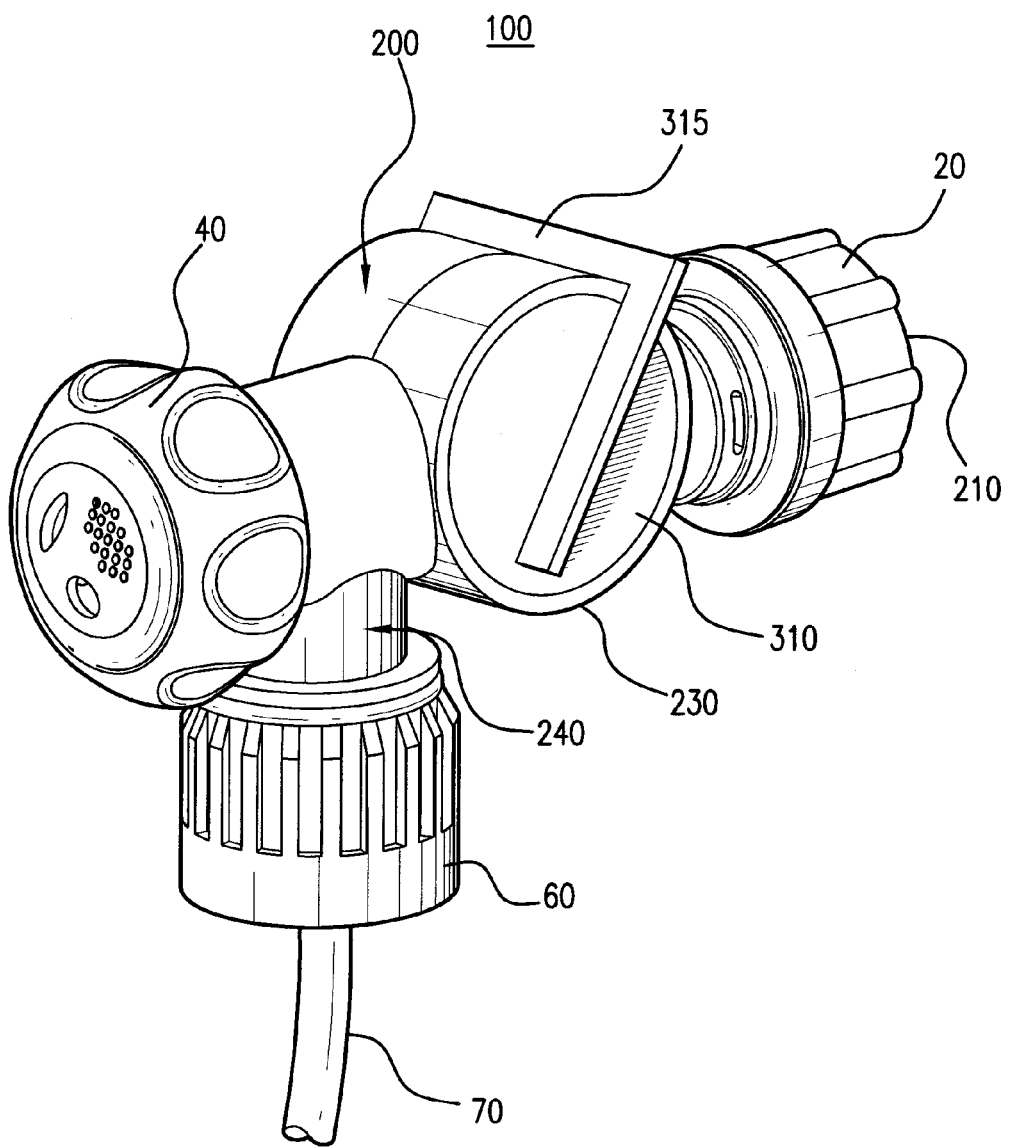
FIG. 4 is a front perspective view of the embodiment as illustrated in FIG. 1.
Figure 5:
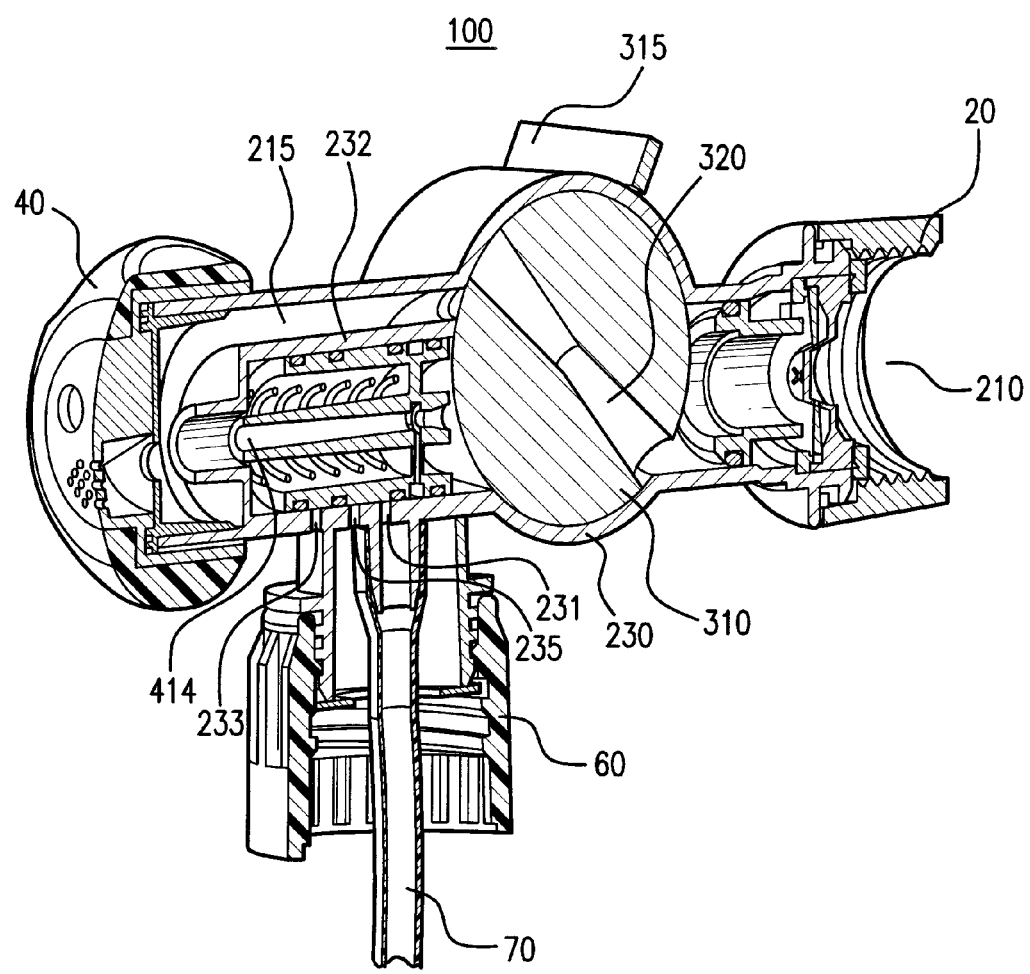
FIG. 5 is a front perspective sectional view corresponding to the embodiment as illustrated in FIG. 1, but with a front spray nozzle rotated to a different setting.
Figure 6:
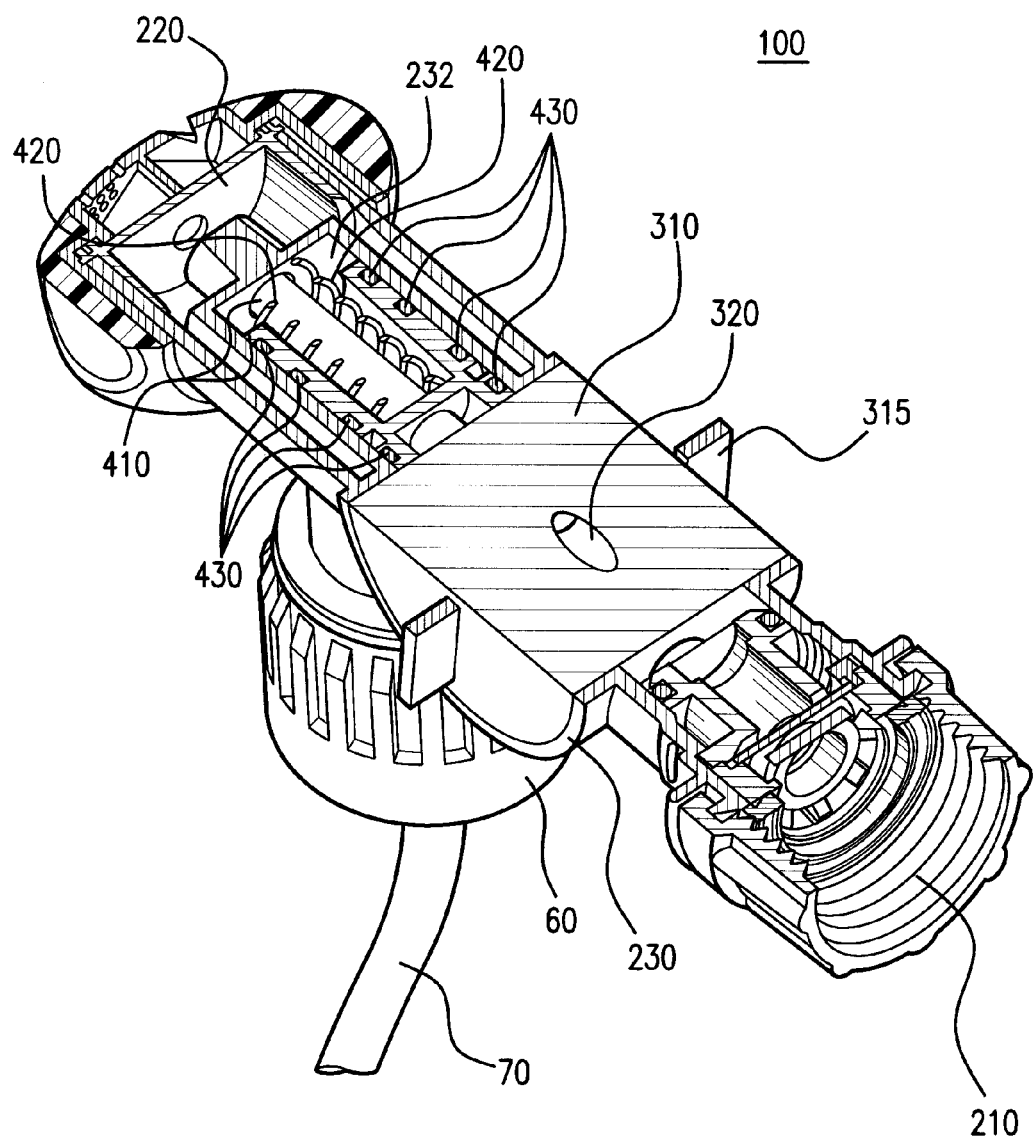
FIG. 6 is a rear perspective, top down sectional view of the embodiment as illustrated in FIG. 2.
Figure 7:
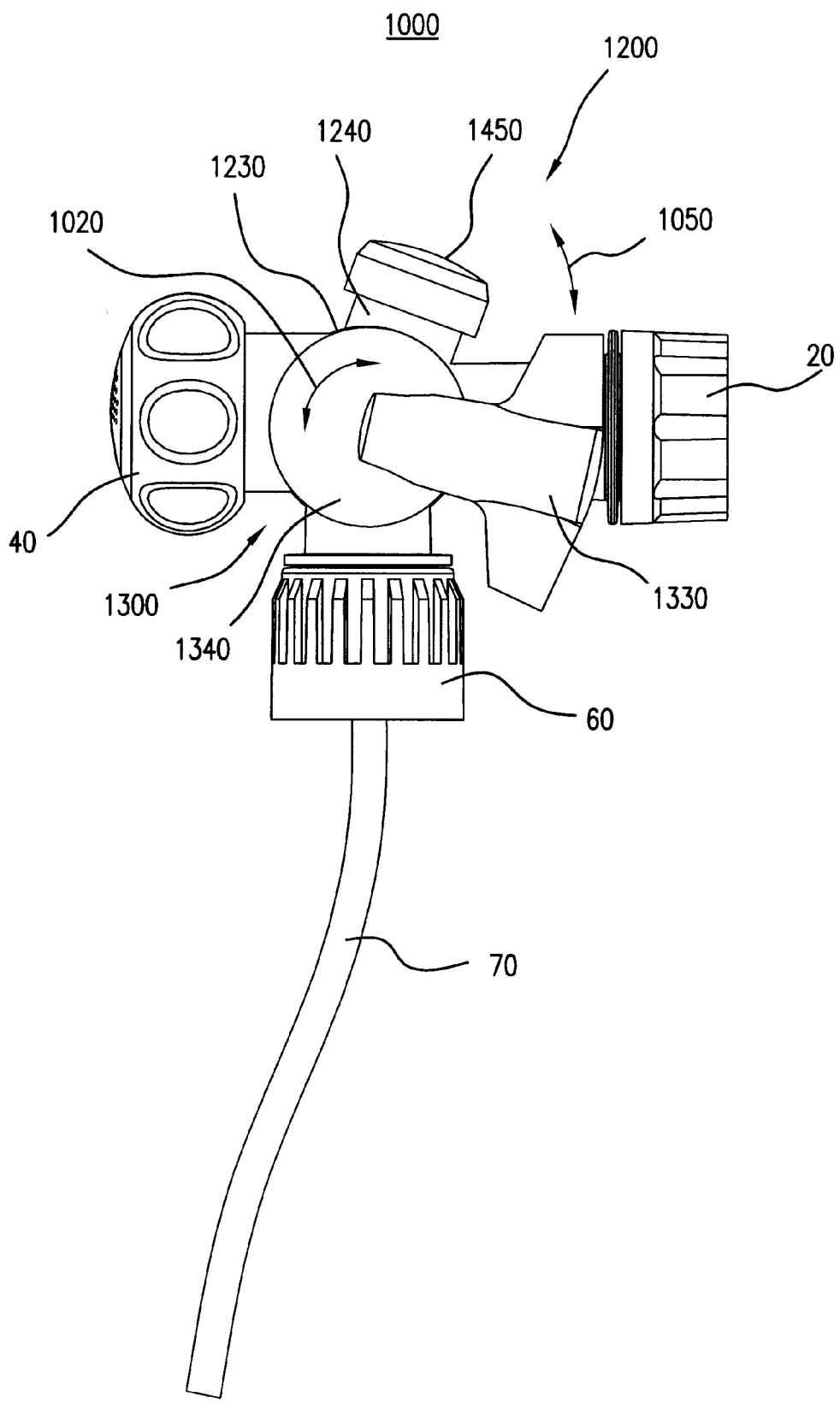
FIG. 7 is an elevational view of an alternate embodiment of a system formed in accordance with the present invention, in an OFF configuration.

In the exemplary embodiment shown, the control valve 300 includes a rotary member 310 angularly displaceable along the direction indicated by arrows 305. It is so disposed within an accommodating space formed in the housing intermediate portion 230. A bore-like fluid conduit 320, preferably formed diametrically through the rotary member 310, may then be angularly positioned to one of several predetermined settings, preferably including: closed, bypass, and open settings. In FIG. 1 and its corresponding perspective sectional view of FIG. 1A, the fluid conduit 320 is set to the closed position, wherein its distal end 324 abuts (and is substantially blocked by) an inner surface of the housing's accommodating space, such that passage of the pressurized fluid through the conduit 320 is effectively blocked. In the corresponding FIGS. 2 and 2a, the fluid conduit 320 is set to the bypass (or rinse) position, in which it directs the flow of pressurized fluid entering its proximate end 322 to a bypass channel 215 that bypasses the response valve 400 and leads directly to the outlet 220. In corresponding FIGS. 3 and 3A, the fluid conduit 320 is set to the open position, where it substantially aligns with, and extends between, the inlet 210 and response valve 400. Preferably, a control member 315 is provided for readily accessible manual displacement along the direction indicated by arrows 307 to correspondingly position the rotary member 310 within the housing 200.

The location of the bypass position relative to the open and closed positions is preferably at an intermediate point between them, as in the embodiment illustrated. This allows a limited amount of pressurized fluid to flow from the fluid conduit 320 through the bypass channel 215, to the outlet 220, as the control valve's rotary member 310 passes while turning from the on position back to its closed position. One advantage is the flushing effect this has on any residual mixed product which may otherwise remain at the outlet upon shut-off. In addition, the back pressure resulting at the outlet end of the piston member 410 provides a measure of force to 'push' the piston member 410 back away from the outlet 220, aiding the piston member's quick and complete spring biased return to its inactive position.

The response valve 400 in the exemplary embodiment shown includes a displaceable assembly that may be displaced relative to the housing 200 between active and inactive positions. This is realized, for example, in the form of a piston member 410 disposed in axially displaceable manner, as indicated by directional arrows 405, within a receiving compartment 232 defined by the housing 200. The piston member 410 is preferably biased by a resilient member to one of its active and inactive positions. In the illustrated embodiment, the default position is the inactive position. That is, the piston member 410 is biased—or spring loaded—by a coil spring element 420 to its inactive position, away from the outlet 220 (and towards the control valve 300).

The piston member 410 is formed with an interface end 412 from which a mixing chamber 414 axially extends forward in bore-like manner, towards the outlet 220. A passage preferably configured as a transverse Venturi aperture 416 leads from the mixing chamber 414 through to an outer surface of the piston member 410. In the response valve's inactive position (as shown in FIGS. 1, 1A and 2, 2A), this Venturi aperture 416 is obstructed by an abutting inner surface of the immediately surrounding housing portion, while in the response valve's active position, it aligns with the housing's admission port 231 to open a path of access between the liquid material source and the mixing chamber 414.

The resilient member biasing the piston member 410 may be of any suitable type known in the art, such as the coil spring element 420 shown. It preferably applies a sufficient biasing force upon the piston member 410 to hold the default position until an opposing force sufficient to overcome the biasing force is applied thereto by an incoming flow of pressurized fluid emerging from the control valve's fluid conduit 320. Preferably, the biasing force applied by the resilient member is such that it may be amply overcome by the typical fluid flow pressures to be encountered in the intended application, yet is firm enough to resist stray forces which may be applied quite unintentionally and unexpectedly applied to the piston member 410 by various sources of potential disturbance, such as shock due to dropage, seepage of fluid through the control valve 300, and the like. In that regard, system 100 is preferably of an overall construction which guards suitably against open external access to the piston member 410, lest manual depression, obstruction, or other direct disturbance occur.

When the control valve 300 is set to its open configuration, and when a sufficiently pressurized flow of fluid passes concurrently through the fluid conduit 320, the fluid emerging from the fluid conduit's distal end 324 flows against the piston member's interface end 412. Not only does this impart a force upon that interface end 412, the pressurized accumulation of fluid resulting there builds up sufficient pressure to cause a responsive displacement of the piston member 410 against its spring loaded bias. The piston member 410 retracts until, either the opposing end 415 is stopped against the rear inner wall of the receiving compartment 232 or, alternatively, the force applied by the spring element 420 as it is compresses equalizes the pressure generated responsive to the pressurized fluid flow. In either case, the Venturi aperture 416 is positioned such that it substantially aligns with the admission port 231 when the piston member 410 assumes its predetermined active position. As a portion of the pressurized fluid continues to flow through the piston member's mixing chamber 414, the given liquid material (whose source is coupled to the neck 240) is drawn through the admission port 231, through the Venturi aperture 416, and into the fluid flow's path for subsequent mixture and expulsion therewith out through the outlet 220 and spray nozzle 440.

The aspiration required for such operation is preferably effected through at least first and second vent ports 233, 235 provided in the housing's intermediate portion 230. A plurality of seal members, preferably in the form of suitable O-rings are disposed about an outer surface of the piston member 410, preferably within accommodating annular recesses formed in that outer surface. When the piston member 410 assumes its inactive position, these seal members 430 bear against the surrounding walls of the receiving compartment to isolate the vent port 235 (disposed inside the neck 240) from the vent port 233 (disposed outside the neck 240) to prevent any seepage of air or liquid therebetween. When the piston member 410 assumes its active position, however, the seal members 430 are sufficiently displaced with the piston member 410, away from its intervening position between vent ports 235 and 233, unsealing to permit fluid communication between them. Atmospheric air is thereby permitted to enter the attached liquid container's interior to act on the liquid material contents.

In overall operation, then, the response valve 400 prevents the given liquid material from escaping through the admission port 231 when operational conditions are not present. That is, the outer side wall of its piston member 410 blocks the admission port 231 when in the inactive position shown in FIGS. 1, 1A and 2, 2A. A pair of seal members 430 serve in this position to seal against the seepage of any liquid material between the piston member 410 and the surrounding wall of the receiving compartment 232. Any such escaping liquid material is contained by the bounding seal members 430 such that the material would, if anything, fall back into the storage container via the admission port 231 itself, or via the immediately neighboring vent port 235.

In accordance with one aspect of the present invention, then, manipulating the control valve 300 to its open configuration is not alone sufficient to activate the response valve 400. A fluid flow of sufficient pressure to overcome the bias force maintained by response valve 400 must also be present for its activation.

The housing 200 is preferably formed of hard plastic or other suitable material known in the art of sufficient strength, rigidity, and durability to withstand the conditions typically encountered in the intended application. In applications posing particularly harsh conditions, considerations such as anti-corrosion, thermal expansion, and the like may be significant factors determining the choice of materials for various portions of system 100. The present invention is not limited to a particular choice of materials, as such choice will depend on the particular requirements of the intended application.

Turning now more closely to the structure for coupling a container or other source of the liquid material (highly concentrated lawn treatment chemical, for instance), a suction tubing 70 positioned with an upper end engaging a nipple 242 and a lower end extending to the bottom of the given container (not shown). If the container is of the type having a threaded opening, it may be threadedly engaged with the adapter 60 for suspension therefrom. Within the adapter 60, a seal 62 such as a flattened O-ring or washer is preferably provided at the sprayer-container interface to prevent air and liquid material leakage. Other attachments such as snap-on, lock-in-key, dovetail, or other such coupling mechanisms known in the art may be alternatively employed.

Various alternative embodiments may be realized in accordance with the present invention. In certain alternative embodiments, for example, the spray nozzle 40 may be replaced by another downstream flow control valve device such as an extension wand or other fluid-conducting attachment coupled to the outlet 220. In certain other exemplary embodiments, an optional detent ball mechanism or other such retaining device may be incorporated in the control valve 300 to give tactile feedback when the valve 500 is optimally positioned for a particular function. Such a detent ball mechanism may be seated with a biased ball partially received within a recess formed in the control valve accommodating space within which the rotary member 310 is seated. One or more corresponding detent recesses may then be formed in the opposing surface of the rotary member 310.

With particular respect to operation when the control valve 300 is set to its open configuration, among the forces overcome by the pressure build up at the piston member interface end 412 are not only the biasing force exerted by a coil spring 420, but also inertial forces due to such things as the friction generated between the piston member and the surrounding inner surfaces of the receiving compartment 232. This friction is exacerbated by the O-rings 430, seated in the circumferential grooves/recesses formed on the piston member's exterior. In certain alternative embodiments, then, a biasing member is obviated by the inertial drag collectively generated by a suitable plurality of static seal members 430. The resultant 'O-ring drag' in such embodiments is sufficient to retain the piston member 410 in the inactive position in the absence of pressurized fluid flow thereto through an open control valve 300. The piston interface end 412 on which the pressurized fluid acts to create a displacement force preferably remains unexposed to points outside of the housing 200, so as to prevent unwanted mechanical manipulations, via a pencil or other foreign object.

In those alternate embodiments where a extension wand having a flexible hose for accurate spot location of the delivered stream is employed at the outlet 220, and the wand is itself equipped with an on/off control mechanism, the response valve 400 serves to protect the container's contents by closing fluid communication between the container and the piston valve compartment. More specifically, when the wand on/off valve is open and the response valve 400 is activated, admission of the concentrated chemical or other given liquid material into the pressurized flow is permitted. When the wand valve is turned off, the fluid pressure quickly equalizes on both sides of the biased piston valve, allowing the piston member's biased return to its inactive position—even if the control valve 300 were still in an open configuration at that instant.

The O-rings forming the seal members 430 in the embodiment shown are preferably formed of a suitable elastomeric material known in the art. They provide hermetic sealing of the interface between the piston member 410 and the immediately opposing sidewalls of the receiving compartment 232. As mentioned in preceding paragraphs, the O-rings serve to fluidically separate certain sections of the piston member 410. Preferably, enough seal members 430 are employed such that proximal and distal O-rings are disposed adjacent the opposed axial ends of the piston member 410 so to provide hermetically sealed protection for most of the piston member's length.

Figure 8:
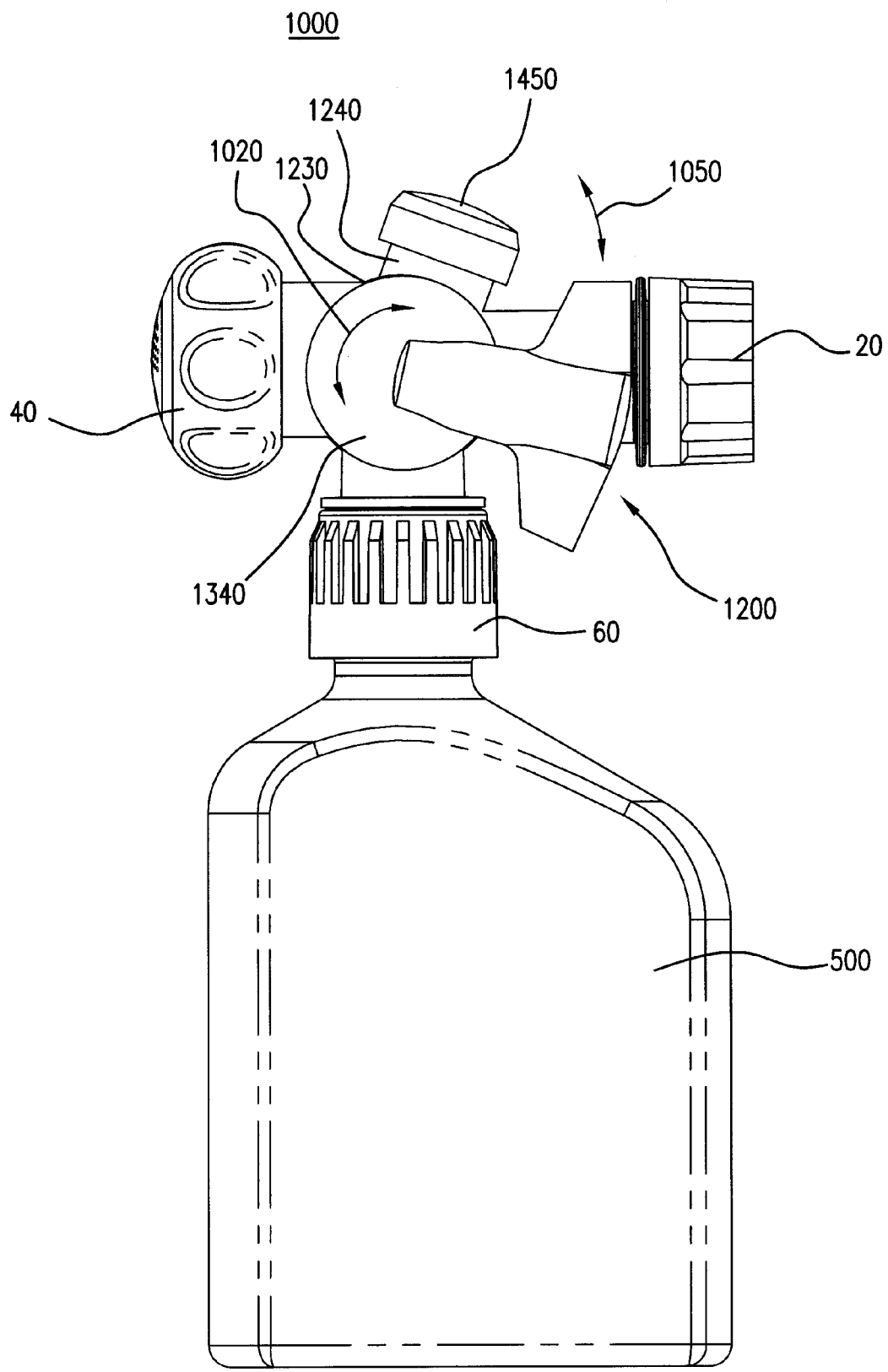
FIG. 8 is an elevational view of the embodiment shown as illustrated in FIG. 7, attached to a liquid material container.
Figure 9:
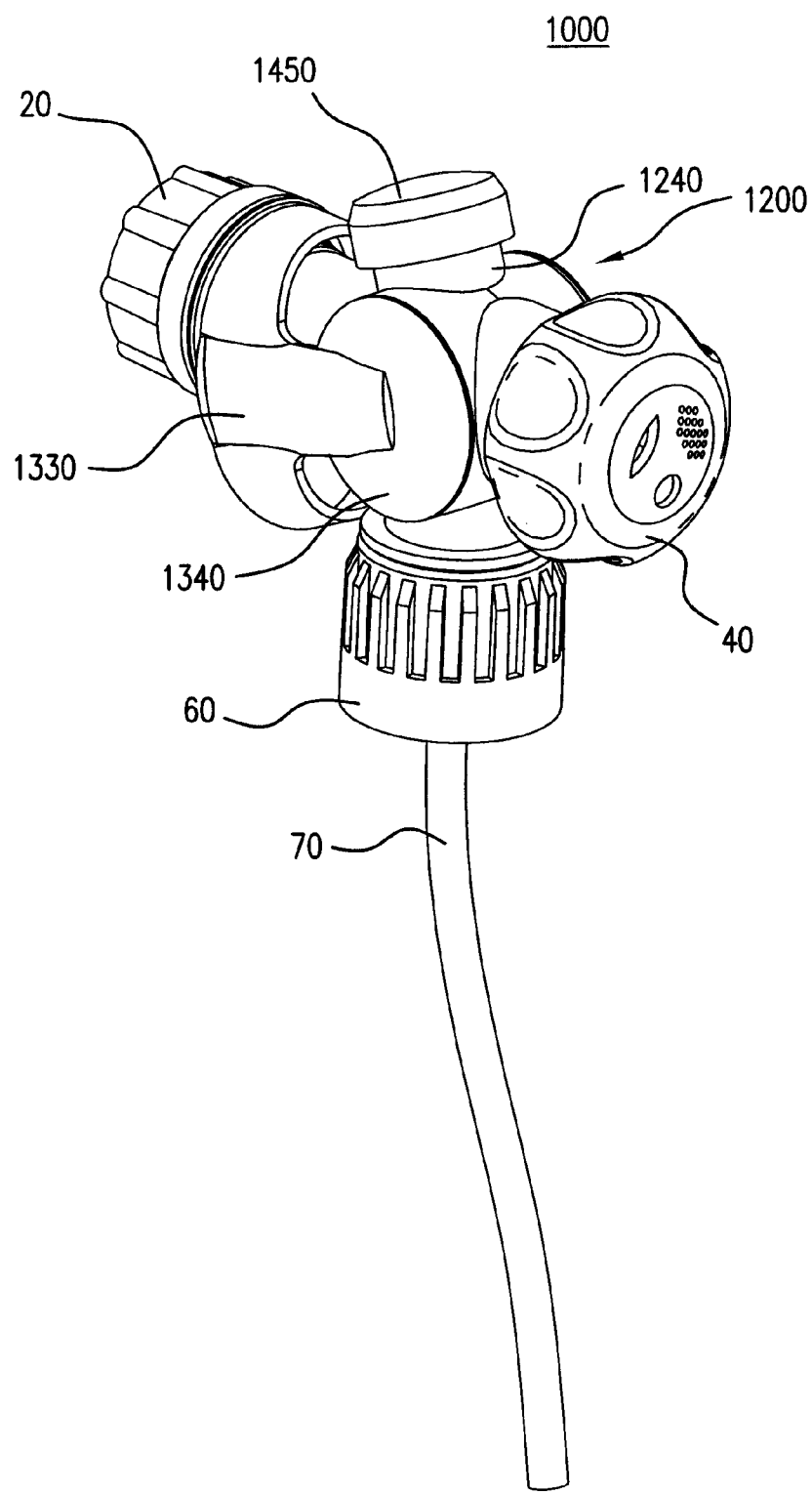
FIG. 9 is a front perspective view of the embodiment as shown in FIG. 7.
Figure 10:
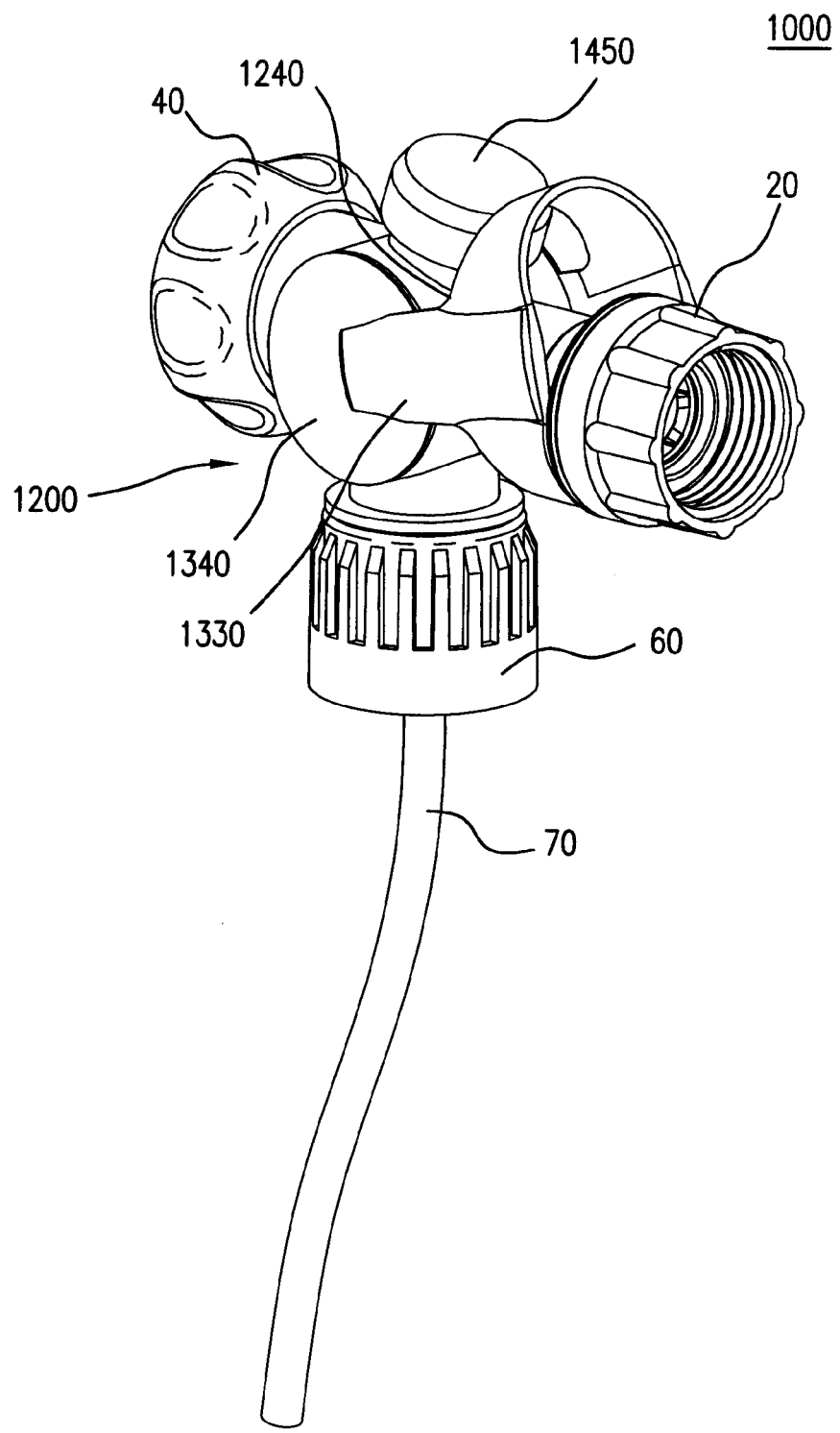
FIG. 10 is a rear perspective view of the embodiment of FIG. 7, in an ON configuration.

Referring now to FIGS. 7-15, there is illustrated another exemplary embodiment of the present invention. Like reference numbers are used in these FIGS. to denote the same or substantially the same elements as those shown in the preceding embodiment. System 1000 formed in accordance with this embodiment generally includes a housing 1200 having an intermediate portion 1230 to which a central valve assembly 1300 is coupled. As shown in FIG. 8, among others, the system 1000 is of the type which may be coupled for use to a top opening, or neck, of a bottle-like container 500 which holds the liquid material to be safely dispensed.

Briefly, the central valve 1300 in this embodiment effectively combines the functions generally served by the control valve 300 and response valve 400 in the preceding embodiment. It is formed internally with a suitable channeling structure which, as in the preceding embodiment, aligns with an admission port 231 to enable the given liquid material to be drawn from its source and appropriately dispensed. Preferably, the channeling structure includes a bore-like fluid conduit 1342 extending diametrically through the central valve assembly's main body portion 1340 and a Venturi aperture 1346 branching from that fluid conduit 1342. Angular displacement of the main body portion 1340 relative to the housing 1200 (as indicated by directional arrows 1020 and 1050) then controls the selective alignment of the Venturi aperture 1346 with the admission port 231.

Figure 14:
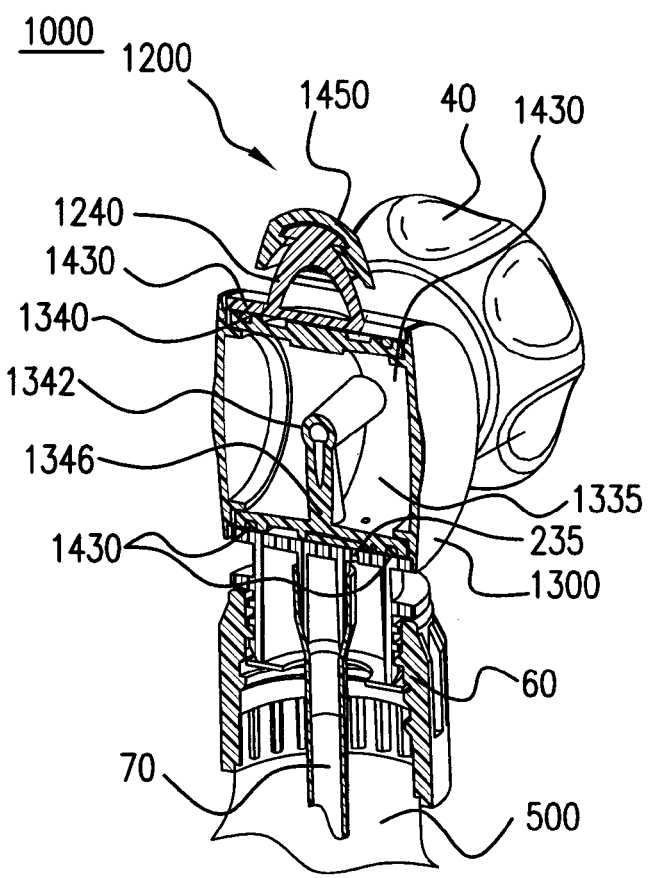
FIG. 14 is a rear perspective view of a front section portion of the embodiment as shown in FIG. 8.
Figure 15:
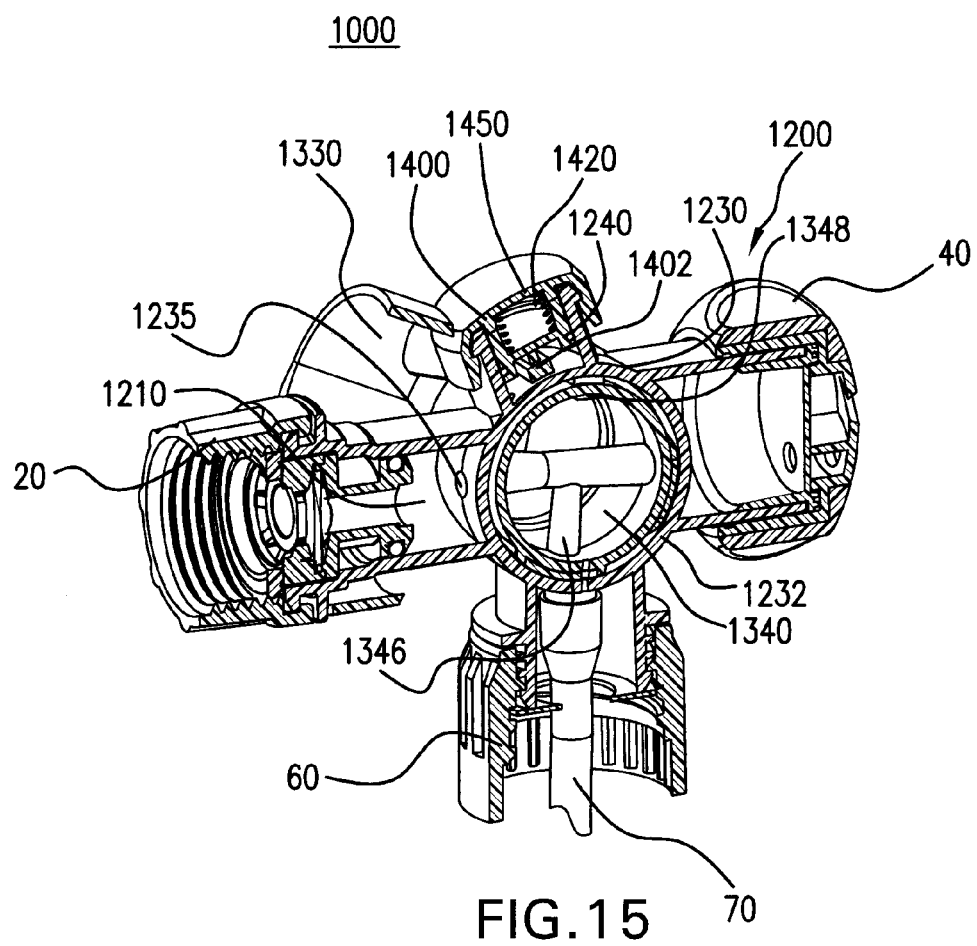
FIG. 15 is a rear perspective sectional view of the embodiment as illustrated in FIG. 12C, sectioned through a non-centered sectioning line.
Figure 16A:
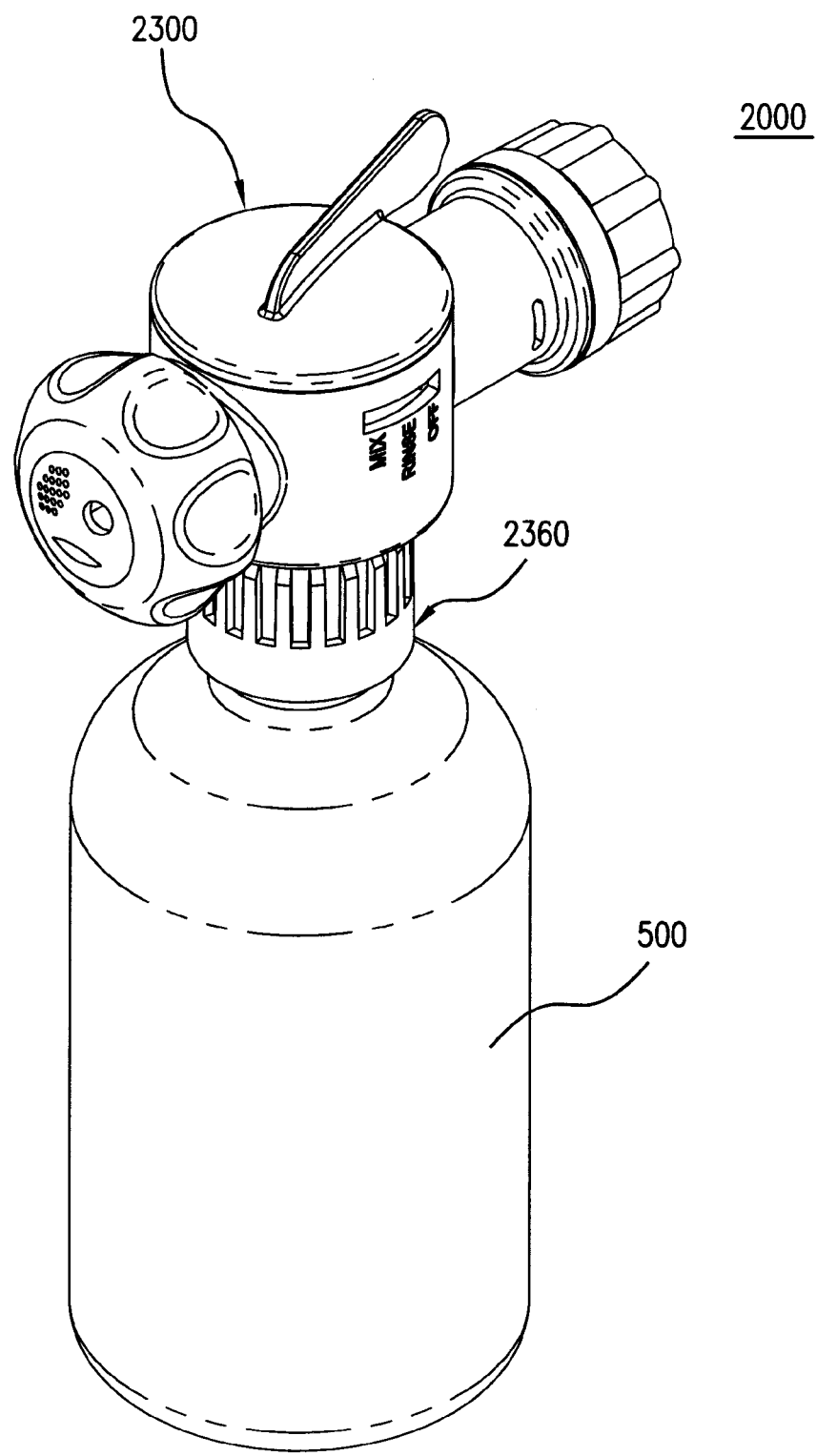
FIG. 16A is a perspective view of an alternate in-neck embodiment of the present invention, assembled and installed on an exemplary container.
Figure 16B:
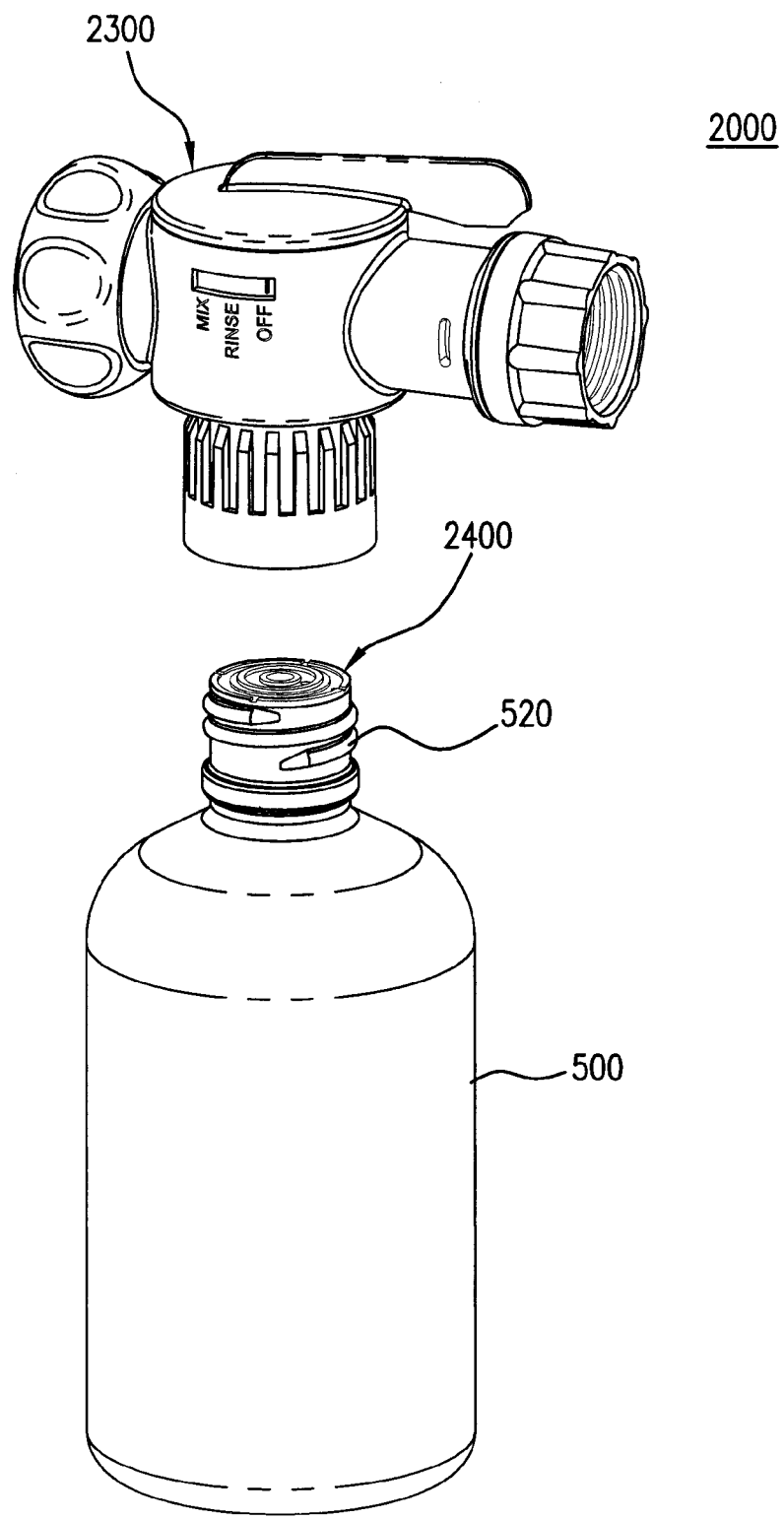
FIG. 16B is a partially exploded perspective view of the embodiment illustrated in FIG. 16A.
Figure 16C:
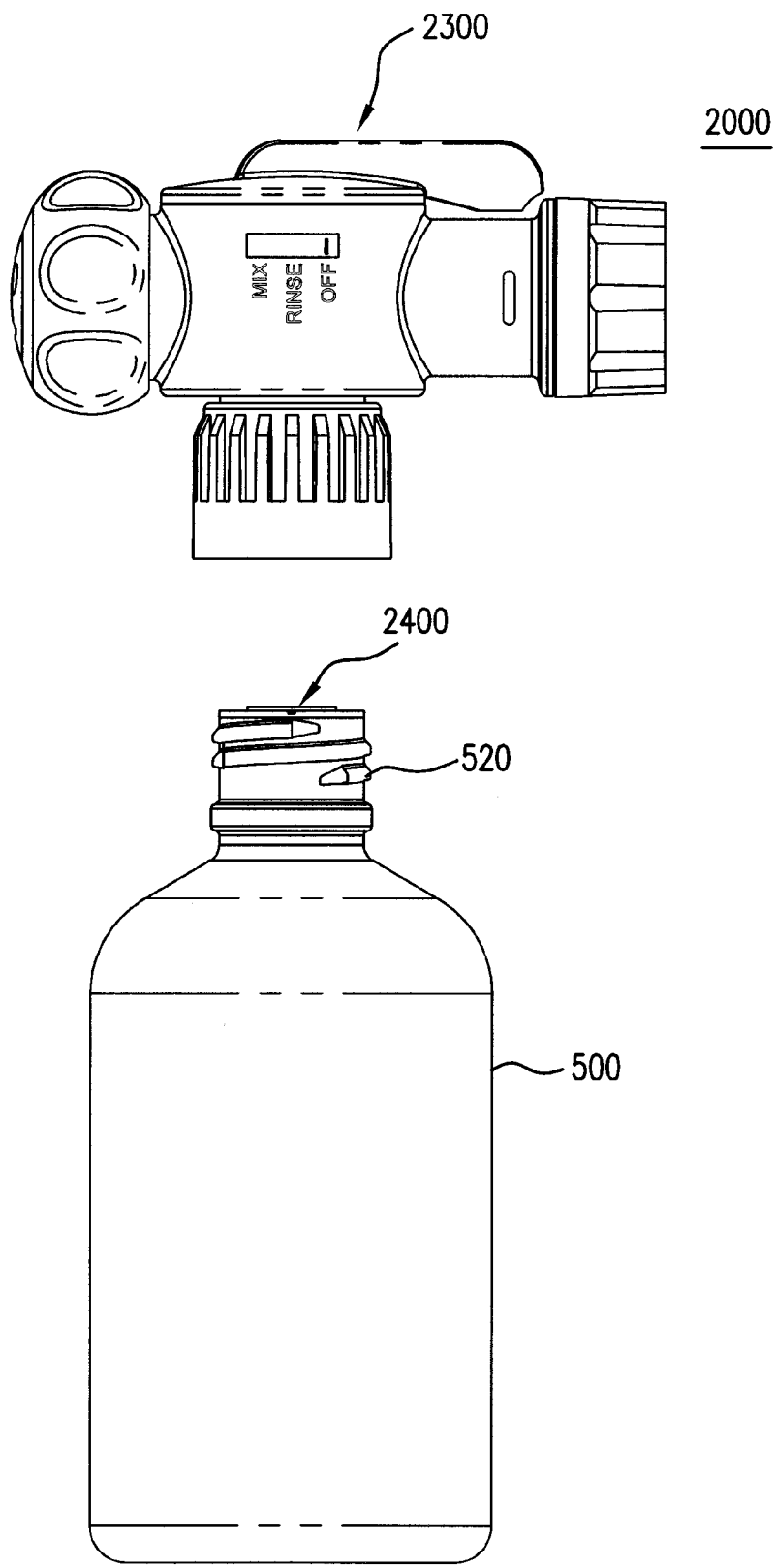
FIG. 16C is a partially exploded elevational view of the embodiment illustrated in FIG. 16A.
Figure 17B:
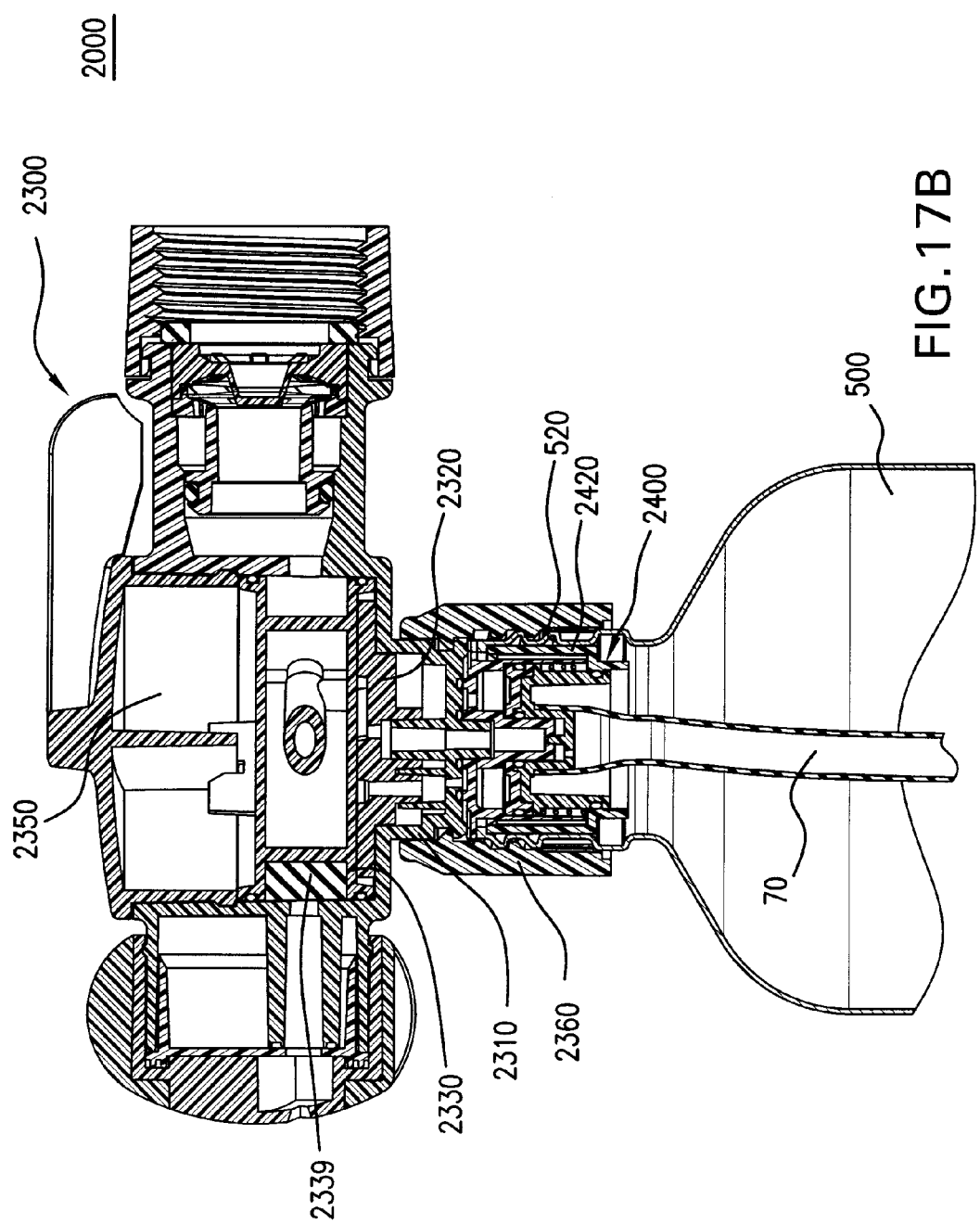
FIG. 17B is a sectioned elevational view, partially cut away, of the embodiment illustrated in FIG. 16A in an "OFF" configuration, without an incoming flow of pressurized fluid.
Figure 17C:
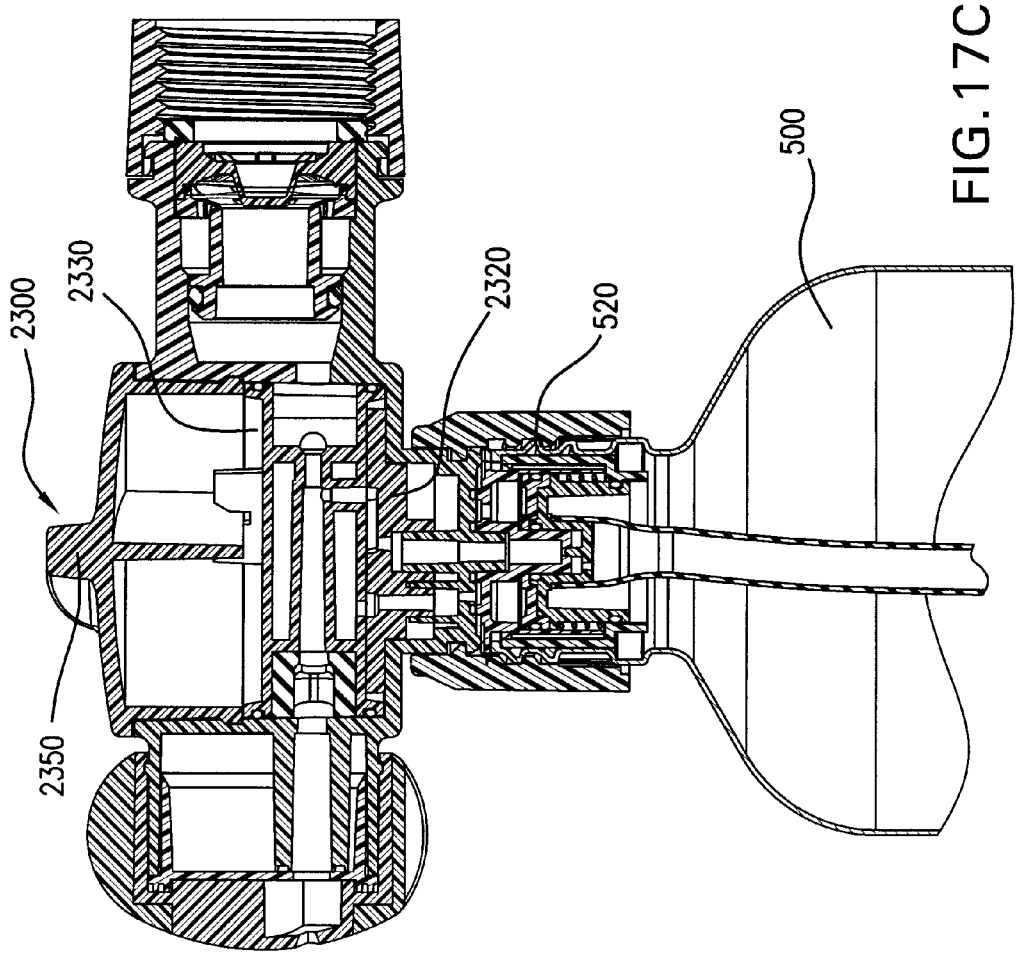
FIG. 17C is a sectioned elevational view, partially cut away, of the embodiment illustrated in FIG. 16A in the "MIX" configuration, without an incoming flow of pressurized fluid.
Figure 18A:
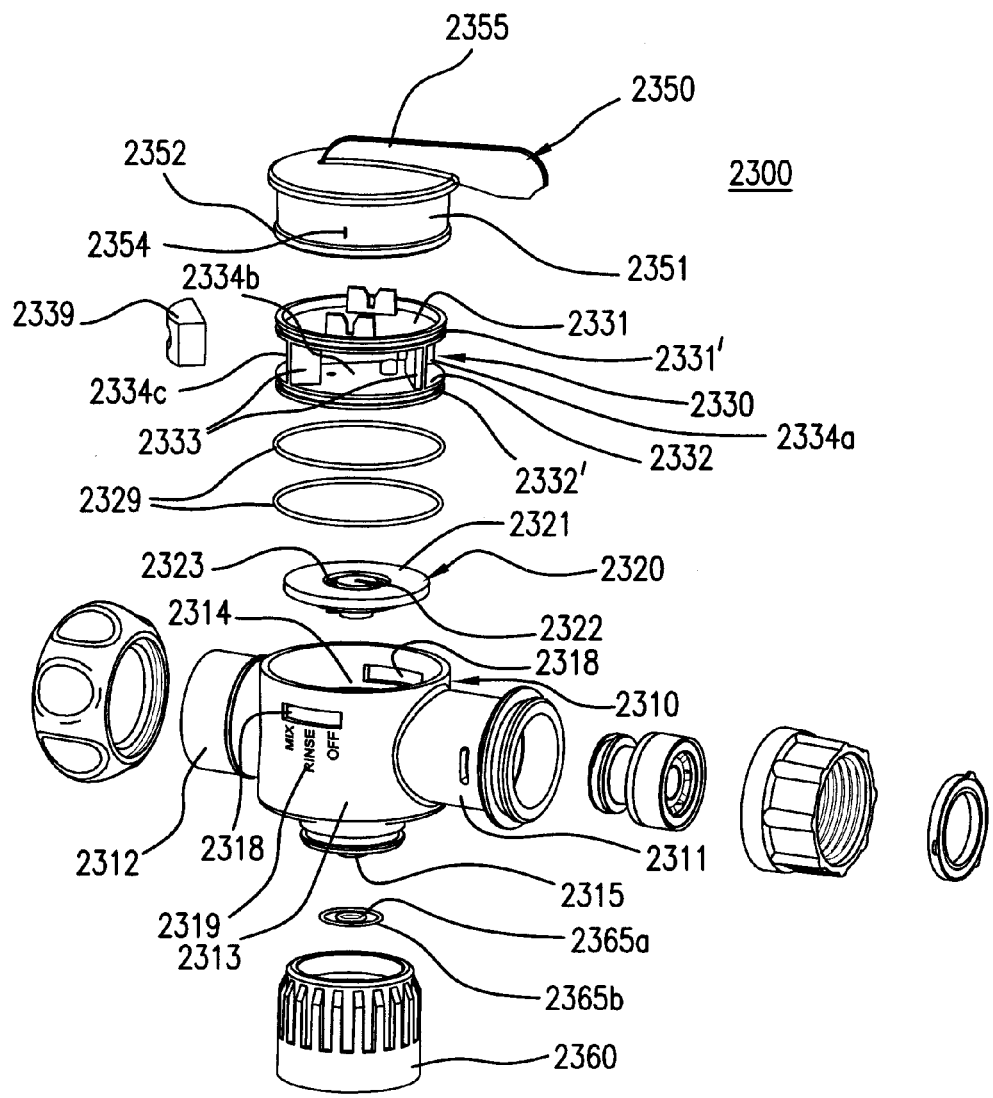
FIG. 18A is an exploded perspective view of a portion of the embodiment shown in FIG. 16A.
Figure 18B:
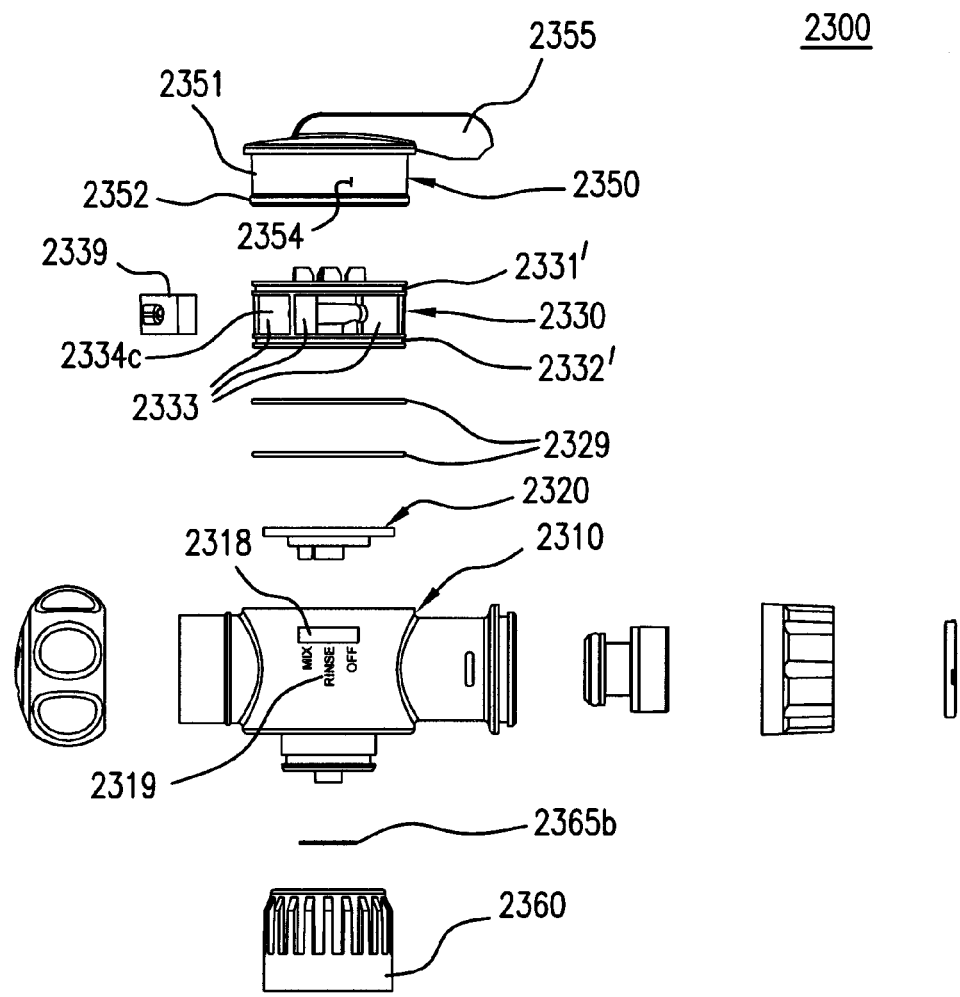
FIG. 18B is an exploded elevational view of the portion shown in FIG. 18A.
Figure 18C:
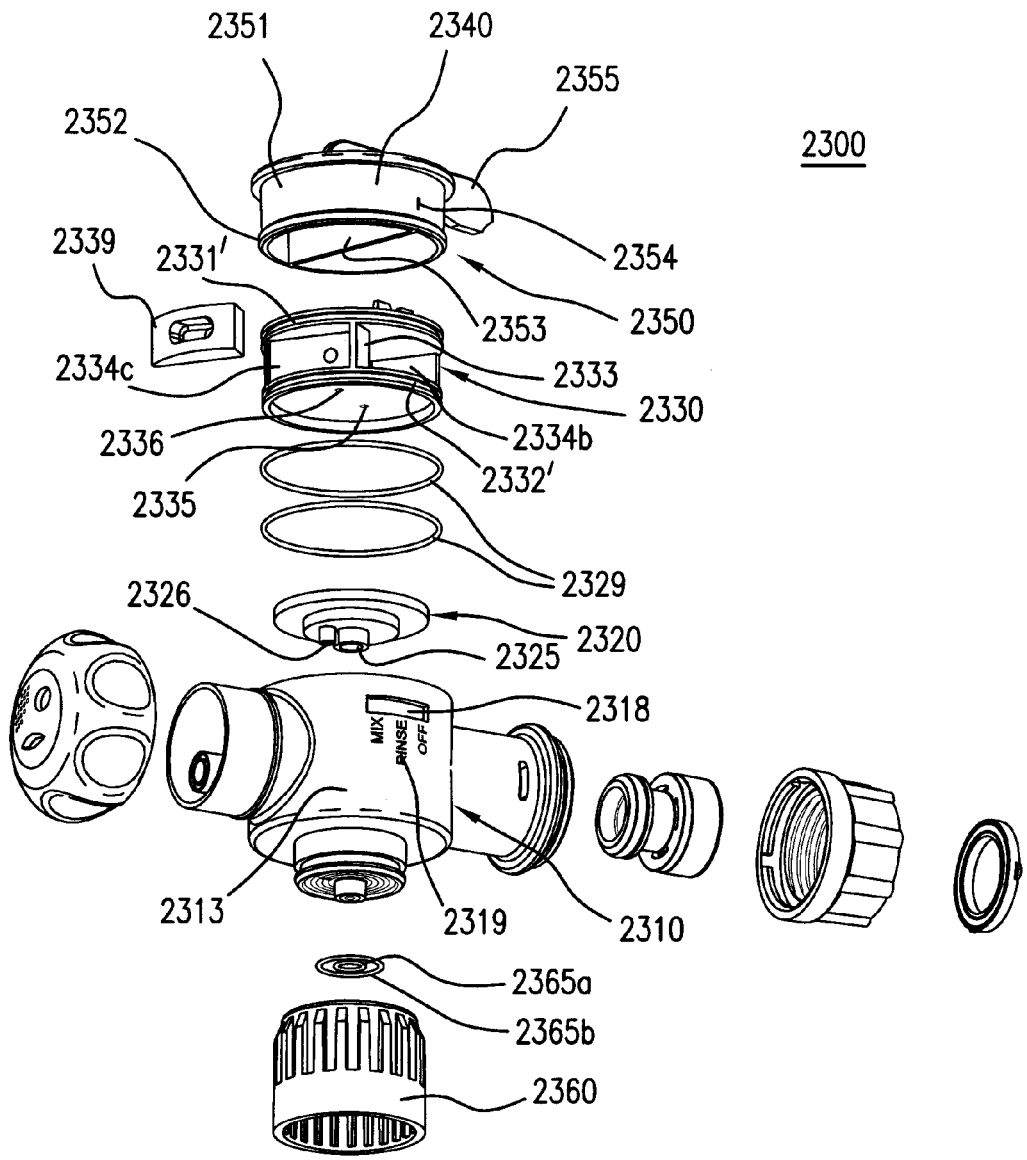
FIG. 18C is an exploded bottom-up perspective view of the portion shown in FIG. 18A.
Figure 18D:
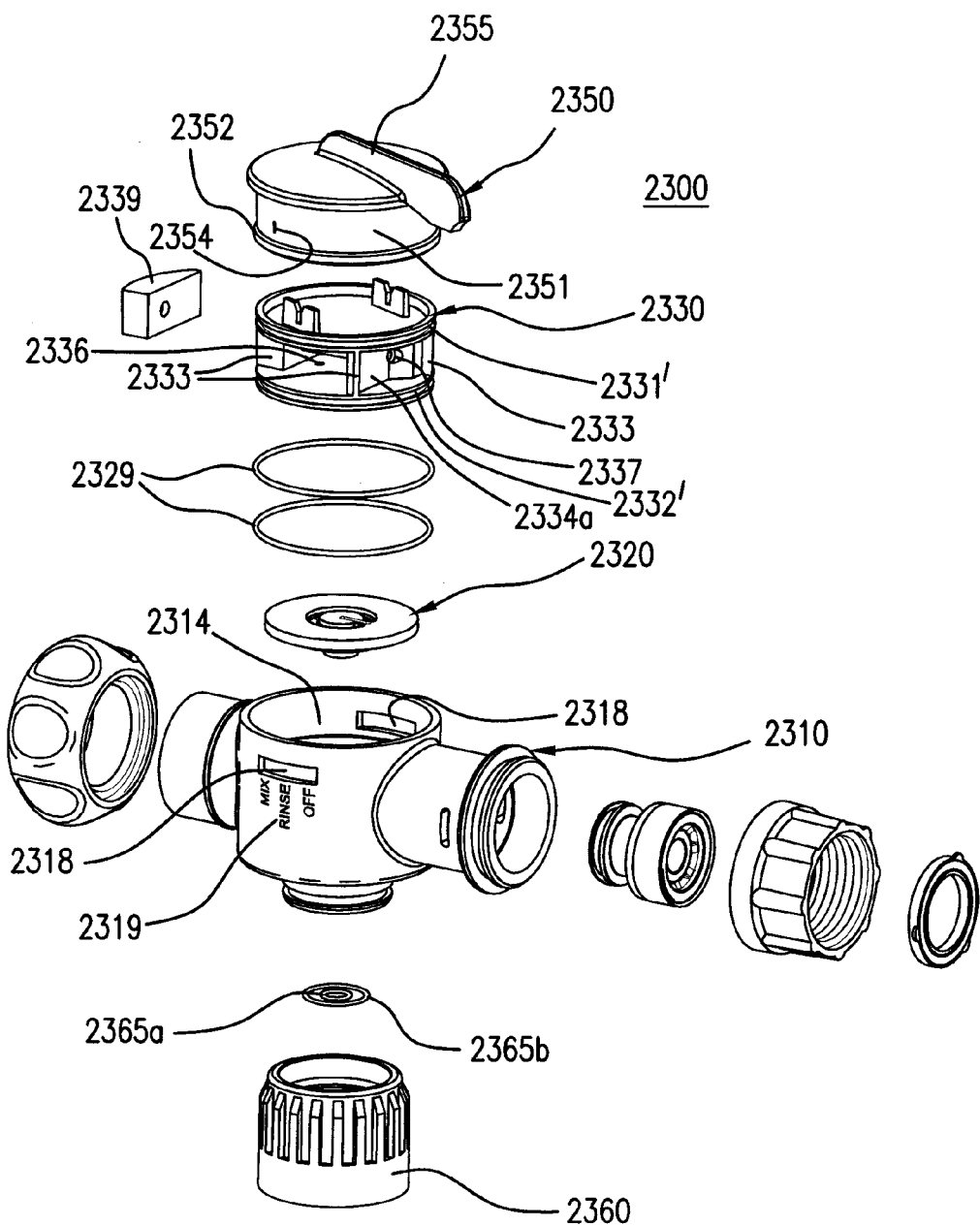
FIG. 18D is an exploded perspective view similar to the view of FIG. 18A, but with certain parts rotated in angular position.
Figure 18E:
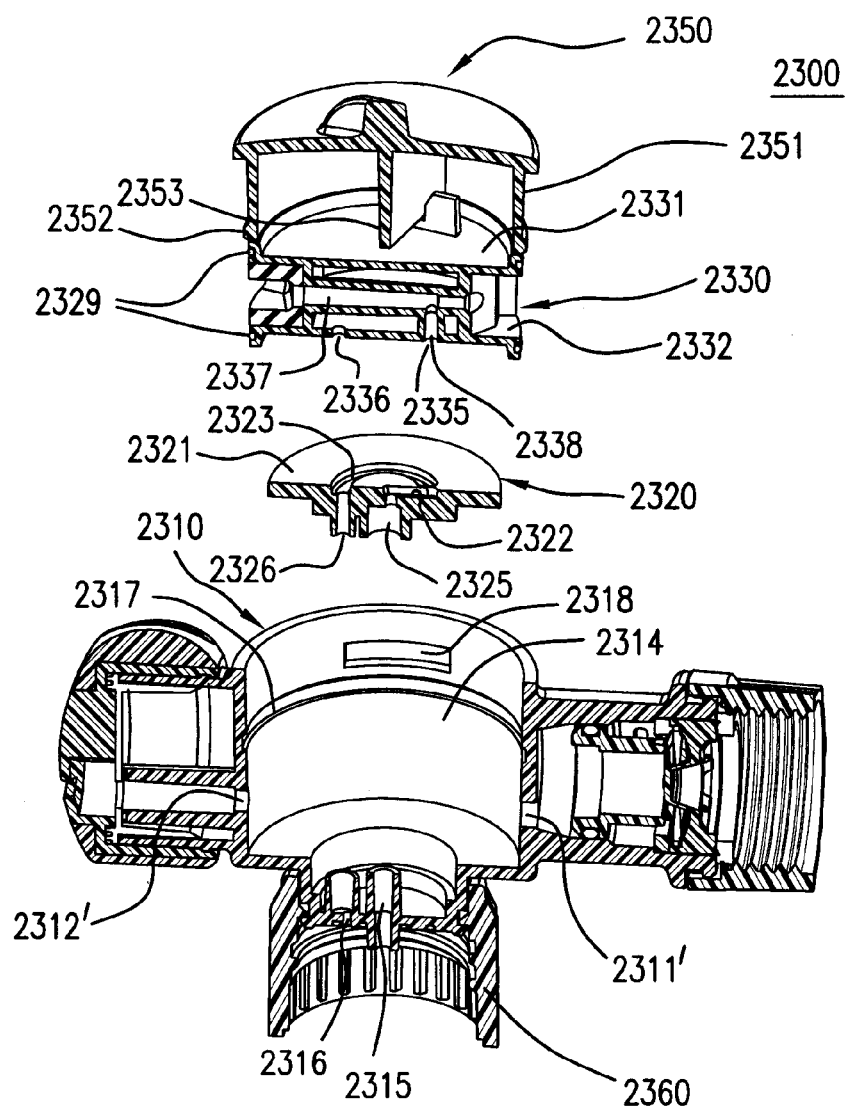
FIG. 18E is a partially exploded sectional view of the portion shown in FIG. 18A.
Figure 18F:
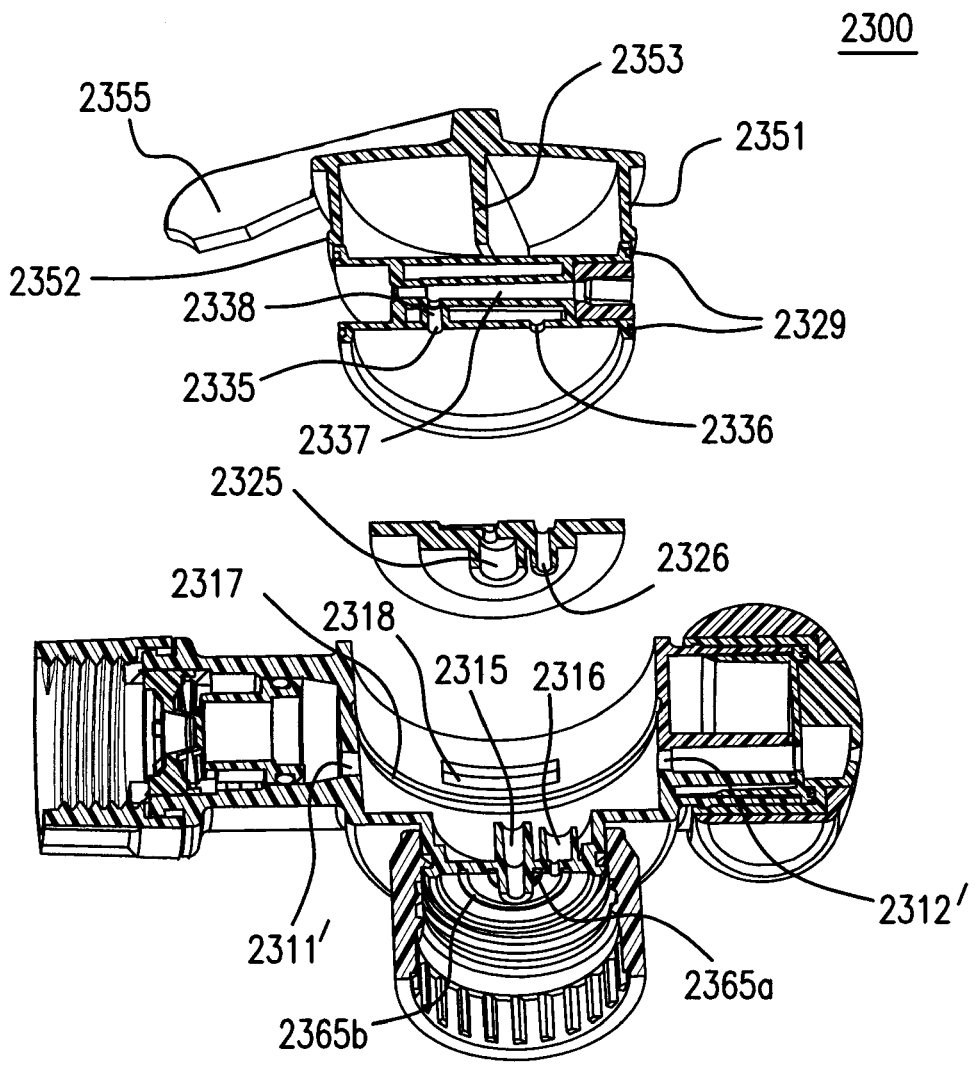
FIG. 18F is a bottom-up sectioned perspective view of the portion shown in FIG. 18E.
Figure 18G:
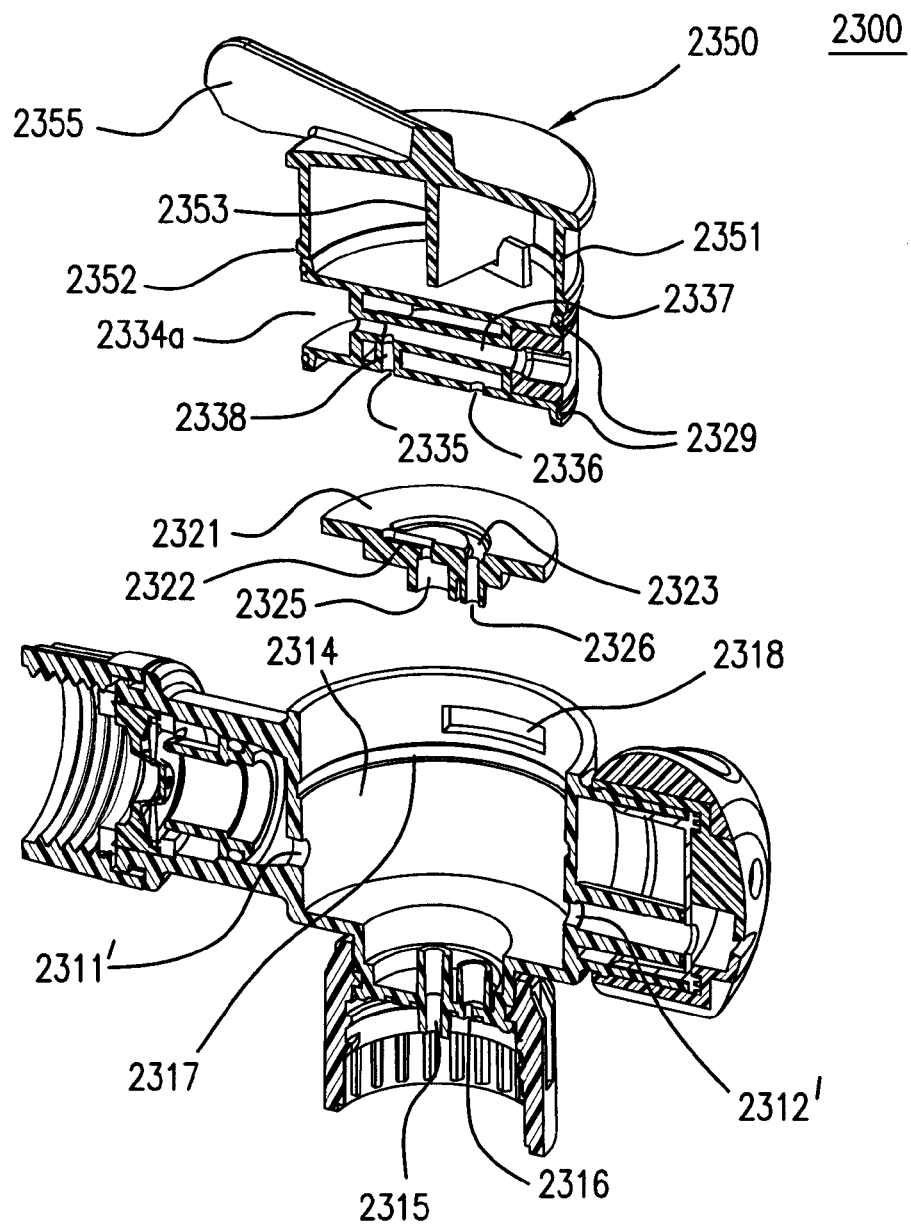
FIG. 18G is a sectional view of the portion shown in FIG. 18E, taken from an opposing perspective.

When aligned, the admission port 231 and fluid conduit 1342 are in open communication, whereby the liquid material may be drawn into the housing for mixed dispensing with that portion of the pressurized fluid stream passing through the fluid conduit 1342. At other angular positions of the main body portion 1340 relative to the housing 1200, the Venturi aperture 1346 is turned out of alignment with the admission port 231, such that the admission port is closed off by a sealing wall surface 1344 of the main body portion 1340 and any suitable seal members 1430 (as illustrated in FIG. 14) provided therewith.

Figure 12A:
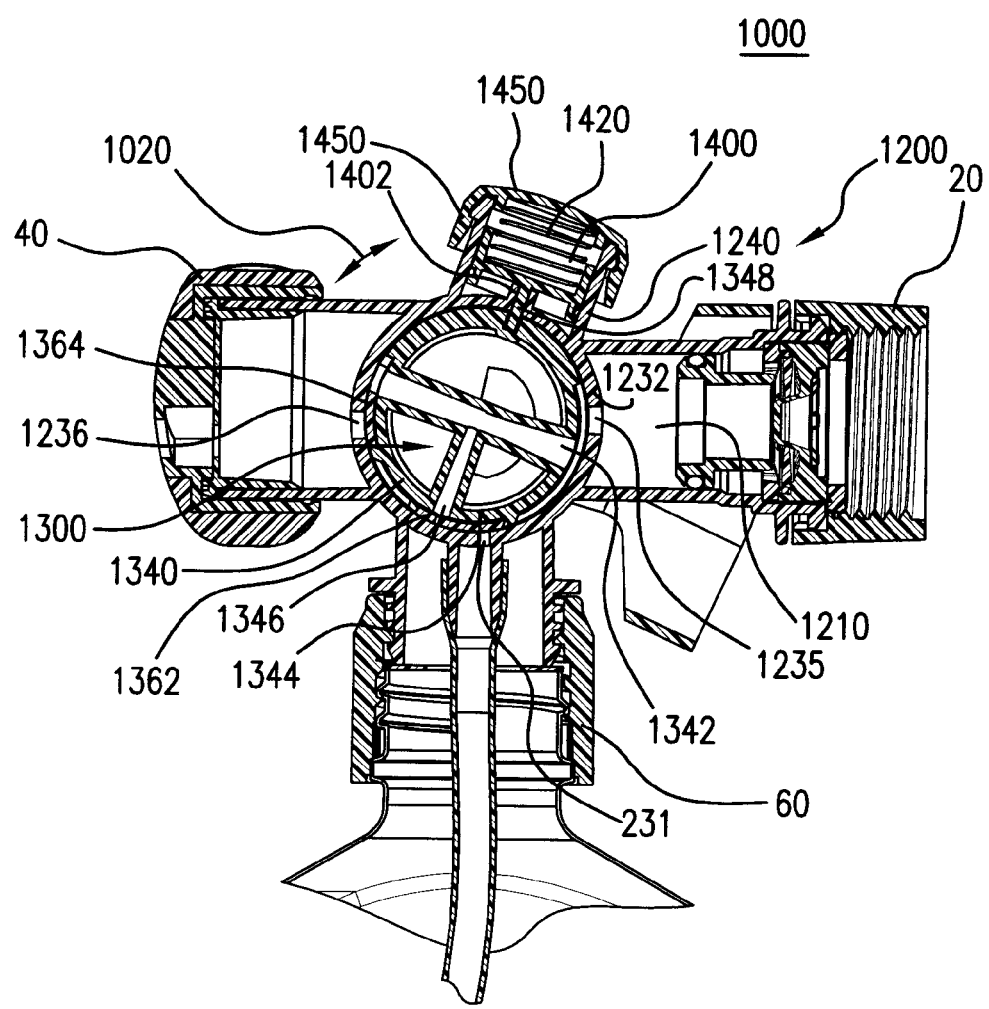
FIG. 12A is an enlarged view, partially cut away of the embodiment as shown in FIG. 11.
Figure 12B:
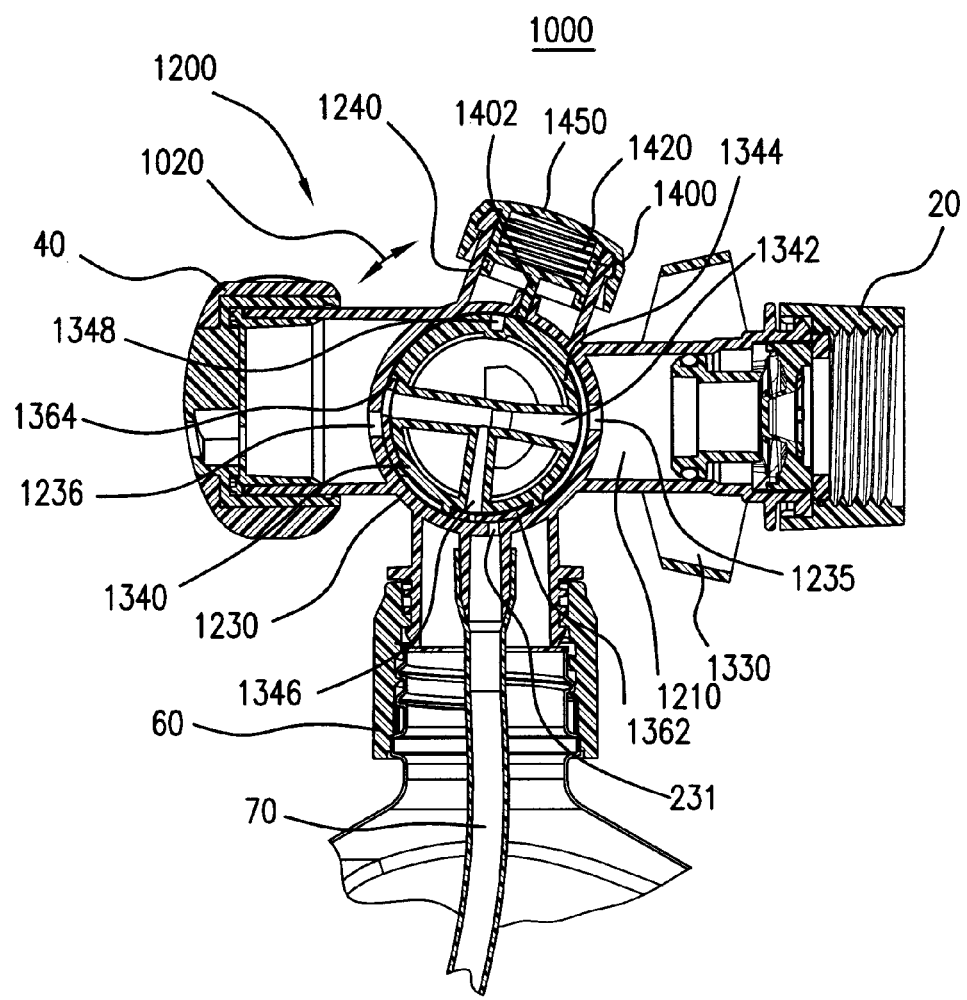
FIG. 12B is an enlarged sectional view corresponding to the embodiment of FIG. 12A, but in an intermediate operational configuration.
Figure 12C:
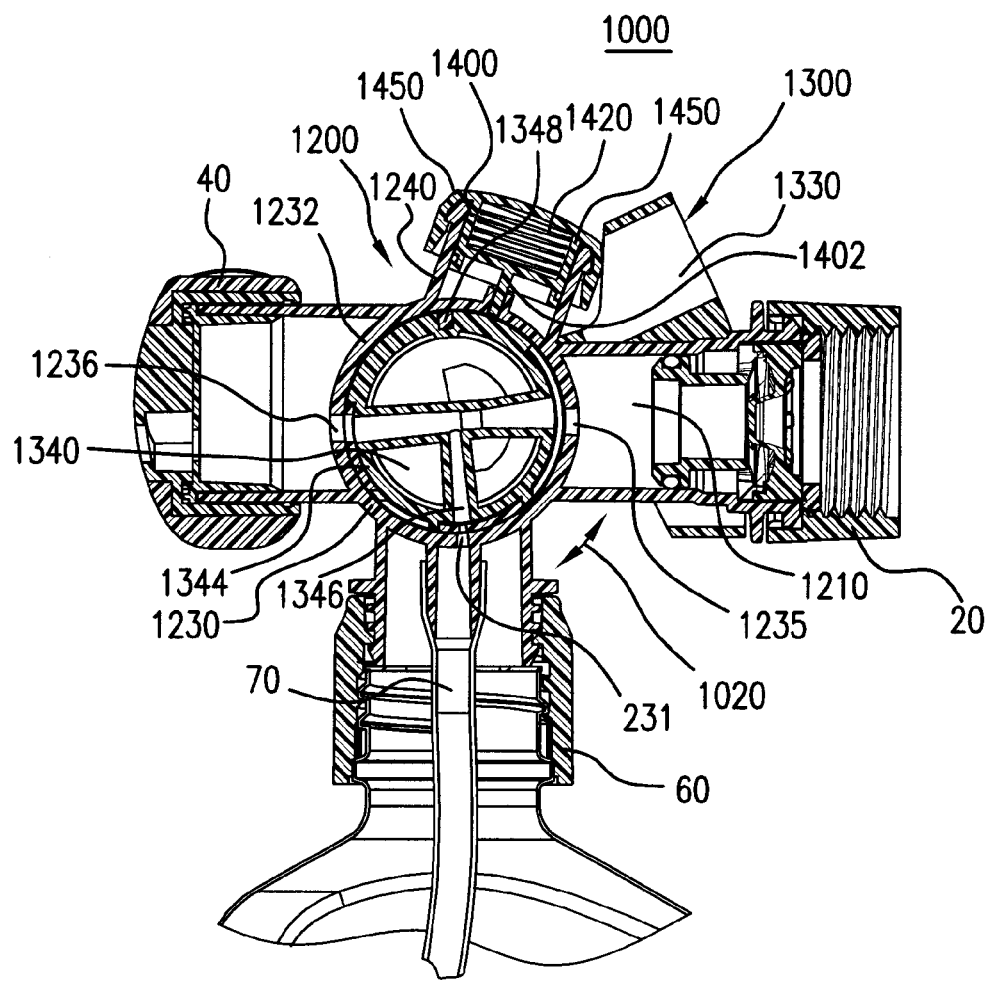
FIG. 12C is an enlarged sectional view corresponding to the embodiment of FIG. 12A, but in an ON operational configuration.
Figure 13A:
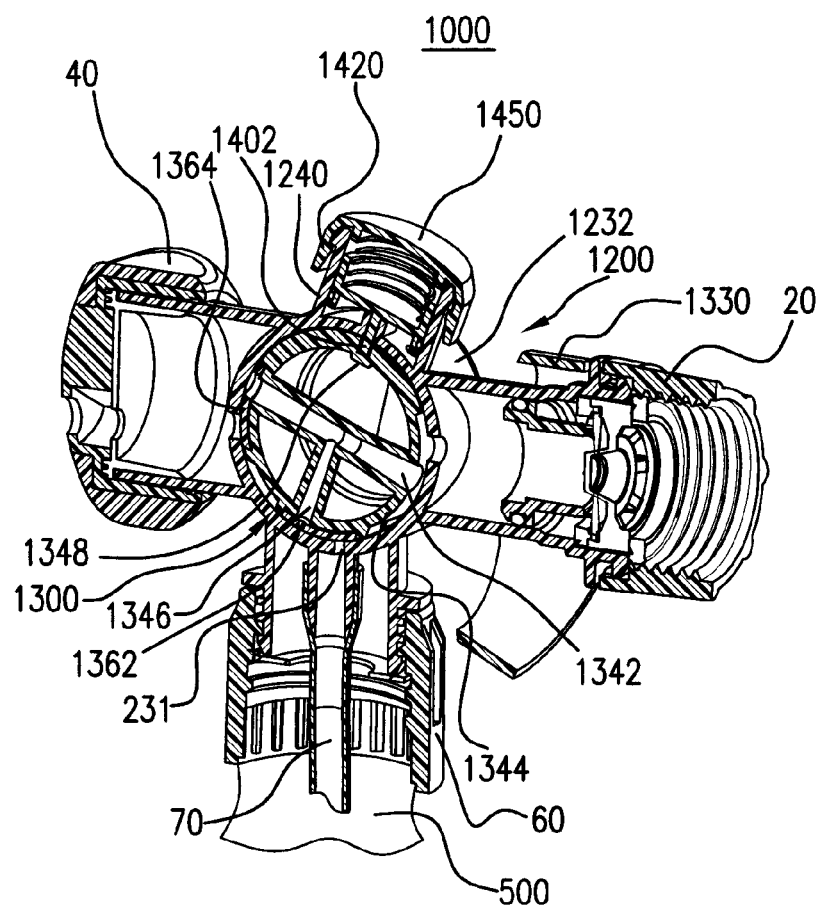
FIG. 13A is a rear perspective sectional view of the embodiment as illustrated in FIG. 12A.
Figure 13B:
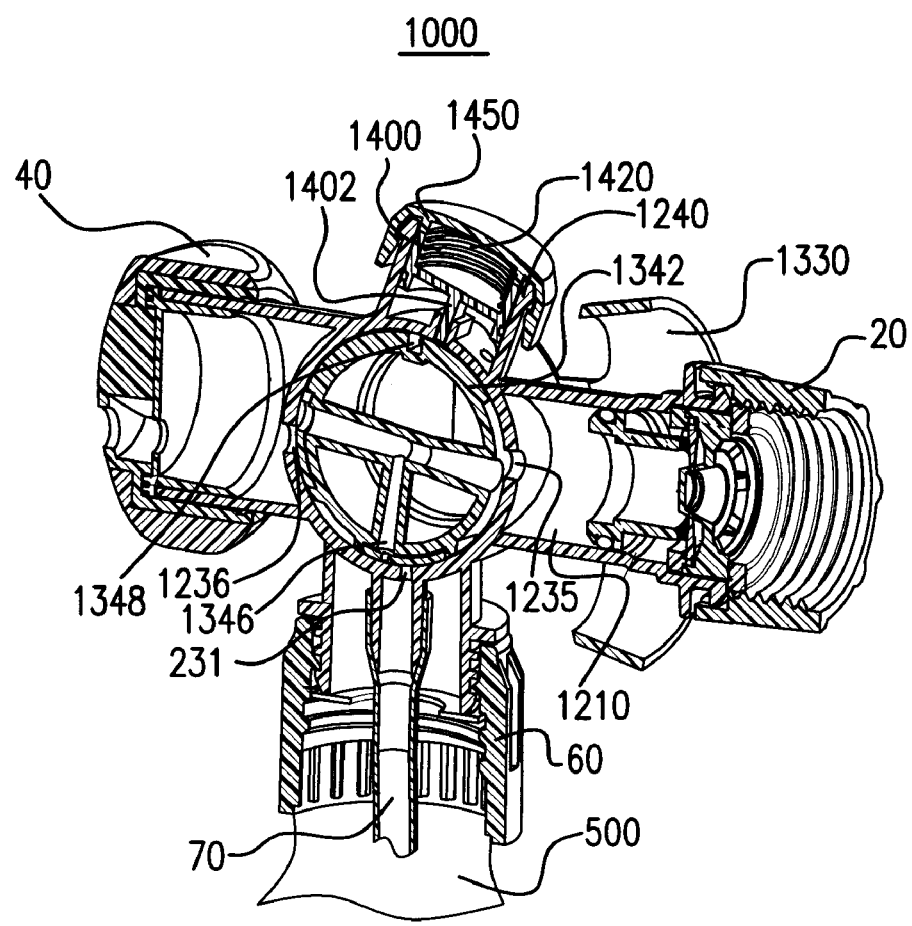
FIG. 13B is a rear perspective sectional view of the embodiment as illustrated in FIG. 12B.
Figure 13C:
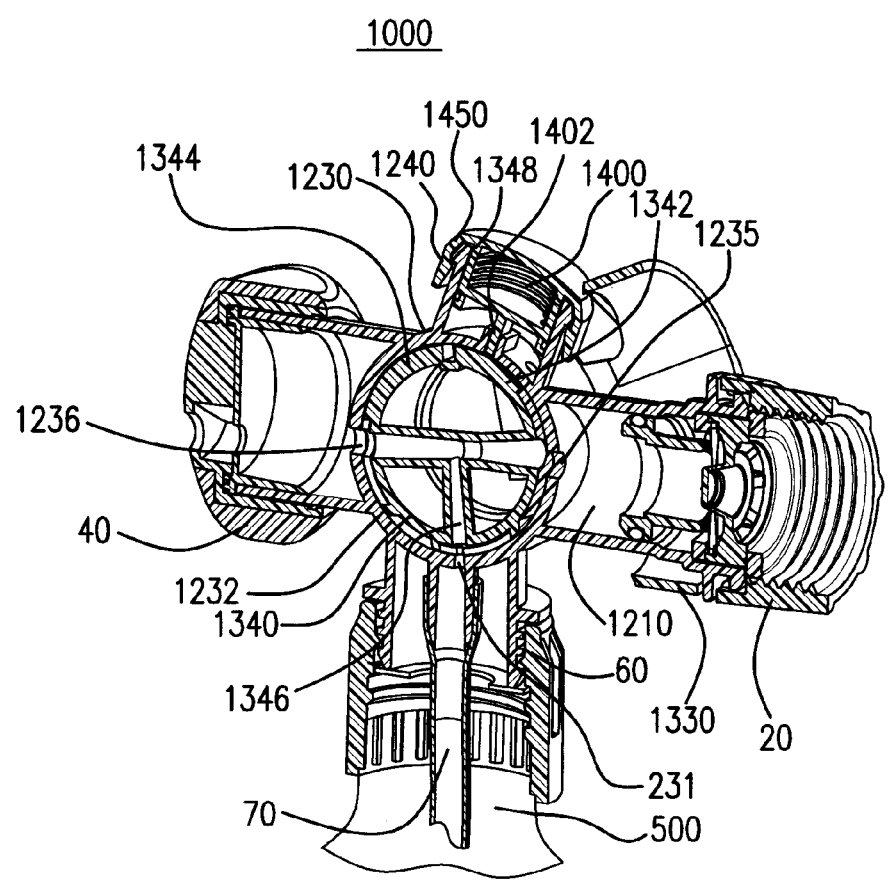
FIG. 13C is a rear perspective sectional view of the embodiment as illustrated in FIG. 12C.

FIGS. 12A, 12B, and 12C (as well as FIGS. 13A-C) respectively illustrate in sequence the closed/inactive, intermediate, and open/active positions of the central valve assembly 1300 relative to the housing's intermediate portion 1230. In accordance with this particular embodiment, the central valve assembly 1300 is mechanically interlocked to the housing 1200, preferably in its closed or inactive angular position. This mechanical interlock, which disables the central valve assembly 1300 from activation, may be properly overcome only when a sufficiently pressurized stream of fluid is suitably introduced into the flow path defined by the housing 1200. In the absence of such pressurized fluid stream, the interlocking mechanism remains engaged, inaccessible as it is from outside the housing 1200 that it cannot be readily defeated by mechanical manipulation.

In this embodiment, the main body portion 1340 is seated within a generally cylindrical chamber 1232 defined transversely through the housing's intermediate portion 1230. The main body portion 1340 is correspondingly shaped and dimensioned such that it may turn within this transverse chamber 1232 unless otherwise obstructed. Such obstruction is interposed in the form of a retractable locking member 1400 positioned within a compartment 1240 situated outside the chamber 1232. The locking member 1400 includes a protruding boss 1402 that extends into the transverse chamber 1232 when the locking member is in its locking position, to engage a recess 1348 formed in the valve assembly's main body portion 1340. The central valve assembly 1300 is thereby interlocked to the housing 1200, preferably at its inactive position.

The locking member 1400 is retained within the auxiliary compartment 1240 preferably by a retaining cap 1450. A resilient member, such as a coil spring 1420 is captured between the locking member 1400 and retaining cap 1450, biasing the locking member 1400 towards the transverse chamber 1232. The protruding boss 1402 is thus urged to extend into the chamber 1232 unless pushed back by a pressure sufficient to overcome the spring's biasing force.

Within the housing 1200, fluid flow access into and out of the transverse chamber 1232 is provided through axially opposed access openings 1235, 1236. Except at the respective outlet ends of the central valve's Venturi outlet port 1346 and fluid conduit 1342 (where suitable sealing measures 1362, 1364 are employed), sufficient (though minute) clearance is provided between the opposing surfaces of the relatively movable main body portion 1340 and transverse chamber 1232 to permit fluid communication therebetween. When a suitably pressurized stream of fluid is then directed into the flow path 1210 defined in the housing 1200, it passes through the access opening 1235 into the chamber 1232. The entering fluid quickly disperses through the clearance space between the valve's main body portion 1340 and inner walls of the chamber 1232 until the resulting build up of pressure therein urges the locking member 1400 away from the chamber 1232, causing the consequent retraction of the protruding boss 1402. Upon full withdrawal of this boss 1402 from recess 1348, the central valve 1300 is unlocked, or enabled, for angular displacement to its active configuration. A user at this point may effect the activating displacement necessary via a lever handle 1330 extending externally from the main body portion 1340.

While the valve assembly 1300 is in its active configuration, the locking boss 1402 remains retracted and out of the valve's way. When the pressurized fluid stream is interrupted, however, the opposing build up of pressure is lost, and the locking member 1400 is again freed to advance by force of the biasing spring and extend its protruding boss 1402 into the chamber 1232. This can only occur when the valve assembly 1300 is returned to its inactive configuration, and the recess 1348 comes to be aligned again with the protruding boss 1402 to receive its interlocking engagement.

Referring to the cross-wise sectional view shown in FIG. 14, certain features not visible in the lengthwise sectional views of the other FIGS. are visible here. In particular, a vent port 235 is provided to remain effectively sealed off from the other portions of the system 1000 by the central valve's main body portion 1340 and cooperating O-ring type seal members 1430, when the central valve assembly 1300 is in anything other than its active configuration. When the valve assembly 1300 is in its active configuration as shown, a corresponding vent opening 1335 formed through the sealing wall surface 1344 of the main body portion 1340 aligns with the vent port 235 to permit the required aspiration therethrough. Sufficient fluid communication occurs for adequate venting between the vent opening 1335 and the air outside the housing 1200, much as in the preceding embodiment, through unsealed joints and/or minute gaps at the interface of moving components found in the resulting structure, as well as through any supplemental apertures which may be suitably formed in the structure for that purpose.

Depending on the requirements of the intended use, it may be preferable in practice to use the hydraulic source pressure for direct control of the liquid material container's sealing valve as in the first embodiment, rather than for unlocking a valve controlled by other means, as in the present alternate embodiment. One practical drawback is that the interlocking mechanism could be damaged and/or defeated more readily by forcible means. Even so, such hydraulically activated interlock embodiment provides still a higher level of safety than heretofore afforded by comparable devices known in the art.

Numerous alternate embodiments of the present invention other than those illustrated in the FIGS. herein abound. In one such alternate embodiment, the valve assembly may be housed within the liquid material's container itself, to further guard against unwanted tampering. The container is provided with suitable inlet and outlet access points for receiving the required stream of pressurized fluid from a source and delivering the liquid material in appropriate amount for proper expulsion.

A few of the many other variations in structural embodiments formed in accordance with the present invention include, for example, the incorporation of:

1. A shuttle type check valve with a spring return (of the type illustrated in FIGS. 1-6)—but having direct feed with or without a rinse function built into the assembly.
2. A piston valve on a liquid material feed line with a control valve (digital or metering) downstream of the piston but before Venturi introduction into the pressurized fluid stream.
3. A control knob which is spring loaded on axis to be biased down against a gear or toothed/splined surface to prevent rotation, wherein fluid pressure pushes the control knob away from gear teeth/splined surface to allow free rotation.
4. A piston valve located in the throat or neck of the liquid material container such that when the sprayer is removed, the contents remain protected (contained safely within the container), its flow from the container being permitted only when a suitable sprayer is attached to the container and fluid pressure is provided to move the piston valve (to open flow access and admit atmospheric pressure into the container).
5. A piston valve located onboard a sprayer device but extending a push rod into a cavity in an actuating valve disposed at the liquid container's neck to open a port for product flow from container into the sprayer device.

6. Bellows within a sprayer device which expands when fluid pressure is provided to push a rotating, swinging, or sliding valve to open a port for product flow from the container, and which self-retracts under its own molded/formed-in spring force.
7. Bellows within a sprayer device which expands when fluid pressure is provided to push a rotating element that actuates a push rod (on the sprayer device), and which extends into the container's neck to actuate a valve to open a port for product flow from container into sprayer device.
8. Measures to use Venturi-generated vacuum to apply differential pressure to a piston valve which then opens one or more ports to the container.
9. User control means having a two-piece telescoping structure, in which the interior comprises a piston like arrangement. When water or other fluid is present and pressurized, the control knob is expanded so that surface gear teeth formed at a bottom surface engage with a corresponding rack formed on a sliding valve mechanism controlling the ports to the given container(s). A spring mechanism biases such telescoping control knob in its closed condition.

In addition to that described herein, use of hydraulic pressure to "un-lock" a valve assembly to allow dispensing may operate in several different manners depending on the particular application and type of aspiration device used within a sprayer dispenser type device. It certain embodiments, the hydraulic pressure may simply force a spring loaded pin to move, unlocking the control assembly for activation by rotating and/or sliding movement, for example. In other embodiments, the hydraulic pressure may force a spring return spool valve to slide to a position which places the container contents in communication with appropriate openings/orifices formed in the sprayer dispenser device.

For applications utilizing a Venturi style aspiration technique, the hydraulically activated interlock/seal mechanism may form a part of a back flow prevention device typically required for hose end mounted dilution systems. For units using a flow-by style of aspiration (no back flow prevention required), the interlock/seal mechanism may form a part of a carrier stream flow control assembly, such that the mechanism is operable responsive to applied hydraulic pressure, irrespective of carrier stream control assembly's condition (static or dynamic).

In-Neck Embodiments

Referring now to FIGS. 16A-16C and 17A-17D, there is illustratively shown an alternate embodiment of the present invention wherein a system 2000 for controlling the safe dispensing (and storage) of a given liquid material includes an operative portion which is intimately disposed within an access opening of the liquid material's storing container. A response valve portion 2400, for example, in such embodiments may be captured substantially within the container's neck to selectively seal and unseal the access opening for controlled access to the container's contents. As in preceding embodiments, a control valve portion 2300 serves to receive and suitably direct a pressurized stream of fluid, when necessary, to the response valve portion 2400. The control valve portion 2300 also serves much as a protective cap which shields and conceals the response valve portion 2400 within the container's neck, guarding effectively against tampering or other harmful manipulation.

The 'in-neck' sealed disposition of the response valve portion yields a number of other practical advantages. For example, the control valve portion's ready detachability from the response valve portion (and container) permits its removal without fear of spillage, where potential snagging or rough handling is of concern. Safer containment of the liquid material may very well be had in those situations by detaching and separately packaging/stowing the control valve portion, leaving the container sealed by the substantially concealed response valve portion. Doing so would incidentally also afford greater flexibility in packaging and/or shipping options, enhancing the overall reliability of such.

As illustrated in FIGS. 17A-17D, the system 2000 formed in accordance with the exemplary embodiment shown generally includes a control valve portion 2300 removably coupled, preferably, to a neck portion 520 of a container 500 storing the liquid material to be dispensed. The system 2000 further includes a response valve portion 2400 preferably disposed to extend into and substantially fill and seal the bore-like access opening defined by the container's neck portion 520. The response valve portion 2400 may be secured in fluid-tight manner therein by any suitable means known in the art, such as welding, adhesive coupling, force fit frictional engagement, and the like. A suction tube 70 extends from the response valve portion 2400 into the container's storage compartment 510 to conduct the liquid material's passage therebetween.

In overall operation, the control valve portion 2300 serves both as a conduit for appropriately directing an incoming pressurized stream of fluid (separately supplied from an external source), and as an effective staging/mixing vessel for properly expelling the liquid material drawn out of the container 500 with a portion of the pressurized fluid stream. Preferably, the control valve portion 2300 is selectively configurable by the user to enable or disable the response valve's actuation.

When the control valve portion 2300 is configured in its enabled, or on state ("MIX" setting in the embodiment shown), it directs at least a portion of the incoming fluid pressure to operate sufficiently upon the response valve portion 2400 and thereby effect its pressure-responsive actuation. The response valve portion 2400 preferably employs a movable member resiliently biased to either an open or closed position/configuration. Responsive to sufficient application of fluid pressure thereon, the movable member operates against the bias to move away from its default position or configuration. Preferably, this concurrently unseals both an admission port and one or more vent openings to establish an exit flow of the contained liquid material to and through an admission port 2315 which passes through the control valve portion 2300 for proper expulsion therefrom.

As illustrated in FIGS. 18A-18G, the control valve portion 2300 preferably includes in this embodiment a housing 2310 having an inlet part 2311, an outlet part 2312, and an intermediate part 2313 extending therebetween. As in preceding embodiments, the inlet and outlet parts 2311, 2312 may be equipped respectively with an anti-siphon device and a spray nozzle or other such dispersion head, as well as any other suitable components known in the art for effectively receiving an externally supplied stream of pressurized fluid and expelling a liquid mixture in suitable manner.

The housing's intermediate part 2313 preferably defines a mixing chamber 2314 communicating with both the inlet and outlet parts 2311, 2312. Extending from the mixing chamber 2314 is an admission port 2315 preferably configured to be directed towards the responsive valve portion 2400 during system use.

The control valve portion 2300 further includes an adapter 2360 suitably configured to fasten the housing 2310 to the container's neck portion 520. The securement may be realized by threaded coupling as shown, or by any other suitable measures known in the art.

Received within the mixing chamber 2314 are a manifold member 2320 and a control member 2330, captured therein by an actuating handle member 2350. The control member 2330 is preferably coupled for rotation relative to the housing's intermediate part 2313, responsive to the handle member 2350 being manipulated by the user to one of a plurality of selective settings, such as the OFF, RINSE, and MIX settings shown. To seal against the seepage of liquid from the mixing chamber 2314 between adjoining surfaces of the control member 2330 and housing 2310, one or more seal members 2329, such as rubber o-rings and the like, are preferably disposed about the control member 2330. In addition, a resilient outlet seal member 2339 is captured by the control member 2330 against the corresponding wall surfaces of the housing's intermediate part 2313 to preserve fluid seal at the point of fluid expulsion from the mixing chamber to the outlet part 2312.

At the base of the housing's mixing chamber 2314 are formed a pair of openings, the admission port 2315 and a fluid injection port 2316. The admission port 2315 serves as an entry portal through which the liquid material drawn from the container 500 is received into the mixing chamber 2314 just prior to its mixing and expulsion through the outlet 2312, preferably with a portion of the pressurized fluid stream. The fluid injection port 2316 serves as an exit portal through which pressurized fluid is passed from the mixing chamber 2314 towards the response valve portion 2400 for its actuation.

The manifold member 2320 is received at the base of the housing's mixing chamber 2314. Manifold member 2320 is formed with an upper plate 2321 in which are formed a pair of through passages 2325, 2326 corresponding respectively to the housing's admission and fluid injection ports 2315, 2316. First and second guiding grooves 2322, 2323 are suitably formed into the manifold's upper plate 2321 to extend respectively from the passages 2325 and 2326, separated one from the other. When fully assembled with the other parts of the control valve portion 2300, these guiding grooves 2322, 2323 serve to appropriately guide the given liquid material or fluid stream from or to the corresponding through passage 2325, 2326.

The control member 2330 is formed with upper and lower plates 2331, 2332 axially spaced one from the other by one or more suitably configured partitioning walls 2333. These partitioning walls 2333 partition the space bounded by the upper and lower plates 2331, 2332 to preferably include an inlet compartment 2334a, an intermediate compartment 2334b, and an outlet compartment 2334c.

The control member defines a fluid conduit 2337 to connect the inlet and outlet compartments 2334a and 2334c for the passage of a pressurized fluid stream portion therethrough. A Venturi aperture 2338 is formed to branch transversely from the fluid conduit 2337 to a first through opening 2335 formed at the lower plate 2332.

As mentioned, the lower plate 2332 is formed with a first through opening 2335. The lower plate 2332 is additionally formed with at least one second through opening 2336 offset from the first through opening 2335. The control member 2330 is displaceably disposed within the mixing chamber 2314 (relative to both the mixing chamber 2314 and manifold member 2320); and, the first and second through openings 2335, 2336 situated on the control member 2330 such that they vary in alignment with their respective first and second grooves 2322 and 2323 on the manifold member, depending on the selected angular position of control member 2330. In the exemplary embodiment shown, the first and second through openings 2335 and 2336 are preferably disposed to both align concurrently with their corresponding grooves 2322, 2333 in accordance with one position of the control member 2330, and to both be displaced (and substantially in fluid isolation) from their respectively corresponding grooves 2322 and 2323 in accordance with another position of the control member 2330. The user may thus selectively set the alignment or isolation of the first and second through openings 2335, 2336 (relative to the first and second manifold grooves 2322, 2323) by rotating the control member 2330 within the housing 2310, via the actuating member 2350.

When the first through opening 2335 is at least partially aligned with the first manifold guiding groove 2322, the Venturi aperture 2338 (hence, the fluid conduit 2337) is placed in communication with the manifold's first through passage 2325, and in turn with the housing's admission port 2315, thereby establishing a continuous path of flow for any liquid material which may be drawn from the container 500 through the response valve portion 2400. When the second through opening 2336 aligns with the second manifold guiding groove 2323, it is placed in communication with the manifold's second through passage 2326, and in turn with the housing's fluid injection port 2316, thereby establishing a continuous path of flow for a portion of the pressurized fluid stream from the control member's intermediate compartment 2334b to the response valve portion 2400.

These operations are concurrently effected given the structural configuration employed in the illustrated embodiment. They may be separately effected in certain other alternate embodiments.

The upper and lower plates 2331, 2332 of the control member 2330 serve effectively as the ceiling and floor surfaces bounding the compartments 2334a, 2334b, and 2334c. As such, they serve as fluid-retaining barriers within the mixing chamber (except, of course, where fluid/liquid material passage is otherwise provided for therethrough, in accordance with the present invention). In order to preserve their sealed engagement against the surrounding inner wall surfaces of the mixing chamber 2314, each upper and lower plate 2331, 2332 is preferably formed with an annular groove 2331', 2332' formed peripherally thereabout. Each peripheral groove 2331', 2332' snugly receives a corresponding seal member 2329 for its secure capture against the surrounding inner wall surfaces of the mixing chamber 2314. Sealed yet slidable engagement is thereby realized between the control member 2330 and those surrounding wall surfaces of the mixing chamber 2314.

The control member 2330 is retentively captured over the manifold member 2320 by the actuating member 2350. This actuating member 2350 is suitably coupled to the control member 2330 and displaceably fastened to the housing 2310 by any suitable means known in the art. In the exemplary embodiment shown, the actuating member 2350 is formed much like a snap-fit cap fitted to the otherwise open upper end of the housing's intermediate part 2313. The actuating member 2350 is formed, for example, with a downwardly-extending skirt portion 2351 from which an annular ridge 2352 radially protrudes. The annular ridge 2352 slidably engages an annular recess 2317 correspondingly formed in the inner sidewall surrounding the housing's mixing chamber 2314 to both lock the actuating member to the housing 2310 and guide its displacement relative thereto.

Actuating member 2350 is preferably also formed with a locking arm 2353 which extends to lockingly engage and transfer the actuating member's rotational displacement the control member 2330. Actuating member 2350 is preferably formed further with one or more marks 2354 or other indicia placed on the skirt portion 2351 to be visible through one or more windows 2318 formed through the sidewall of the housing's intermediate part 2313. In conjunction with indicia 2319 formed on the intermediate part 2313 to identify different selective settings for the system 2000, then, the mark 2354 when viewed through a window 2318 provides for the user visual indication of the selected setting. The user may reconfigure the system based on this indication accurately to a desired setting by the turn of a handle 2355 provided on the control member 2350.

In the illustrated embodiment, components of the control valve portion 2300 may be formed of any suitable materials known in the art. For example, the housing 2310, manifold member 2320, control member 2330, and actuating member 2350 may be suitably formed of a plastic or other such material of sufficient strength, rigidity, and liquid-impermeability appropriate for the intended application. Components such as the seal members 2329, 2339 are preferably formed of a rubber, foam, or any other suitable material having sufficient resilience and water-impermeability to effect a reliable seal against liquid seepage in their respective uses. The actual materials used for these and other components of the disclosed system 2000 will depend upon the requirements and available resources of the particular application intended; and, the present invention is not limited to the particular types of materials actually employed. What is more, certain of the components shown to be separate, discrete, and detachable from one another (when disassembled) may in alternate embodiments be formed to a suitable extent as portions of one or more integrally formed parts, depending again on the specific requirements and available resources of the intended application.

Figure 19A:
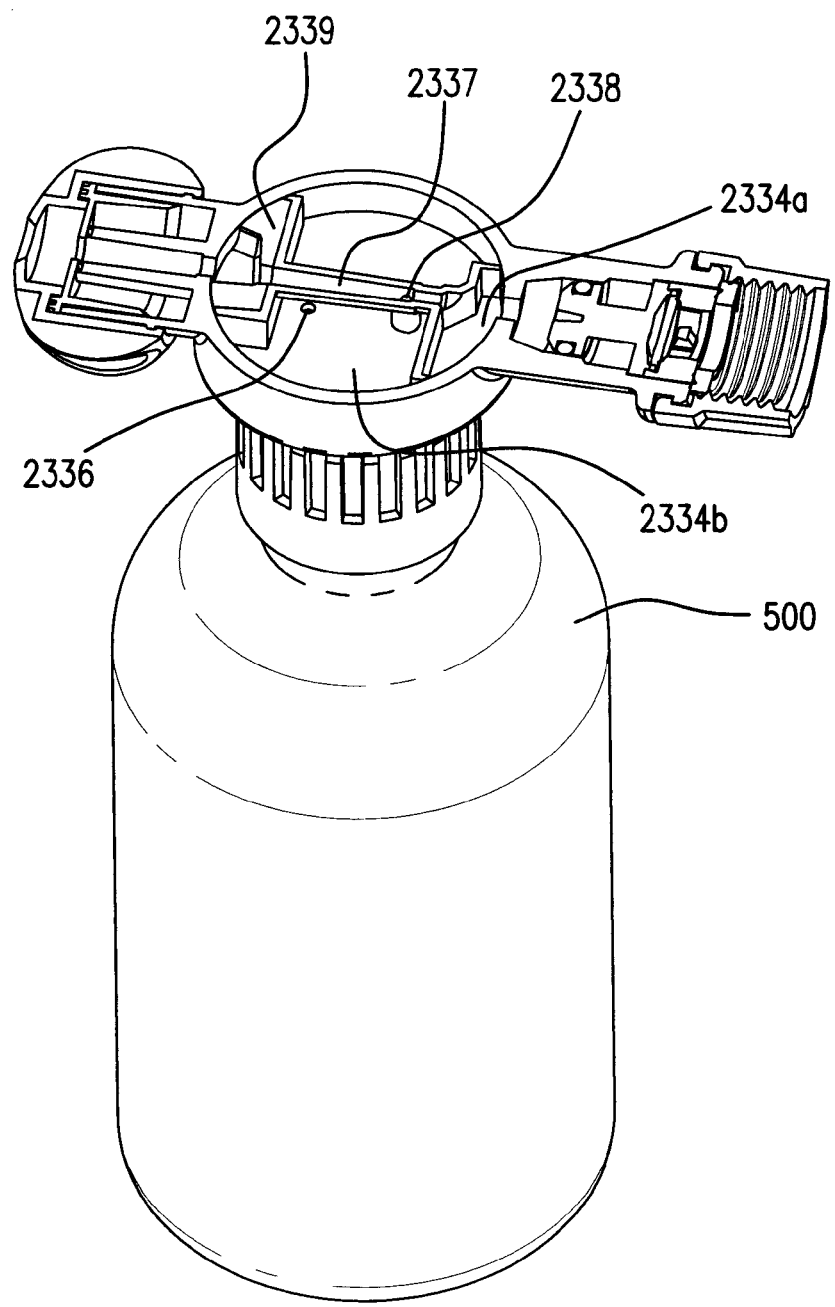
FIG. 19A is a horizontally sectioned perspective view of a portion of the embodiment shown in FIG. 16A, in a "MIX" configuration.
Figure 19B:
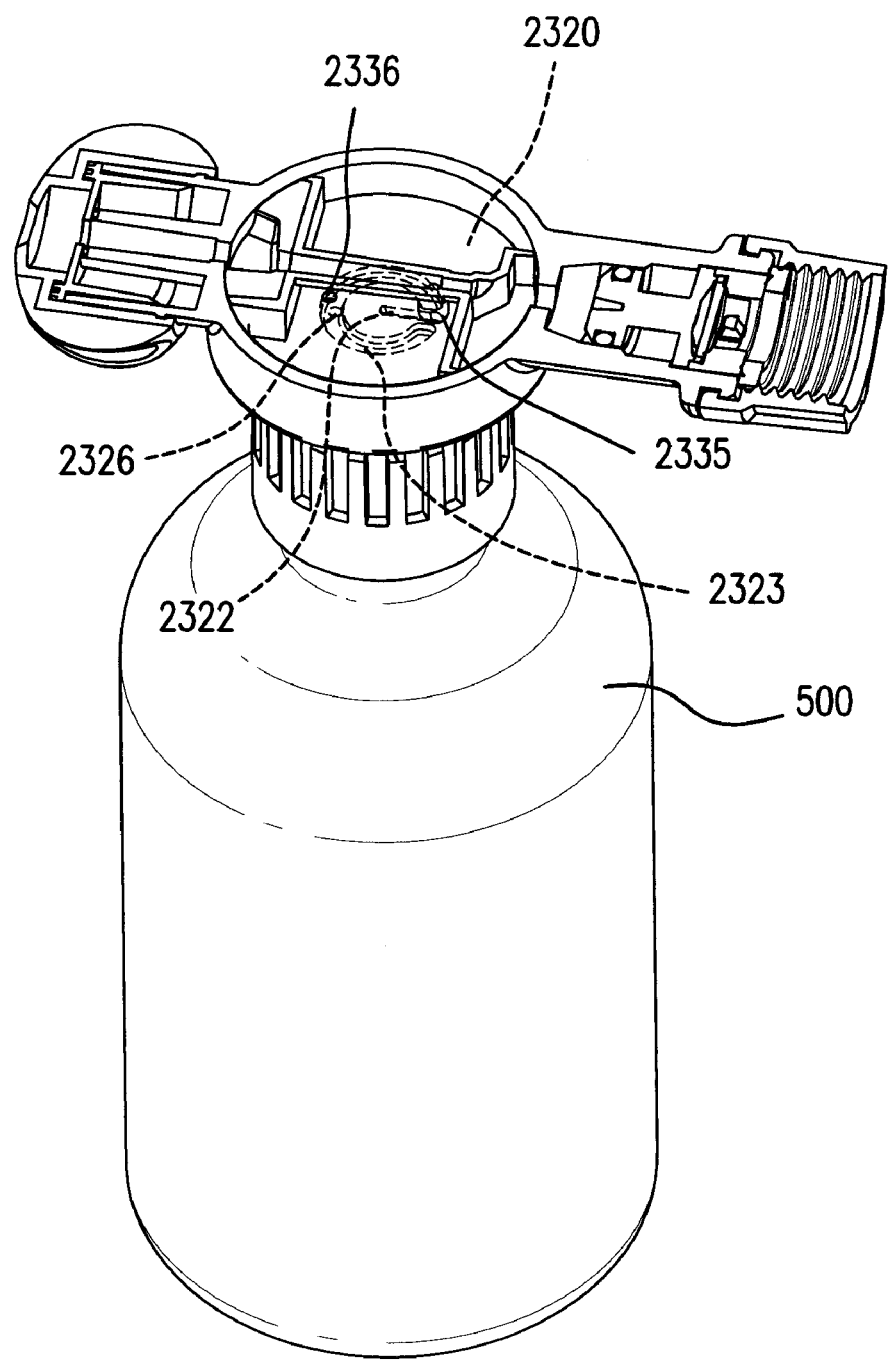
FIG. 19B is the horizontally sectioned view of FIG. 19A, with certain hidden details shown in phantom.
Figure 20A:
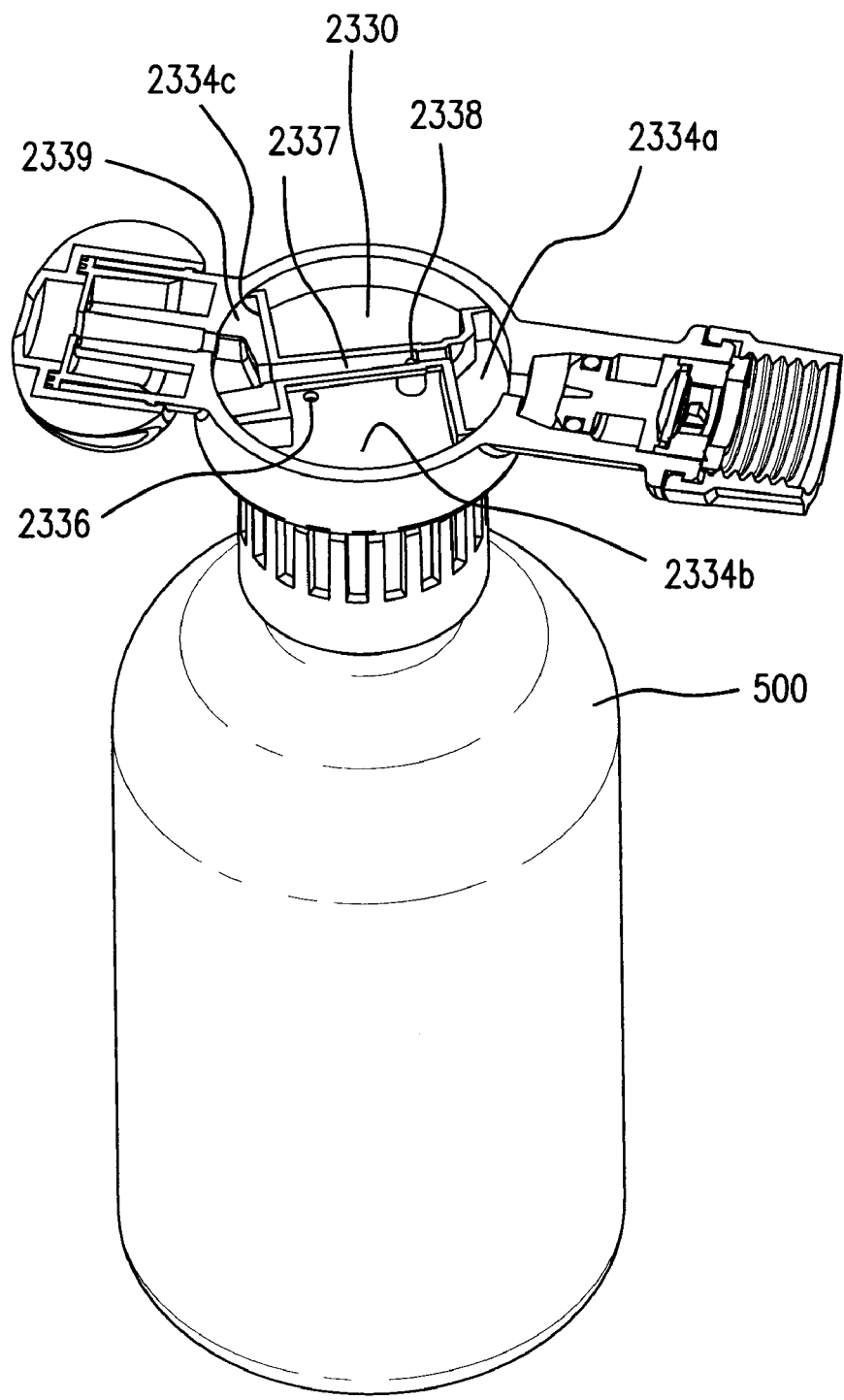
FIG. 20A is a horizontally sectioned perspective view of a portion of the embodiment shown in FIG. 16A, in a "RINSE" configuration.
Figure 20B:
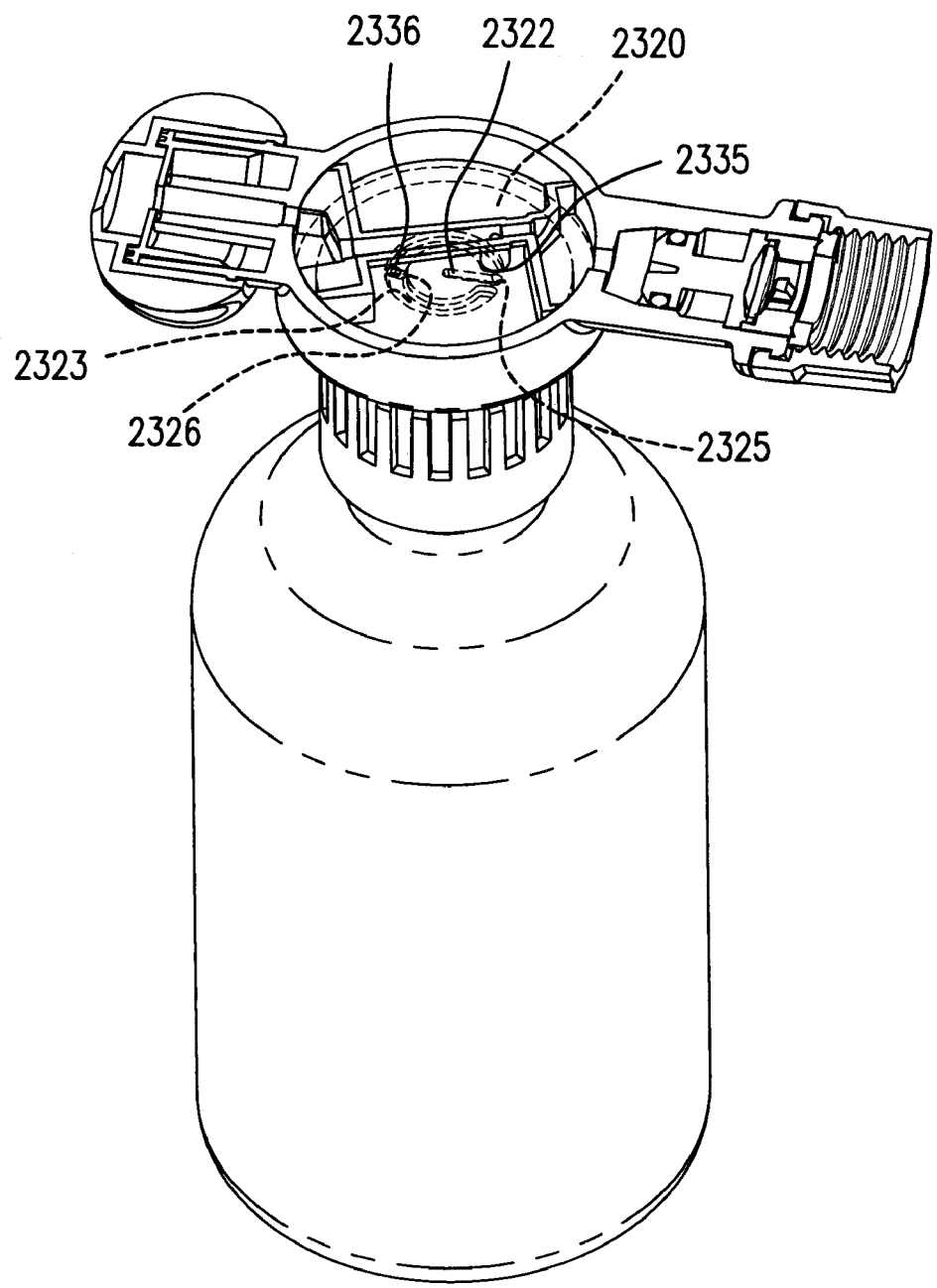
FIG. 20B is the horizontally sectioned view of FIG. 20A, with certain hidden details shown in phantom.
Figure 21A:
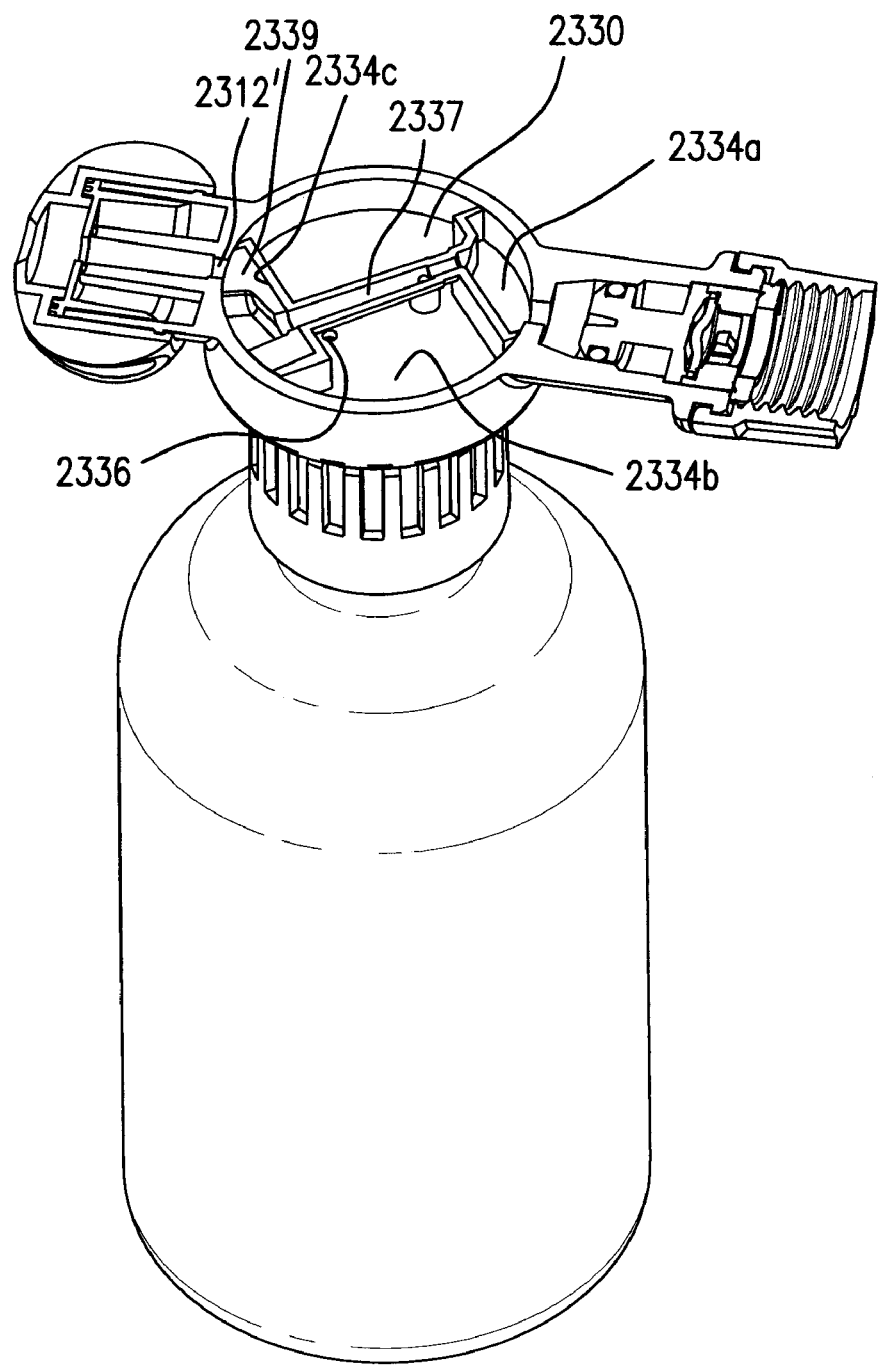
FIG. 21A is a horizontally sectioned perspective view of a portion of the embodiment shown in FIG. 16A, in a "OFF" configuration.
Figure 21B:
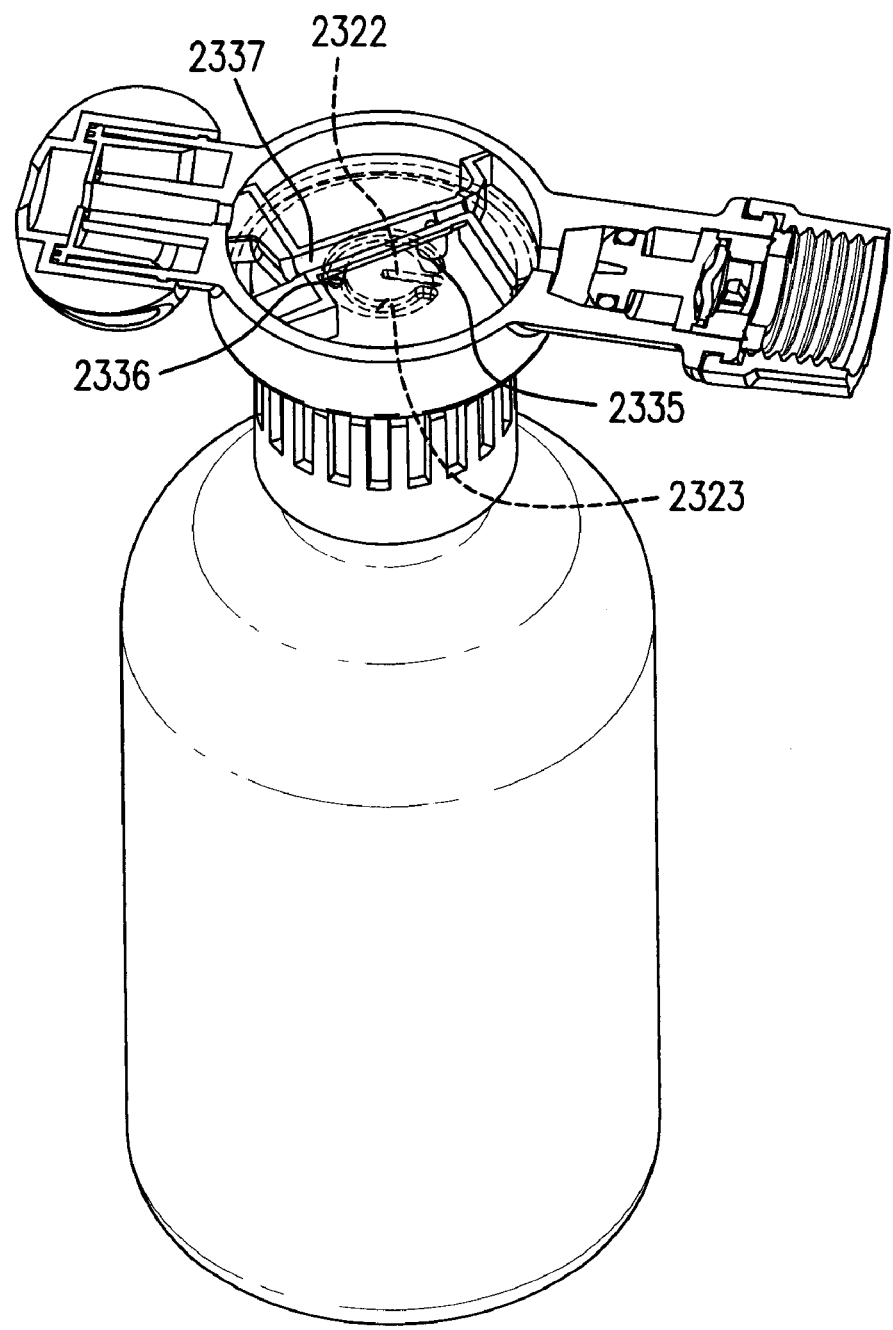
FIG. 21B is the horizontally sectioned view of FIG. 21A, with certain hidden details shown in phantom.

Turning now to FIGS. 19A-19B, 20A-20B, and 21A-21B, there are shown for illustrative purposes cut away views of a lower section of the control valve portion 2300—respectively in the "MIX" (or ON) configuration, the "RINSE" (or BYPASS) configuration, and the "OFF" configuration selectively available for the user in the embodiment shown. FIGS. 19B, 20B, and 21B are identical to their accompanying views 19A, 20A, and 21A, except that the underlying details otherwise hidden by the control member 2330 are more discernibly depicted in phantom view.

In the "MIX" configuration of FIGS. 19A-19B, both the first and second through openings 2335 and 2336 of the control member 2330 are aligned with their corresponding guiding grooves 2322 and 2323 formed in the upper surface of the manifold member 2320 underneath. When a pressurized stream of fluid is introduced through the housing's inlet 2311, it passes through the inlet opening 2311' and enters the inlet chamber 2334a. A portion of the entering fluid passes into and through the fluid conduit 2337, while the remaining fluid fills the inlet chamber 2334a and disperses around the unsealed free edges of the partitions 2333 into the intermediate compartment 2334b. The rapidly filling fluid then passes via the second through opening 2336 formed in the floor plate of the control member 2330 into the second groove 2323, and from there follows the manifold's second through passage 2326 to and through the housing's injection port 2316. This fluid then emerges from the injection port 2316 and enters to enable the response valve portion 2400.

An aspiration flow path is then created for the liquid material from the container's storage compartment 510—through the response valve portion 2400, the housing's admission port 2315, the manifold member's first through passage and guiding groove 2325, 2322, and the control member's first through opening 2335 and Venturi aperture 2338—to its fluid conduit 2337. At that point, venting of the container's storage compartment 510 is accordingly effected by the response valve portion 2400 (as described in following paragraphs), whereupon a vacuum condition (which in turn yields sufficient suction) is generated through the aspiration flow path as the pressurized fluid stream flows through the fluid conduit 2337. The stored liquid material is thus drawn out of the container's storage compartment 510 and directed eventually through the Venturi aperture 2338 and into the path of the fluid stream flowing in the fluid conduit 2337. The resulting mixture of the drawn liquid material and flowing fluid is expelled through the outlet seal 2339 and the housing's outlet aperture opening 2312'.

As mentioned, the migration of fluid from the inlet compartment 2334a of the control member 2330 into its intermediate compartment 2334b is preferably permitted in the exemplary embodiment shown through the unsealed seams or spaces between the control member's partitions 2333 and the surrounding walls of the housing's mixing chamber. The sealing engagement of the resilient members 2329 against the immediately surrounding wall surfaces of the housing otherwise contain the fluid within the intermediate compartment 2334b for delivery to the response valve portion 2400.

In alternate embodiments, delivery of the actuating fluid pressure to the response valve portion 2400 may be effected by other suitable means. For example, delivery may be effected by direct injection through a dedicated coupling to an external source, apart from any control valve portion as shown.

Referring now to the configuration illustrated in FIGS. 20A-20B, the control member 2330 is shown angularly positioned in its "RINSE" position, wherein its Venturi aperture 2338 and first through opening 2335 are no longer aligned with the manifold member's first surface groove 2322. The Venturi aperture 2338 is thus isolated from the manifold member's first passage 2325, hence isolated from the response valve portion 2400. The aspiration flow path is thus interrupted, and withdrawal of the liquid material from the container 500 consequently disabled.

As in the "MIX" configuration, however, fluid entering the inlet compartment 2334a still migrates to the intermediate compartment 2334b and the response valve portion 2400 through the fluid injection path, but to no effect in terms of aspiration. While the venting path may be opened, and the response valve portion actuated to its open configuration as a result, blockage of the aspiration flow path at the control and manifold members' interface keeps the aspiration flow path from being fully established. The fluid stream entering the fluid conduit 2337 simply continues on through to the outlet part 2312 free of any liquid material infusion therein.

The second guiding groove 2323 of the manifold member 2320 is formed in this exemplary embodiment to preserve an open fluid injection path regardless of the selected mode of operation. This helps to maintain a measure of fluid pressure relief to accommodate the pressurized fluid stream's introduction into the control valve portion 2300, irrespective of the selected operational configuration. That is, in each of the "MIX," "RINSE," and "OFF" configurations of the system 2000, the control member's second through opening 2336 preferably maintains alignment (and open communication) with the manifold member's second guiding groove 2323. This need not be the case in alternate embodiments, wherein such alignment may be effected only in a particular predetermined setting(s), for example.

Referring to the configuration illustrated in FIGS. 21A-21B, the control member 2330 is shown angularly positioned in its "OFF" position, wherein its Venturi aperture 2338 and first through opening 2335 are again out of alignment with the manifold member's first surface groove 2322, and therefore isolated from the manifold member's first passage 2325 and the response valve portion 2400. The aspiration flow path thus remains interrupted, and withdrawal of the liquid material from the container 500 disabled. Likewise, the opening of the outlet seal 2339 is turned past the outlet opening 2312', such that the fluid entering the fluid conduit 2337 is sealed against further passage. No fluid flow or liquid material draw may occur through the system 2000 in this setting.

The intermediate part 2313 of the housing 2310 may be coupled to an opening of the container 500 by any suitable means known in the art. In the embodiment shown, the intermediate part 2313 is preferably coupled in detachable manner to a neck portion 520 of the container 500 by a collar-like adapter 2360. This adapter 2360 is configured to extend about the admission and fluid injection ports 2315, 2316, and preferably engages the container's neck portion 520 in threaded manner, so as to situate the ports 2315, 2316 in suitable alignment with corresponding points of the response valve portion disposed within the container neck portion 520. As shown best in FIGS. 18D and 18F, one or more seal members 2365a, 2365b are suitably configured and positioned beneath the intermediate part 2313 to ensure sealed isolation between the admission and fluid injection ports 2315, 2316 (and from the surrounding portions within the space encircled by the adapter 2360) upon coupling to the response valve portion 2400. In the embodiment shown, these seal members 2365a, 2365b are formed as O-ring type seals concentrically disposed—the first preferably to extend circumferentially about just the admission port 2315, the other preferably disposed circumferentially about both the admission and fluid injection ports 2315, 2316.

Figure 22A:
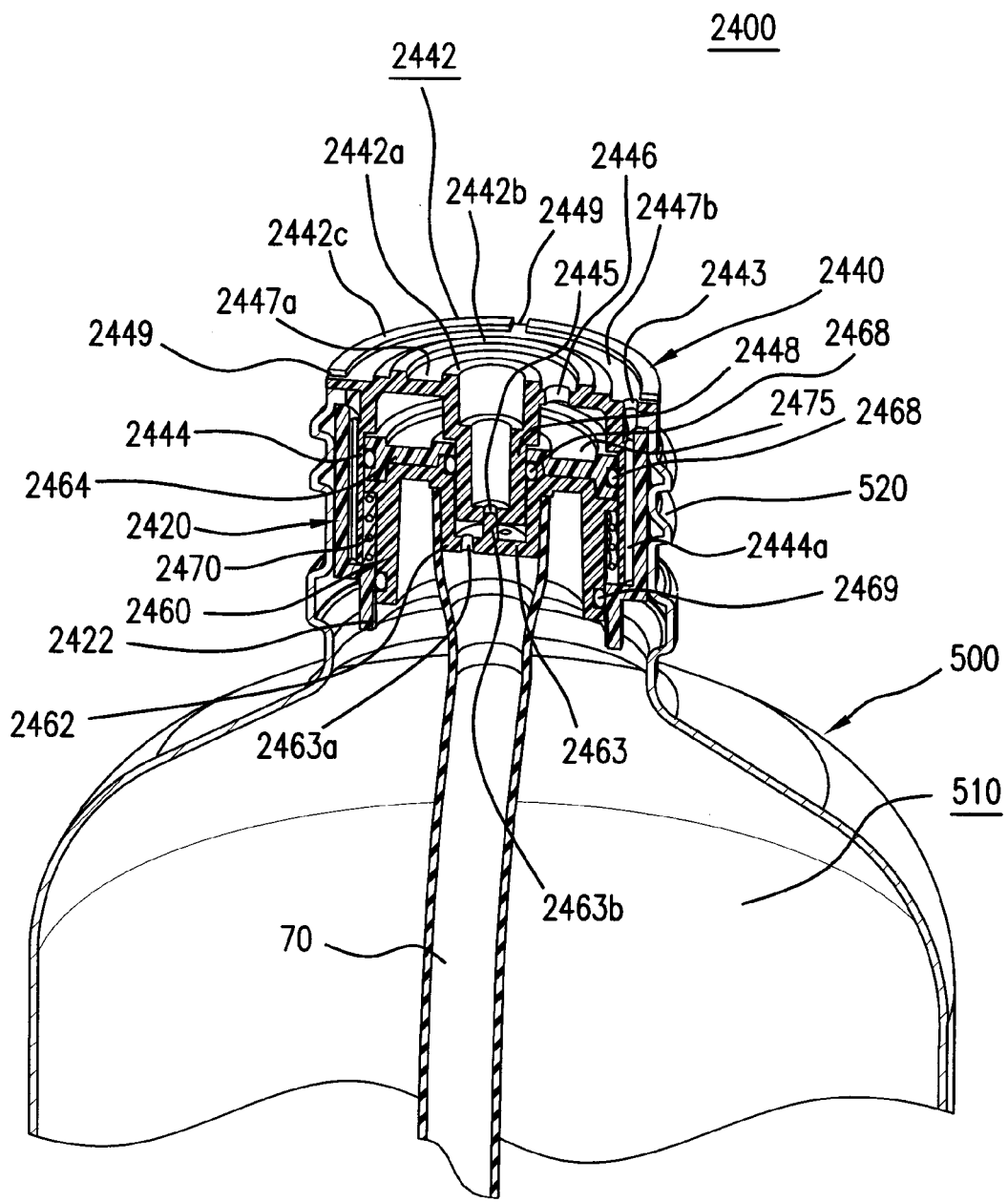
FIG. 22A is a perspective sectional view, partially cut away, of a portion of the embodiment shown in FIG. 16A, in a closed state.
Figure 22B:
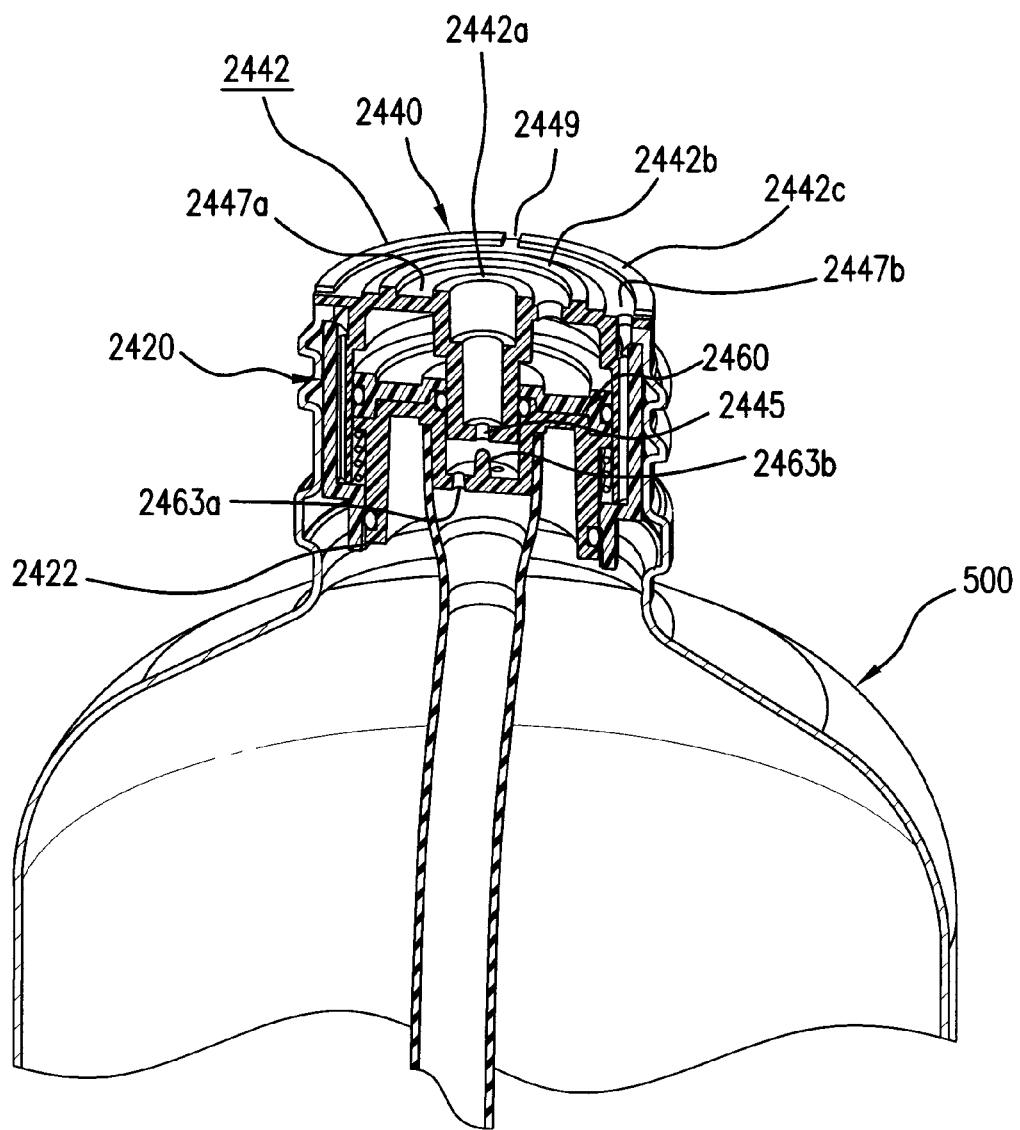
FIG. 22B is a perspective sectional view of the portion shown in FIG. 22A, in an opened state.
Figure 22C:
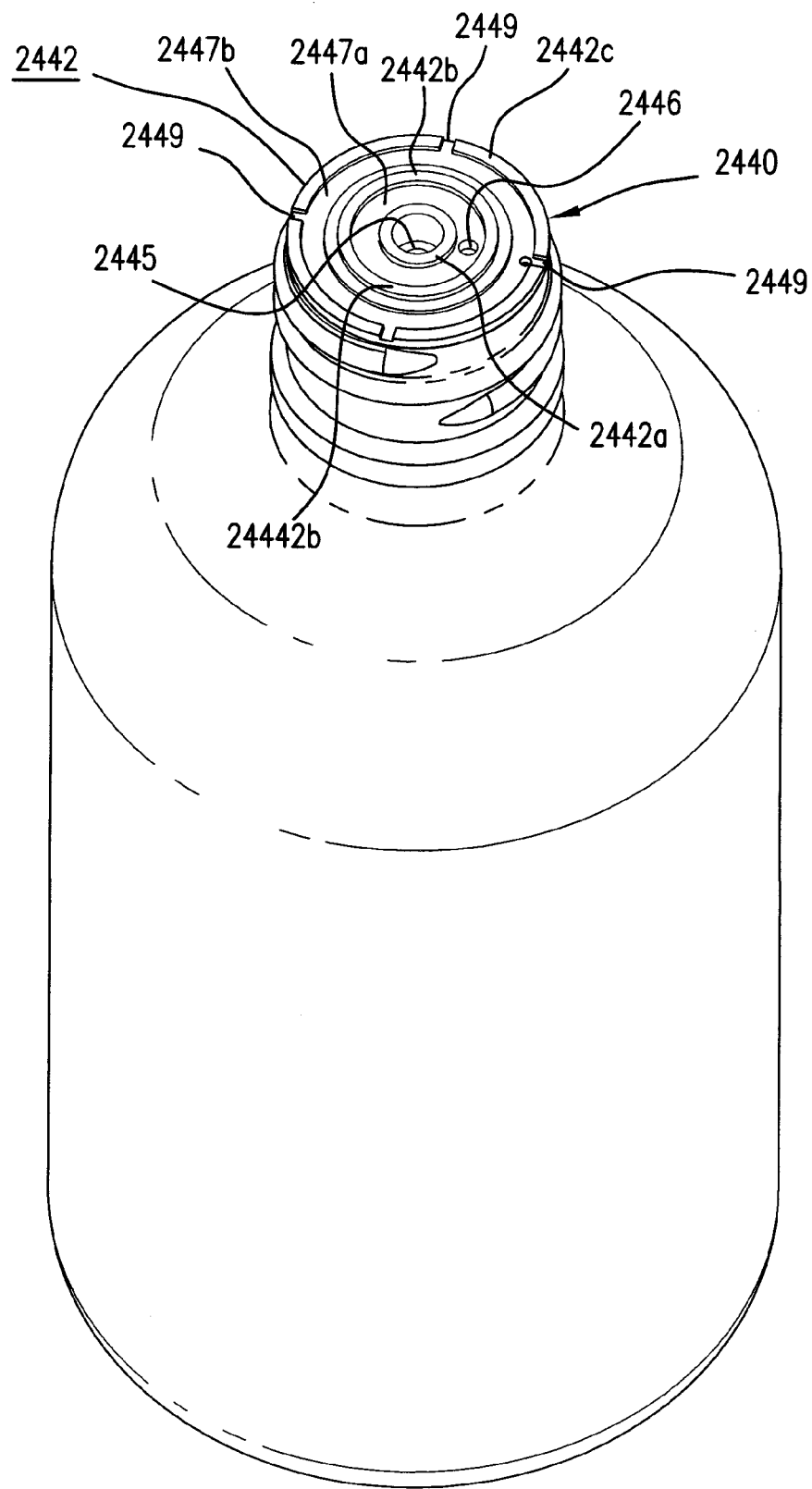
FIG. 22C is a perspective view of the a portion of the embodiment shown in FIG. 16A.
Figure 23:
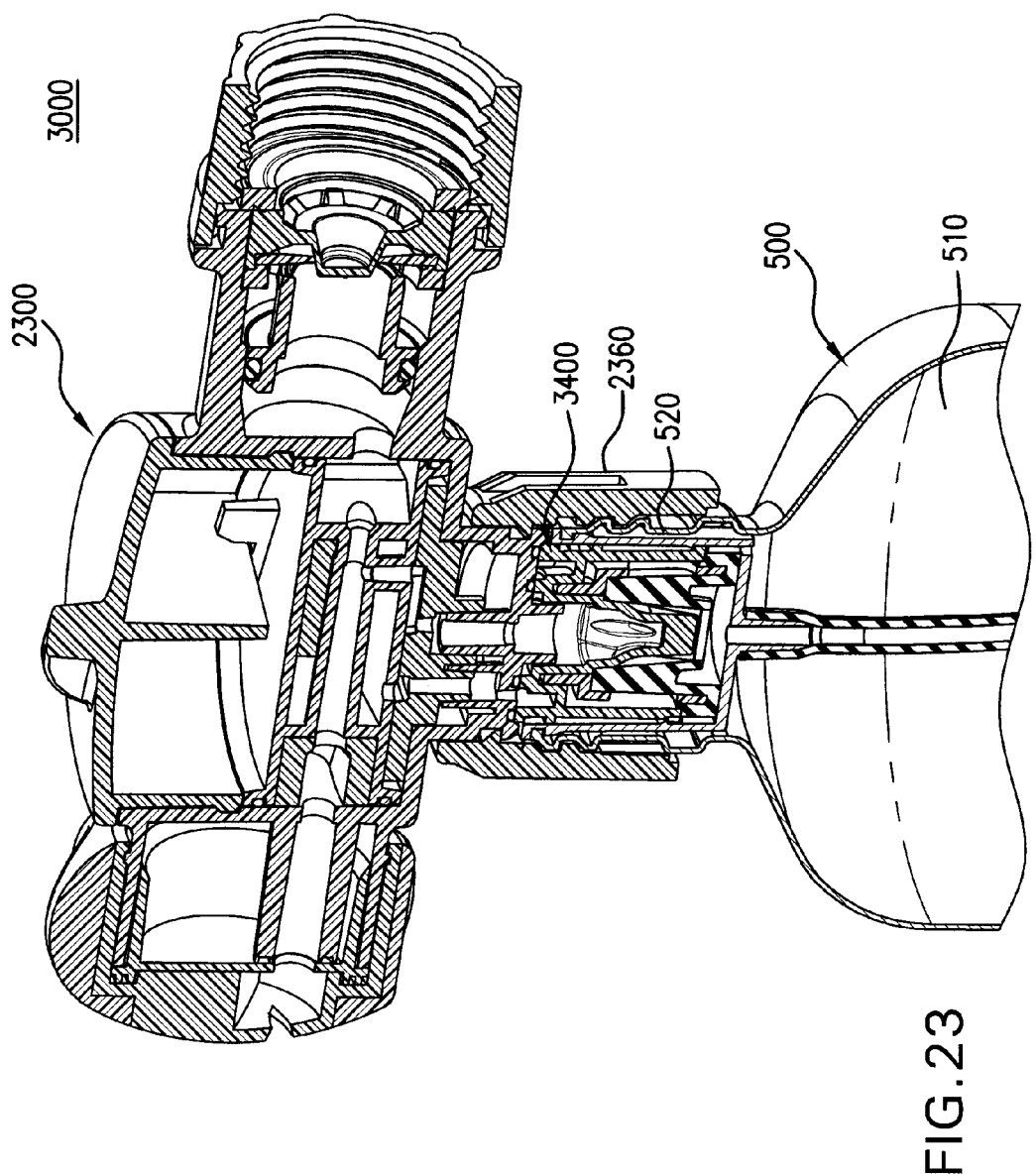
FIG. 23 is a perspective sectional view, partially cut away, of another alternate in-neck embodiment of the present invention.
Figure 24:
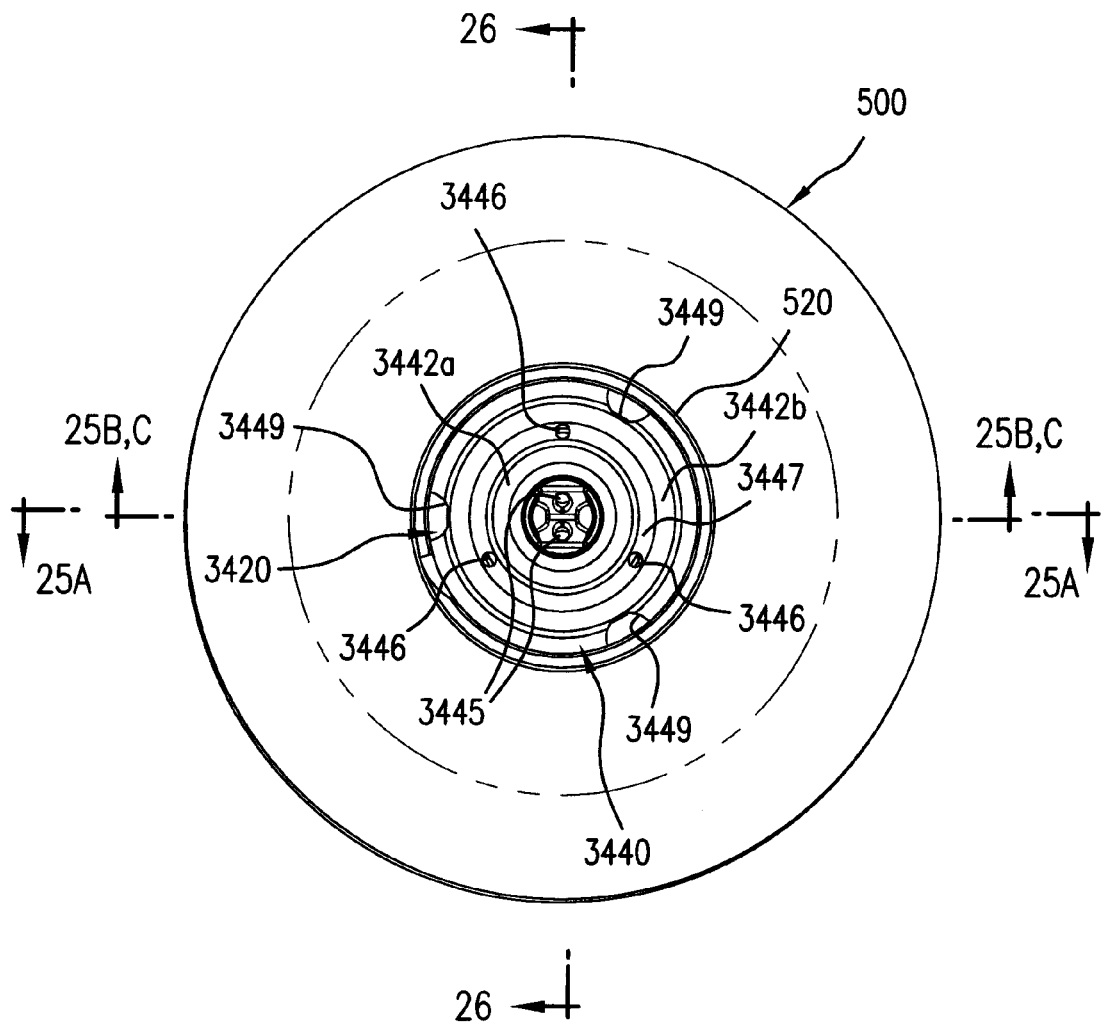
FIG. 24 is a plan view of a portion of the embodiment shown in FIG. 23.
Figure 25B:
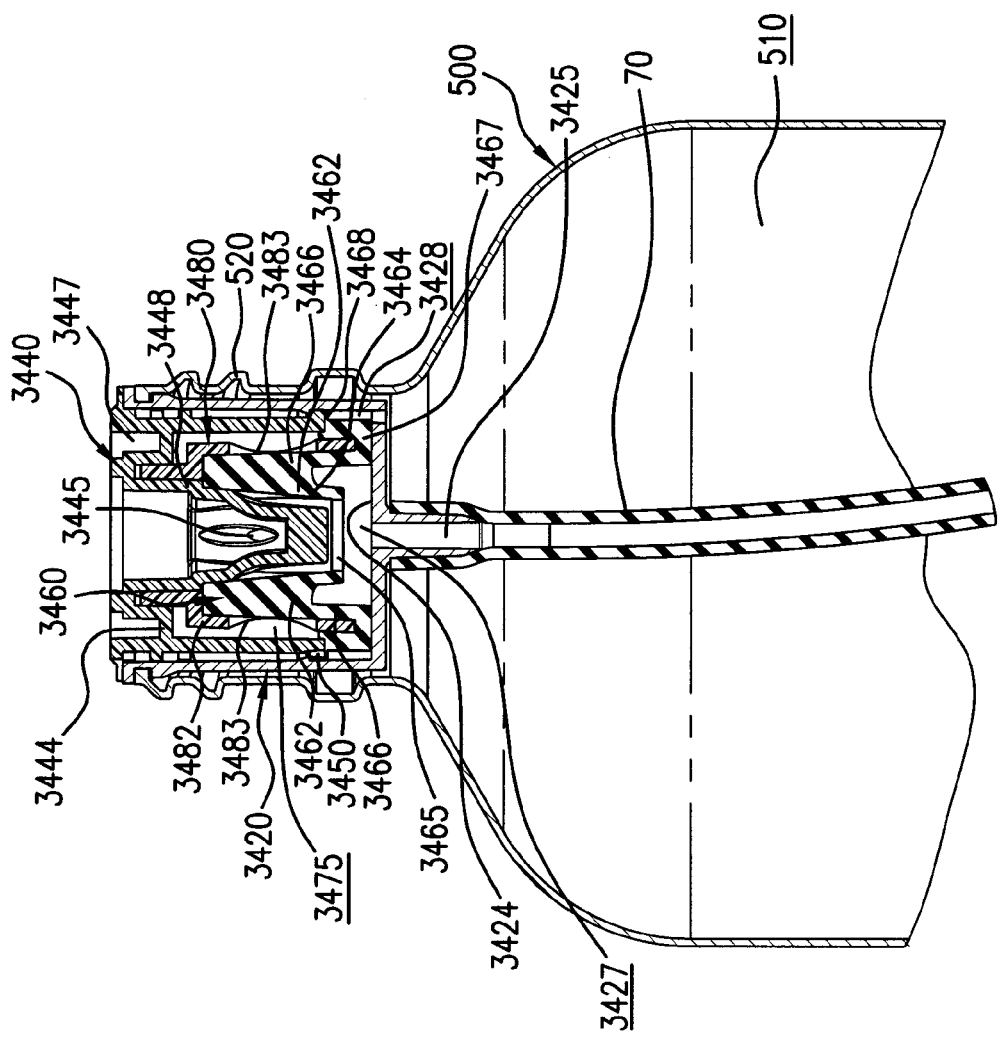
FIG. 25B is a sectioned elevational view of the portion of the embodiment shown in FIG. 24, taken along a centered second sectional plane, as viewed along a direction opposing the view direction of FIG. 25A.
Figure 25C:
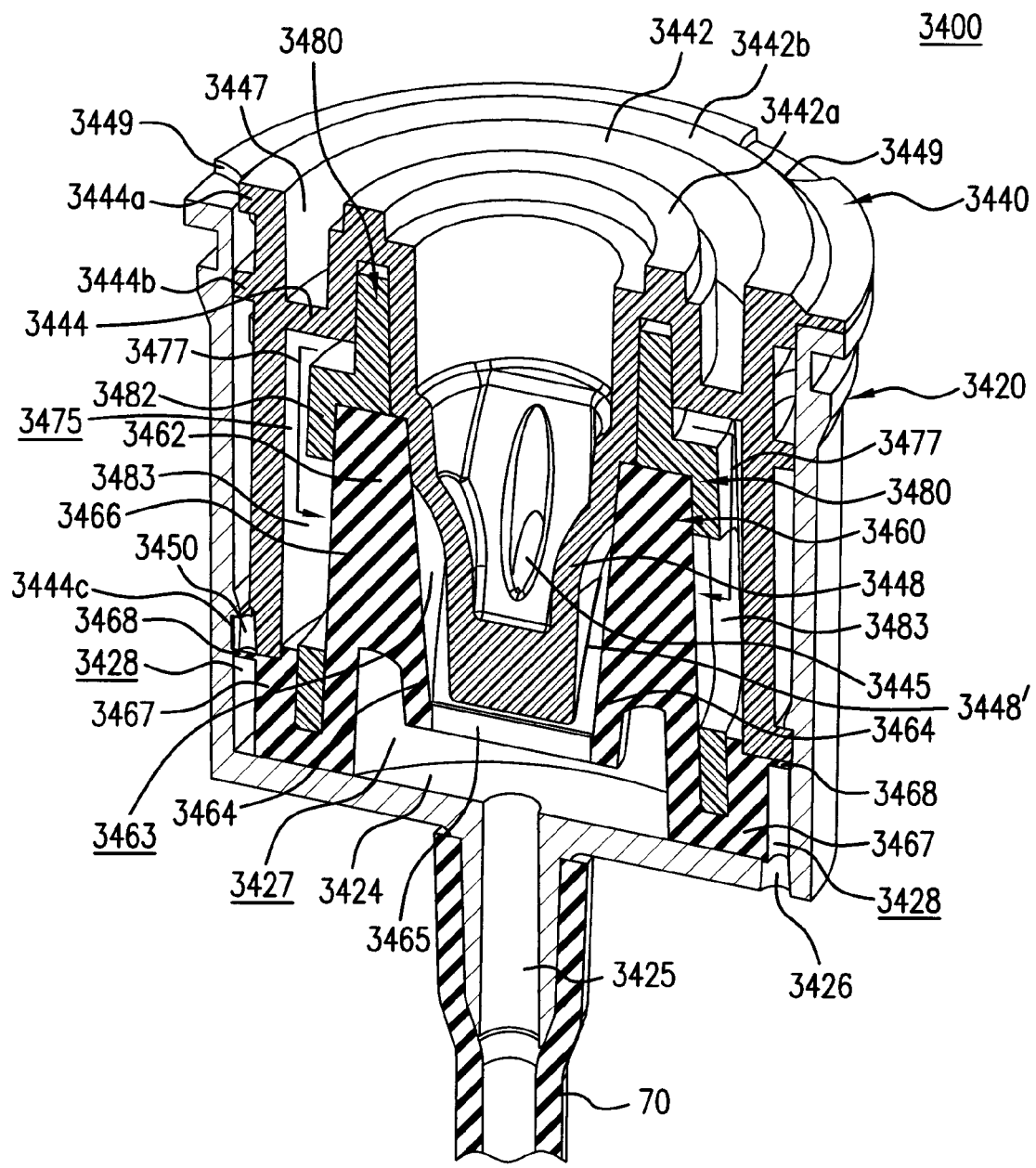
FIG. 25C is a detailed perspective sectional view, partially cut away, of the portion shown in FIG. 25B.
Figure 26A:
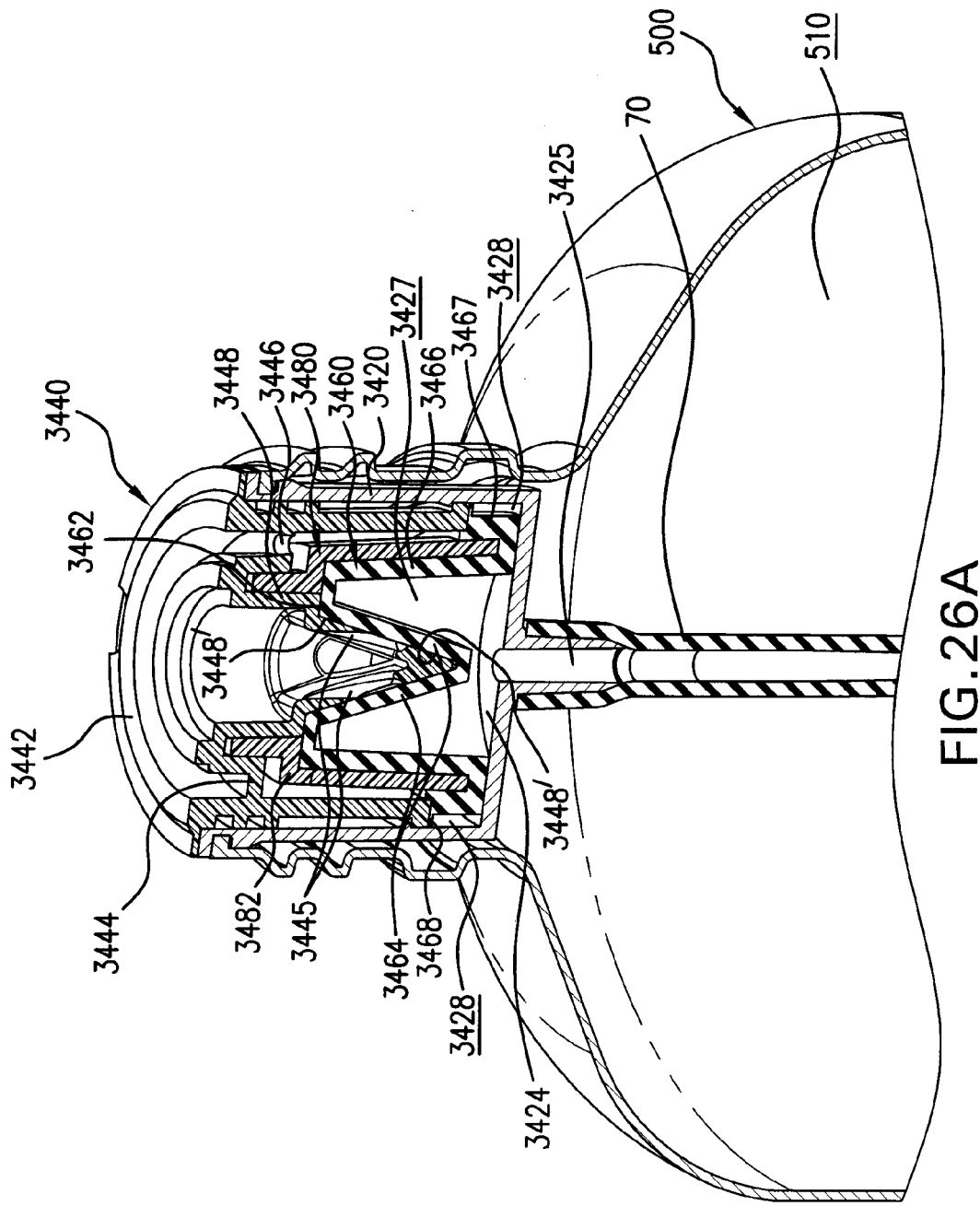
FIG. 26A is a perspective sectional view, partially cut away, of the portion of the embodiment shown in FIG. 24 taken along a third sectional plane.
Figure 26B:
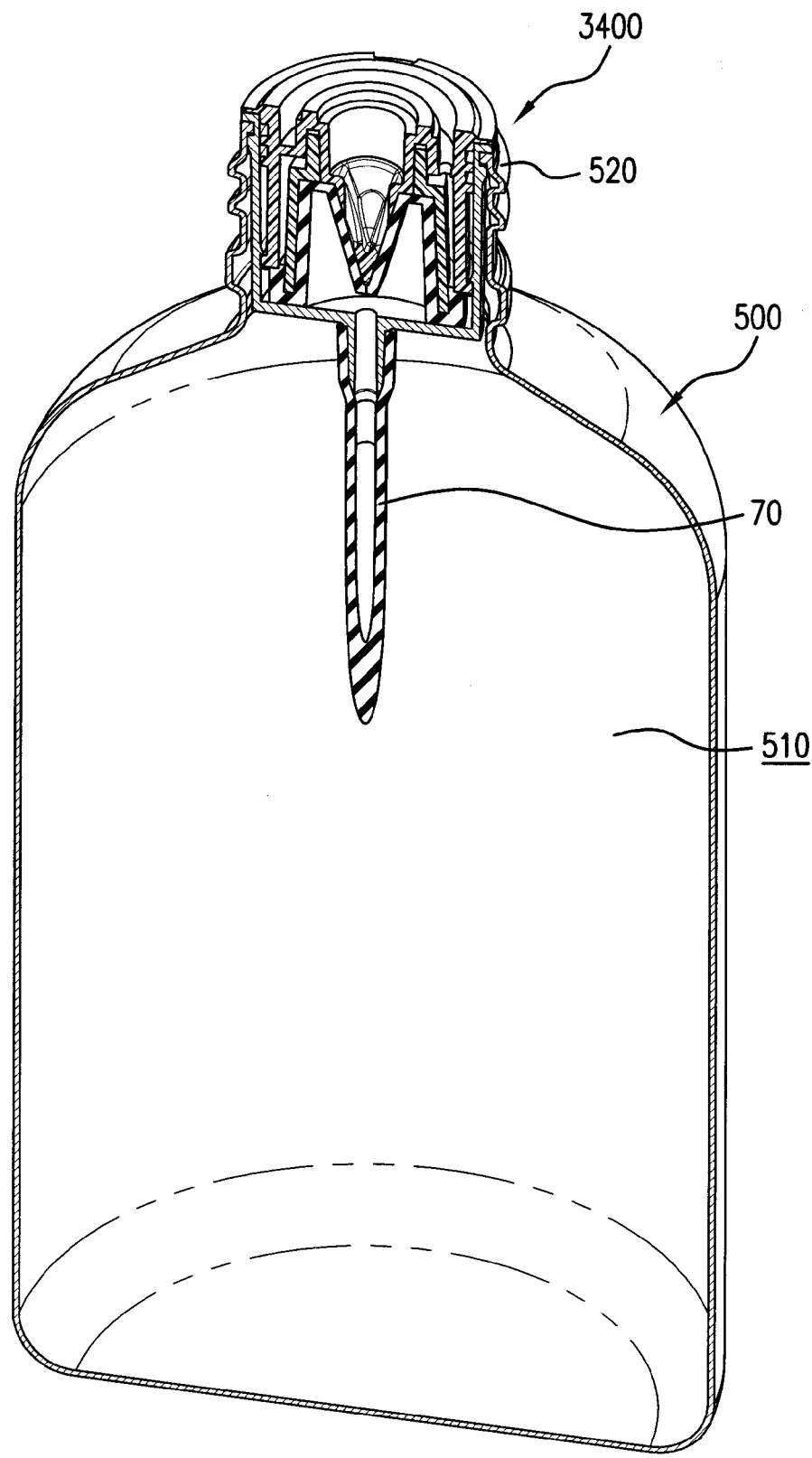
FIG. 26B is a wider sectional view of the portion shown in FIG. 24 taken along the third sectional plane.

Turning next FIGS. 22A-22C, an exemplary embodiment of the response valve portion 2400 is illustrated in greater detail. In FIG. 22A, the response valve portion 2400 is shown in a sealed, or disabled, state, while in FIG. 22B, it is shown in an unsealed, or enabled, state.

In the exemplary embodiment shown, the responsive valve portion 2400 preferably includes a base member 2420 which is firmly and securely received in sealed fluid-tight manner within the container's neck portion 520, substantially along its inner wall surfaces. The response valve portion 2400 further includes a seat member 2440 which defines a cover section 2442 that extends across the access opening defined by the container's neck portion 520, with a skirt-like tubular section 2444 extending axially downward therefrom. The seat member 2440 is provided with at least first and second access ports 2445, 2446 which are situated and configured to communicate respectively with the admission and fluid injection ports 2315 and 2316 of the control valve portion 2300. When unobstructed, the first access port 2445 provides open access to the container's storage compartment 510 (via a draw tube 70). The second access port 2446 provides open access for pressurized fluid to the reconfigurable parts of the response valve portion 2400, as described in following paragraphs.

The response valve portion 2400 further includes in this embodiment an axially displaceable piston assembly 2460 disposed for coaxial displacement relative to the base and seat members 2420, 2440. This piston assembly 2460 preferably includes a piston member 2462 and a plunger member 2464 extending overtop, and is so situated that a compartment 2475 is defined between its plunger member 2464 and the seat member 2440. The piston assembly 2460 employs a plurality of seals 2468 (of the O-ring type in the embodiment shown) suitably positioned and configured to seal the compartment 2475 off from both the container's storage compartment 510 and the aspiration flow path. The assembly also employs at least one seal 2469, preferably to seal the slidable interface between the piston member 2462 and its immediately surrounding surfaces (those of the base member 2420 in the embodiment shown) when the response valve portion 2400 is in its sealed, or disabled, state (FIG. 22A).

The piston assembly 2460 is preferably biased to the sealed state shown in FIG. 22A by an elastic biasing member 2470 captured between the piston member 2462 and a supporting ledge formed on the base member 2420. This biasing member 2470 preferably biases the piston assembly 2460 to its sealed position relative to the seat member 2440, whereby the flow path between the storage compartment 510 and the admission port 2315 of the control valve portion 2300 is blocked.

The piston member 2462 in this embodiment is formed with a barrel section 2463 which telescopically engages a protrusive section 2448 defining the seat member's first access port 2445. The barrel section 2463 includes a cover panel formed with one or more perforations 2463a for admitting liquid material and a plug 2463b for sealing the first access port 2445 as needed (in the sealed state). When the piston assembly 2460 is urged by sufficient fluid pressure to its unsealed, or enabled, state as illustrated in FIG. 22B, the plug 2463b is retracted to open the seat member's first access port 2445. Liquid material drawn (upon the aspiration flow path being sufficiently established) through the draw tube 70 is then free to flow through the perforations 2463a and into the first access port 2445 for admission through the control valve portion's admission port 2315.

To facilitate such operation, the seat member 2440 is formed at its upper surface with a plurality of partitioning ribs 2442a, 2442b, 2442c between respective pairs of which are defined a fluid channel 2447a and a vent channel 2447b. The innermost and intermediate partitioning ribs 2442a, 2442b bear against the seal members 2365a, 2365b to ensure sealed isolation of the fluid channel 2447a (and the second access port 2446 positioned therein) from the first access port 2445 (and the aspiration flow path), and from the vent channel 2447b. The outermost partitioning rib 2442c is interrupted by one or more vent passages 2449 which maintain open communication between the vent channel 2447b and the atmosphere outside the system 2000.

The venting required for sufficient aspiration in the illustrated embodiment occurs as follows. When the piston assembly 2460 is positioned in its unsealed, enabled state of FIG. 22B, the otherwise sealed engagement between the piston member 2462 and the surrounding surfaces of the base member 2420 beneath the seal 2469 is interrupted by one or more recesses formed to provide a scalloped inner wall surface 2422 at the base member's lower extremities. A venting passage is likewise provided between the tubular section 2444 of the seat member 2440 and the surrounding walls of the base member 2420 by preferably forming a similar scalloped surface 2444a, for instance, in one of the surfaces here interfacing. With a vent hole 2443 formed through the cover section 2442 in the vent channel 2447b, then, venting flow may occur through the vent passages 2449, into the vent channel 2447b, through the vent hole 2443, between the tubular section 2444 and surrounding base member (along the scalloped surface 2444a), through unsealed seat/base member seams, and between the seal 2469 and opposing scalloped surface 2422, into the container's storage compartment 510.

During operation, then, the pressurized fluid passed from the control valve portion 2300 through its fluid injection port 2316 is received in the fluid channel 2447a of the seat member 2440 and passed through the second access port 2446 into the chamber 2475. Upon sufficient buildup of pressure due to the fluid's accumulation in that chamber 2475, downward pressure is applied upon the plunger member 2464. As this overcomes the biasing force of the bias member 2470, the plunger member 2464 and piston member 2462 are urged responsively downward, causing the piston member's plug 2463b to withdraw from the seat member's first access port 2445. Upon the plug 2463b sufficiently clearing from the first access port 2445, and the piston member's seal 2469 being consequently positioned to bear against the scalloped surface 2422, venting of the container's storage compartment 510 occurs. Suction generated due to fluid flow occurring in the fluid conduit 2337 of the control valve portion 2300 then causes the withdrawal of liquid material out through the now unsealed response valve portion 2400 for eventual introduction into the fluid flow (via the Venturi aperture 2338 tapped into the fluid conduit 2337).

Proper dilution of the liquid material drawn from the storage compartment with the fluid flowing through conduit 2337 is achieved by suitably controlling their respective flow rates. Such control is realized by precise dimensional control of such features as the first access port 2445 (or metering orifi) and the diametric extent of the fluid conduit 2337 (choke/throttle diameter) particularly at a portion immediately upstream of Venturi aperture 2338. Any suitable means known in the art may be employed in this manner to bring about a flow balanced operation.

It is conceivable with the given embodiment that unwanted escape of the stored liquid material might be caused to occur by reverse flow through the venting path when the piston assembly 2460 in its unsealed state (by upending or forcibly squeezing the container, perhaps). Such escape of the liquid material in any significant amounts is quite unlikely to occur, however, in actual practice. The deliberately circuitous venting flow path, often passing between tightly adjoined surface portions, presents considerable obstacles to such escape of liquid material therethrough.

What is more, the venting flow path described in this embodiment remains open only to the extent that the pressure motivating the reverse seepage of liquid material does not itself exceed the fluid pressure keeping the piston assembly 2460 in its unsealed state. The instant that it does, the piston assembly 2460 returns to the sealed position, once again blocking the venting flow path. If, for example, the unwanted escape of liquid material through the venting flow path were caused by the user's over-squeezing the container's storage compartment 510, a great enough squeezing pressure would drive the piston assembly 2460 against the actuating fluid pressure back to its sealed and disabled position against the seat member 2440.

As briefly alluded to in preceding paragraphs, the in-neck configuration of the response valve portion may be adapted in certain other embodiments for direct tubing or other conduit connection to external fluid and vacuum sources. Such modified configuration may be preferable, for example, with wall mounted eductor systems, wherein a Venturi effect is generated by a permanent fixture, and the liquid material to be delivered is stored in a container elsewhere. Rather than aspirating the liquid material from a storage container by otherwise precarious and unsafe means (establishing the requisite venting through a lid loosened and deliberately left ajar, for instance), the in-neck response valve portion 2400 (or 3400 in following paragraphs) operable in the manner herein described would provide a considerably safer, spill-proof alternative. Suitable fittings would then be used in place of the control valve portion 2300 shown in the preceding embodiment, to provide admission and fluid injection ports by which to operably couple the response valve portion 2400.

Perhaps as important as the safety benefits realized by equipping a liquid material container with the response valve portion 2400 (3400) in such application may be the antibreach, or tamper-evident, benefits that it affords. Safety hazards are often posed not only by potential consequences of unintentional acts such as accidental spillage of a noxious liquid material from its container, but also by the potential consequences of quite intentional ones. Particularly in industrial applications, the risk of an individual acting with either deficient knowledge or questionable motive to infuse the container with a foreign material (to dilute the liquid material stored therein), for example, cannot be overlooked. Equipping the container with an in-neck embodiment of the fluid pressure-responsive valve portion in accordance with the present invention all but forecloses such action—at least without conspicuously tampering with the container and valve portion, or without making a considerable attention-drawing mess.

Referring now to FIGS. 23-26B, there is illustrated yet another exemplary alternate embodiment of the present invention. In this embodiment, the control valve portion 2300 remains much the same in structure and function as in the preceding embodiment; however, the response valve portion 3400 is realized differently in certain respects. Instead of a displaceable piston assembly, for instance, the response valve portion 3400 employs a deflectable valve member whose controlled deflection determines the response valve portion's operational state. Moreover, the stored liquid material is again withdrawn by aspiration, but sealing and unsealing of the requisite vent path (from the ambient air outside to the given container's storage compartment 510) is not directly tied to the mechanism for opening/closing the aspiration path. Rather, such sealing and unsealing of the vent path occurs automatically, as needed, through a one way valve structure actuated effectively in independent manner.

The response valve portion 3400 is disposed within the neck portion 520 of the container 500 as in the preceding embodiment for similar inter-coupling with the control valve portion 2300. The response valve portion 3400 preferably includes in this embodiment a base member 3420 firmly and securely received in sealed manner within that neck portion 520, so as to extend substantially along its inner wall surfaces. The response valve portion 3400 further includes a seat member 3440 retained within the base member 3420 to define a cover section 3442 that extends across the access opening formed for the container by the neck portion 520. The response valve portion 3400 further includes a deflectable valve member 3460 and a guard member 3480 captured within the base member 3420 by the seat member 3440.

The base member 3420 generally describes a basin structure which substantially fills the neck portion 520. Preferably formed through a floor 3424 of this basin structure is at least one receiving port 3425 and at least one vent port 3426, each of which leads to the container's storage compartment 510.

Extending axially downward from the cover section 3442 of the seat member 3440 is a skirt-like tubular section 3444 and a more centrally disposed tubular support section 3448. A plurality of annular flanges, including those marked 3444a, 3444b, 3444c, are formed to radiate outward from the tubular section 3444 to bear against the base member's opposing inner wall surfaces. They are offset one from the other to partition what clearance space remains between the tubular section 3444 and the opposing surfaces of the base member 3420.

The plurality of partitioned (though not sealed) compartments formed between the seat and base members 3440, 3420 as a result serve to further safeguard against the free flow of liquid material out through the response valve portion 3400 in the unlikely event of its unwanted escape through the vent path. The vent path (requisite to aspirated dispensing of the stored liquid material) is formed in this embodiment primarily through the unsealed space and seams between the opposed and adjoining parts of the tubular section 3444 and base member 3420. Any liquid material somehow entering this vent path from the container 500 would thus encounter a succession of partitioned compartments; and, but for the minimal amounts that may seep through the joints and seams, remain largely contained by them from further escape.

The seat member 3440 is provided with at least one each of first and second access ports 3445, 3446 which are situated and configured to communicate respectively with the admission and fluid injection ports 2315, 2316 of the control valve portion 2300. When the deflectable valve member 3460 is in its open state, each first access port 3445 is opened to conduct liquid material delivered thereto from the container's storage compartment 510 through the base member 3420 (via a draw tube 70 in the illustrated embodiment). Each second access port 3446 serves to admit the flow of pressurized fluid to the deflectable parts of the valve member 3460.

The bottom-most flange 3444*c* of the tubular section 3444 is preferably formed in this embodiment with at least one through hole 3450. This bottom-most flange 3444*c* serves as a contact surface against which a deflectable seal bears to cover and thereby seal off each through hole 3450. In the absence of sufficient pressure to force such unsealing deflection, each through hole 3450 remains closed, thereby operating as a normally closed passage for the venting flow of air from the space between the seat and base members 3440, 3420 on to, eventually, the container's storage compartment 510.

The tubular support section 3448 is preferably formed as an axial extension of the cover section 3442. The tubular support section 3448 is dimensionally configured and contoured in accordance with the particular requirements of the intended application to serve not only as a conduit for the liquid material admitted by the first access port 3445 formed therein, but also to serve as a substantially rigid support which defines the permissible extent of the deflectable valve member's deflection. To that end, the tubular section 3448 preferably projects into the valve member 3460 as shown for substantially coaxial engagement therewith.

At least a part of the tubular section 3448 preferably defines also one or more contact faces 3448' against which the valve member 3460 may bear to maintain a sealing interface when in its closed, or undeflected, state. Each first access port 3445 is preferably formed through a contact face 3448', such that the facial seal maintained thereabout between such contact face 3448' and valve member 3460 guards against the unwanted passage of any liquid material which may have otherwise breached the valve member's sealed closure.

The valve member 3460 is formed with a main body section 3462 which describes a central cavity 3463. The main body portion 3462 mates with the tubular support section 3448, extending about a terminal portion of that tubular support section 3448 projecting into its central cavity 3463. The main body section 3462 is preferably formed generally with a duckbill-type valving configuration. That is, the main body section 3462 defining at least a pair of distension flap structures 3464 which converge to a slit-like separable seam 3465 at which they may part. The valve member 3460 is preferably formed of a suitable rubber or other such elastic material known in the art (preferably capable of withstanding extended exposure to the chemical and other properties to be encountered in the intended application), such that when subjected to sufficient pressure or force, the distension flap structures 3464 responsively deflect to separate at least partially along the separable seam 3465. This opens communication between the first access port 3445 and the base member's receiving port 3425 for the admission of liquid material therethrough.

Figure 27:
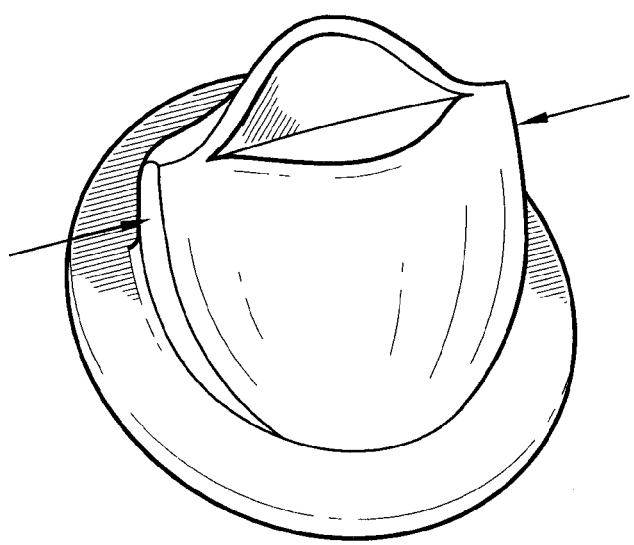
FIG. 27 is a schematic diagram generally illustrating actuation of a deflective portion of a duckbill-type valve element, as utilized in certain embodiments of the present invention.
Figure 28:
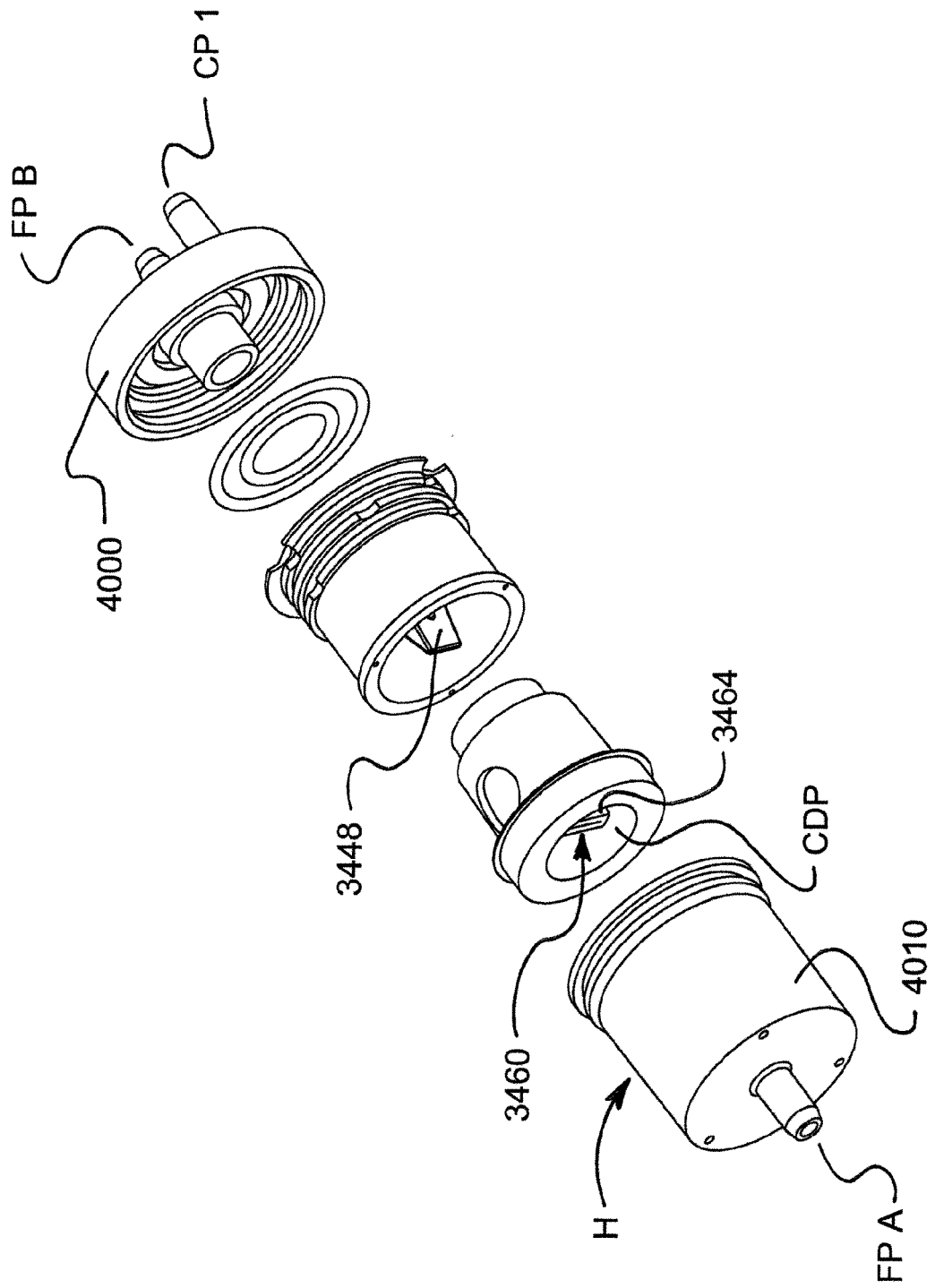
FIG. 28 is an exploded perspective view of an exemplary embodiment of the present invention for in-line applications.
Figure 28C:
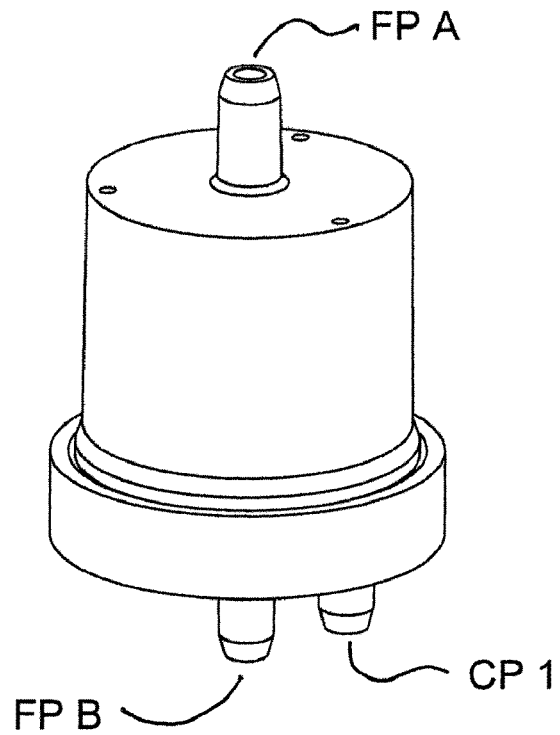
FIGS. 28C and 28D are perspective views taken from different perspectives of the embodiment shown in FIGS. 28A and 28B.
Figure 28D:
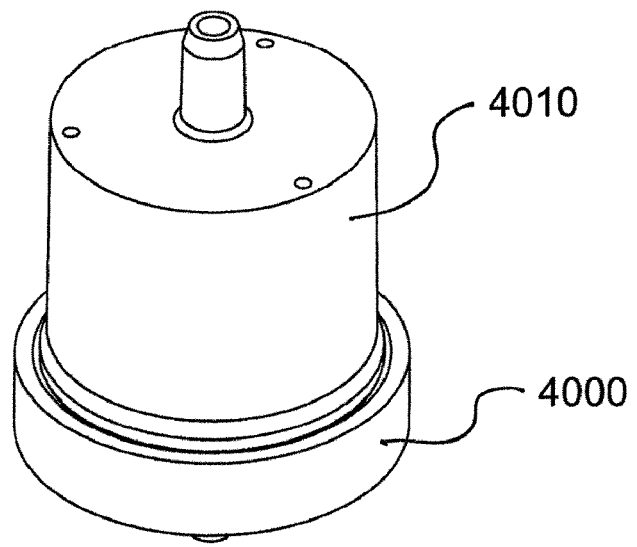
Figure 29:
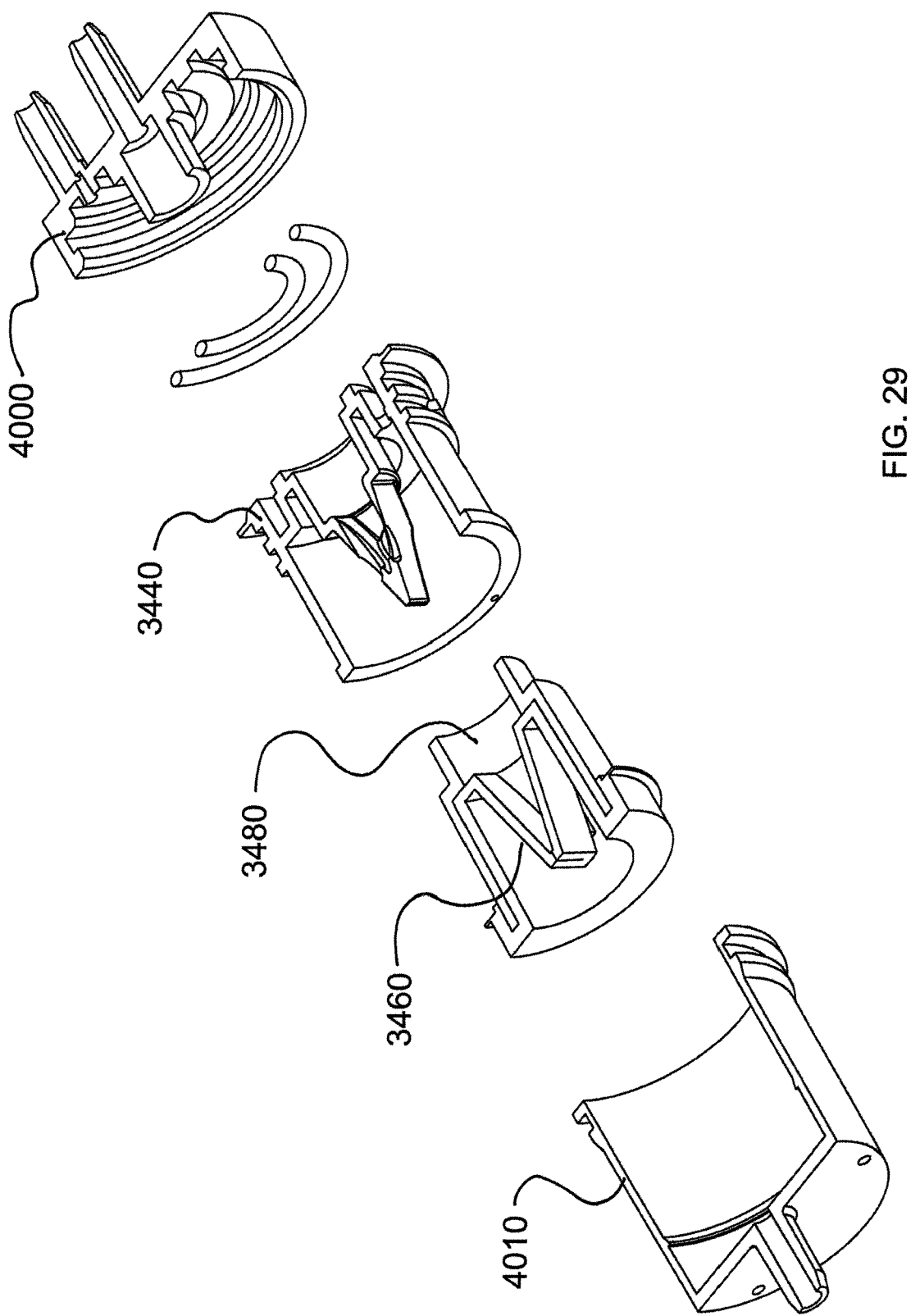
FIG. 29 is an exploded perspective view of the embodiment shown in FIG. 28, partially cut away along a horizontal axial plane.
Figure 29C:
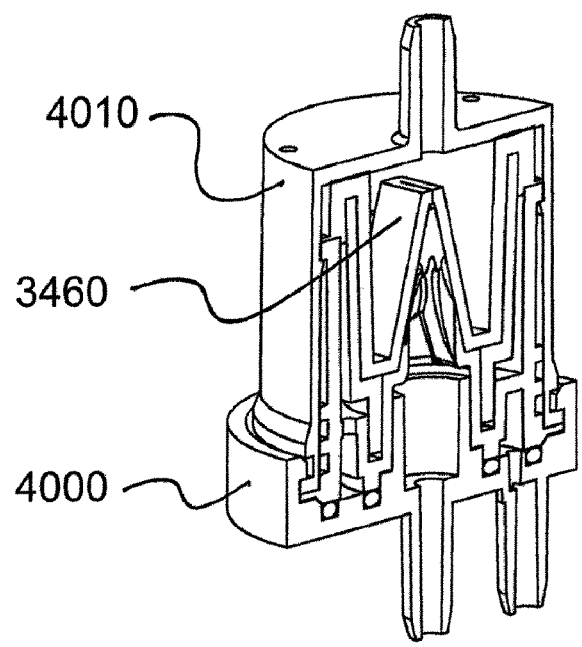
FIGS. 29C and 29D are cut away versions corresponding to the views shown in FIGS. 28C and 28D.
Figure 29D:
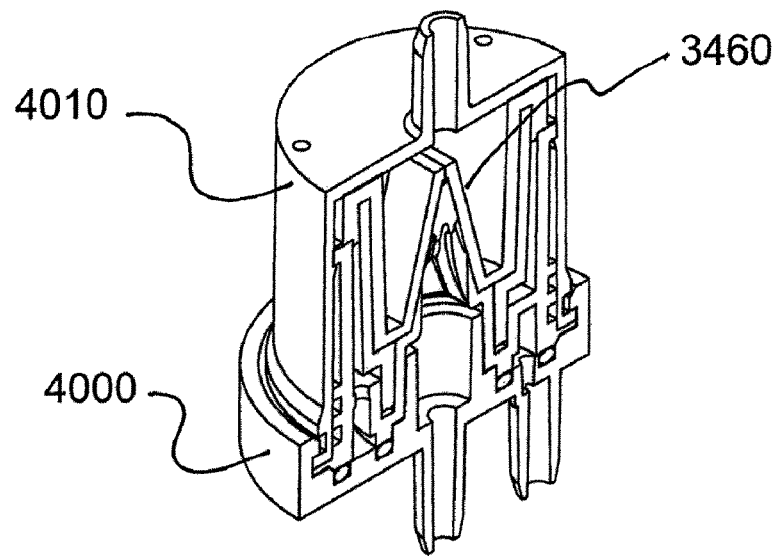
Figure 29E:
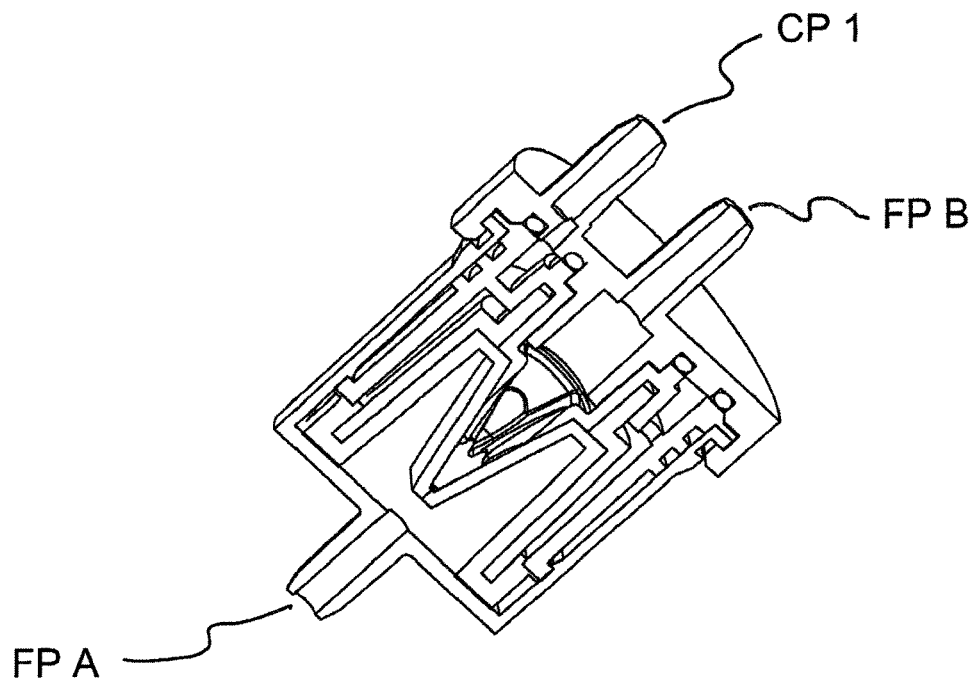
FIGS. 29E and 29F are cut away perspective views taken from different perspectives of the embodiment shown in FIGS. 28A and 28B.
Figure 29F:
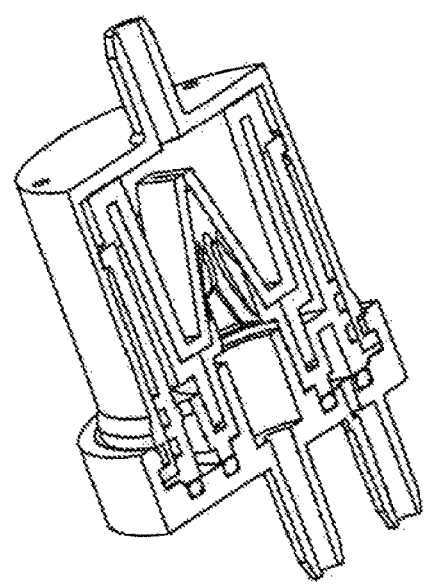
Figure 30B:
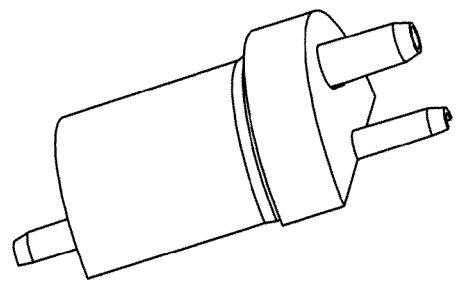
FIGS. 30B, 30C, 30D, 30E, 30F, and 30G are cut away perspective views taken from different perspectives of the embodiment shown in FIGS. 28A and 28B.
Figure 30C:
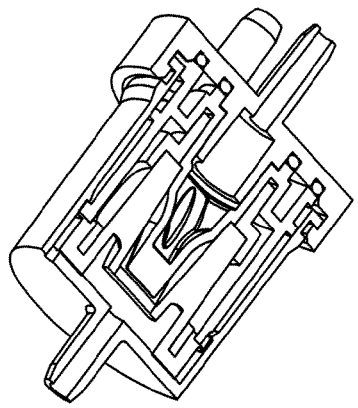
Figure 30D:
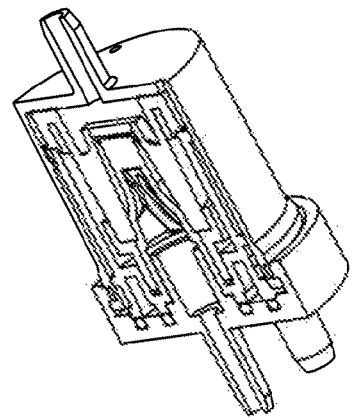
Figure 30E:
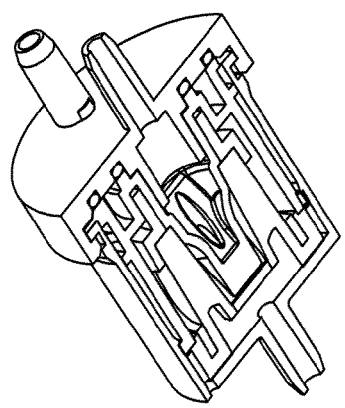
Figure 30F:
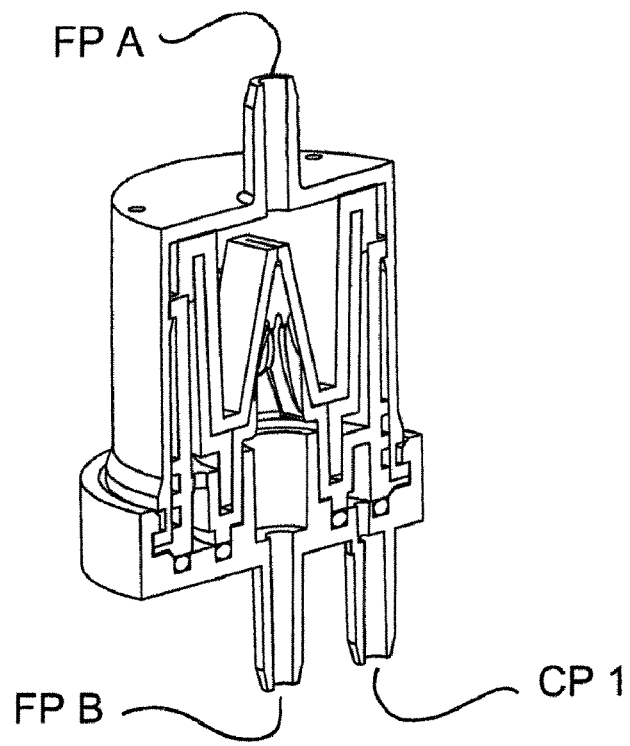
Figure 30G:
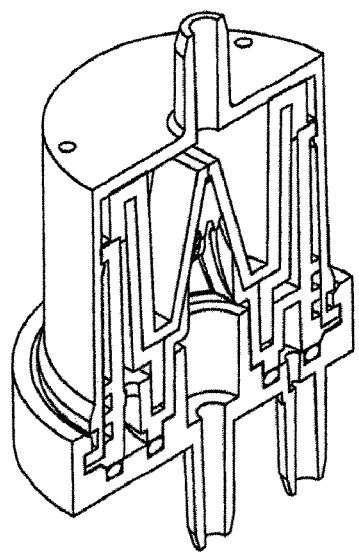
Figure 31:
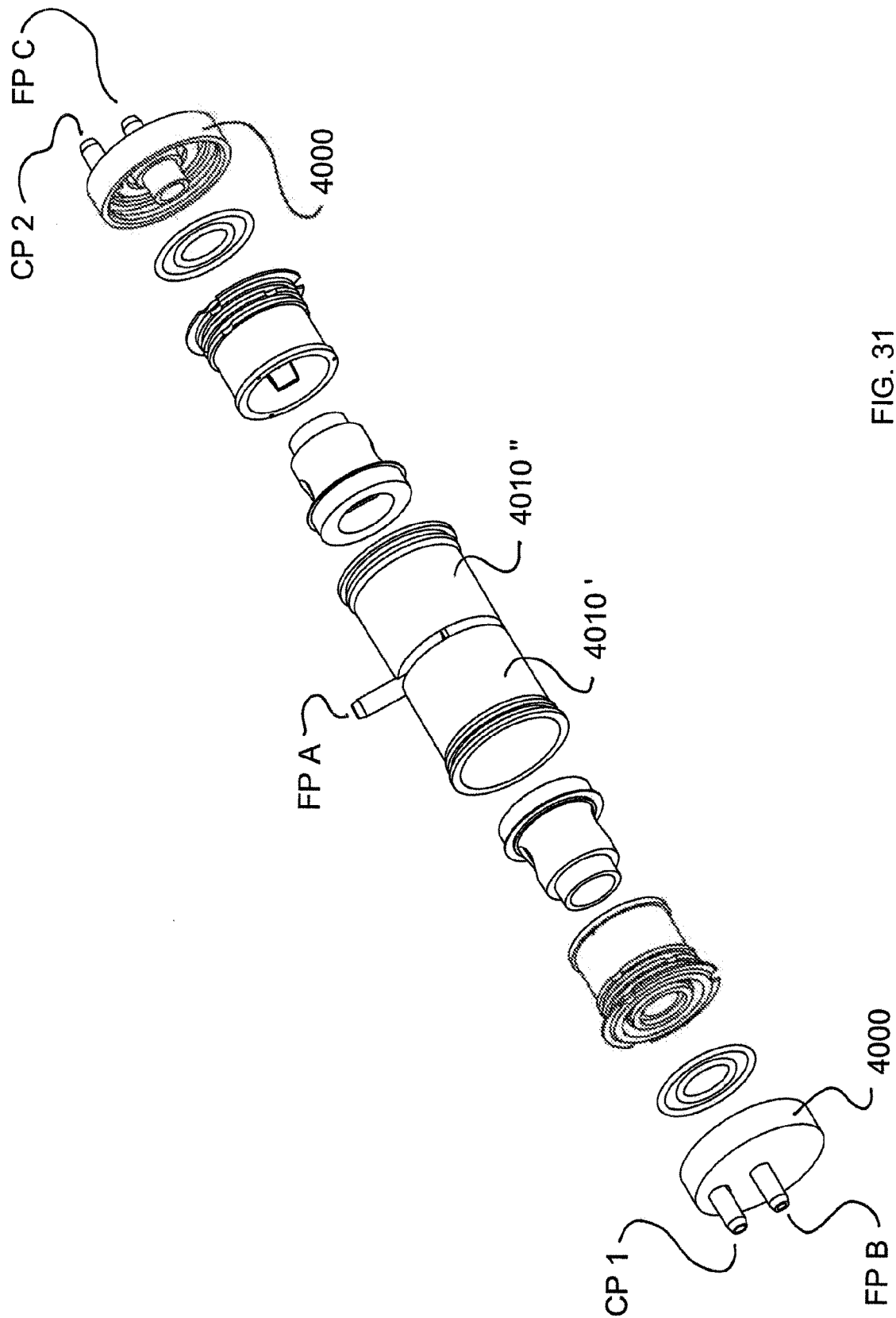
FIG. 31 is an exploded perspective view of another exemplary embodiment of the present invention for in-line applications.
Figures 31C, 31D:
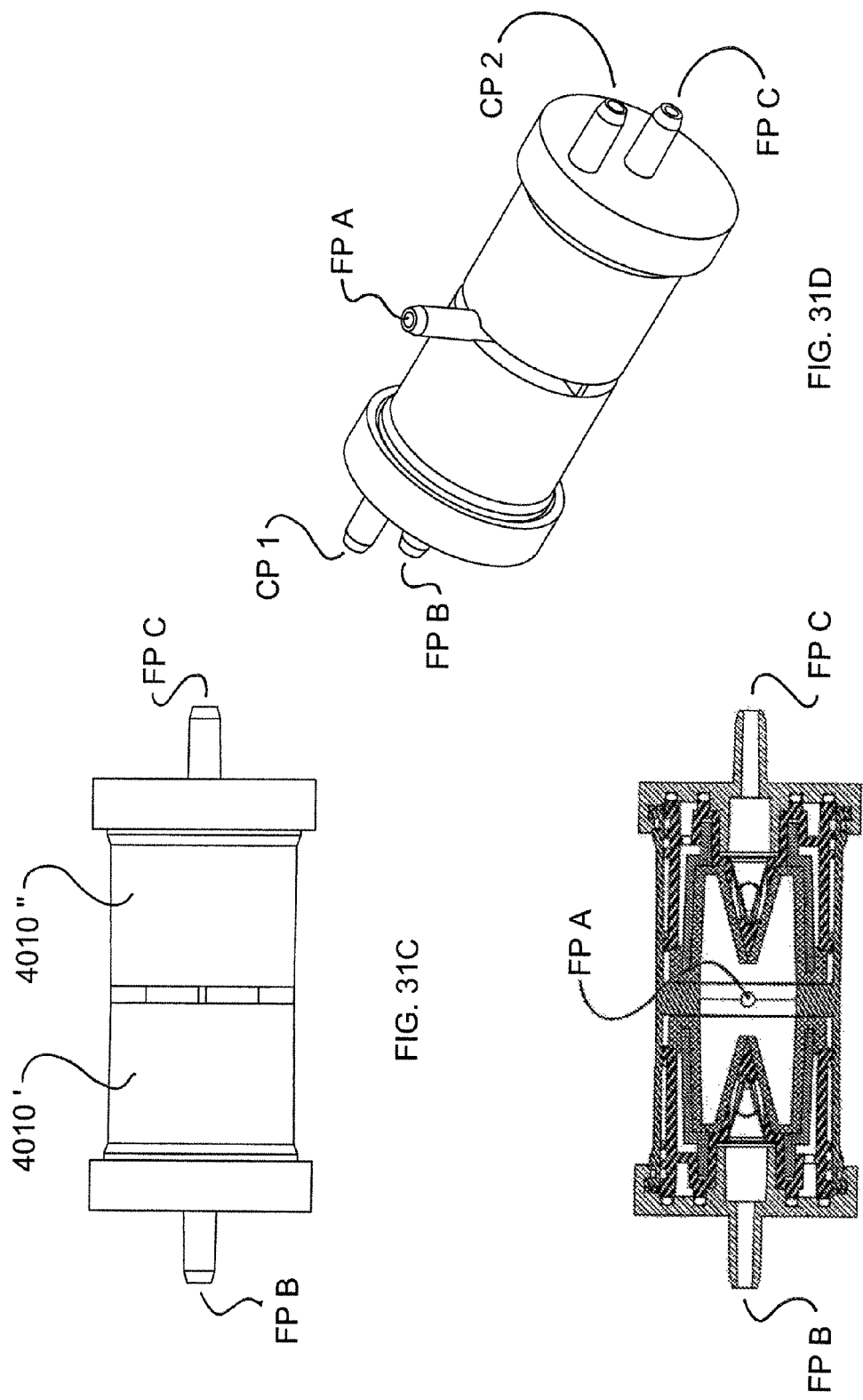
FIG. 31C is a bottom plan view of the embodiment as shown in FIG. 31A.
FIG. 31D is a perspective view of the embodiment shown in FIG. 31, fully assembled.
Figure 31B:
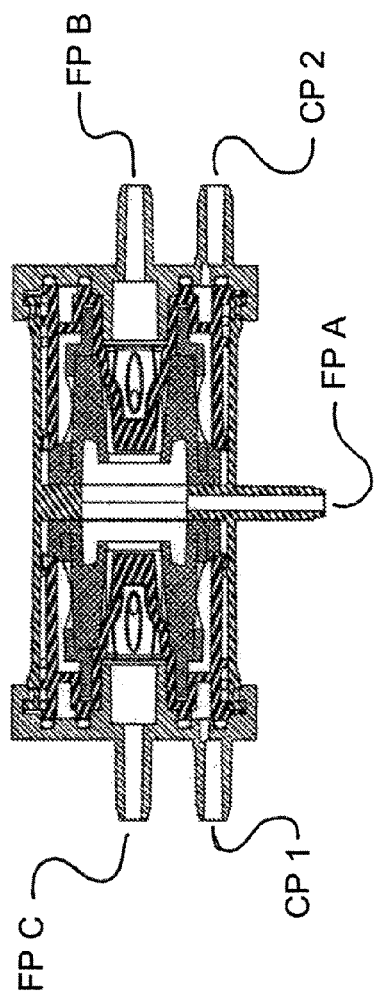
FIG. 31B is a top plan view of the embodiment as shown in FIG. 31A.
Figure 31B:
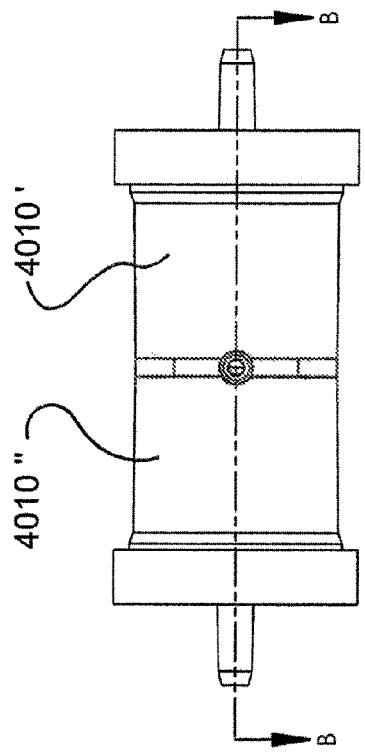
Figure 32B:
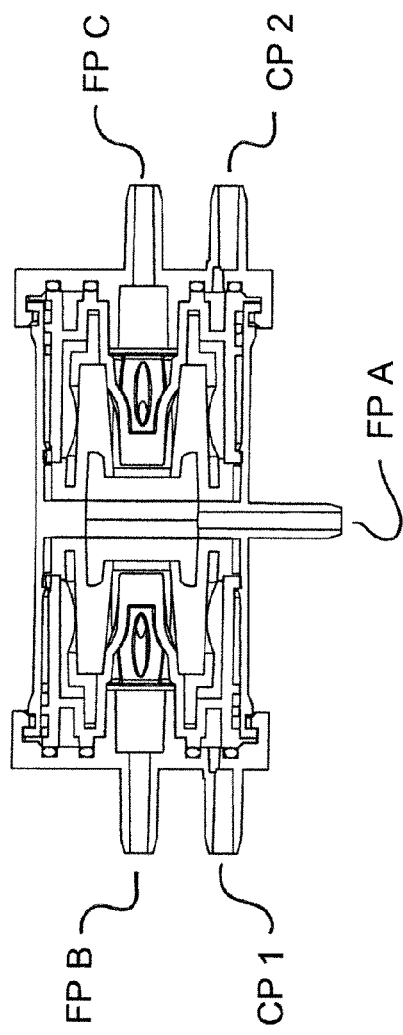
FIG. 32B is a plan view of the cut away assembled embodiment as shown in FIG. 32A.
Figure 32B:
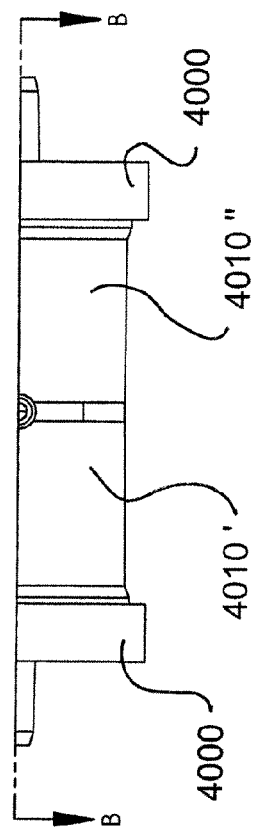
Figure 33B:
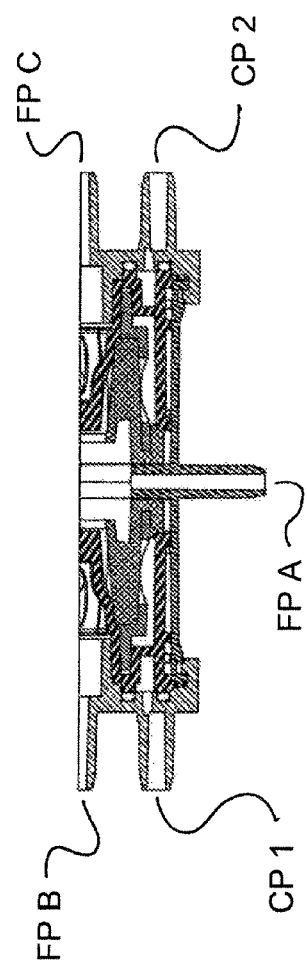
FIG. 33B is a top plan view of the assembled embodiment as shown in FIG. 33A.
Figure 33B:
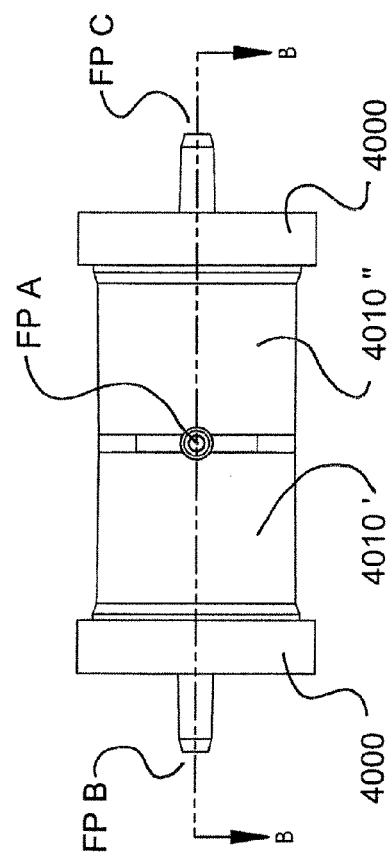

With the illustrated configuration, suitable deflection of the distension flap structures 3464 is preferably effected by the application of inward cross-lateral pressure at the valve member's outer wall regions 3466. As conceptually illustrated in FIG. 27, such cross-laterally applied pressure yields consequent opening of a duckbill-type valve structure at its mouth-like separable seam. A similar open-mouth response is generated at the separable seam 3465 by accordingly directing the available fluid pressure in the given embodiment.

The guard member 3480 serves in this regard much like a support collar which generally encircles the valve member's outer wall section 3466 and engages the seat member 3440 preferably as shown. The guard member 3480 is sufficiently rigid in structure to define with the neighboring surfaces a fluid guide chamber that guide the flow of pressurized fluid to impinge transversely upon and deflect the outer wall section 3466 of the deflectable valve member 3460. The guard member 3480 includes a wall section 3482 which, except at a plurality of windows 3483 formed therein, provides a solid protective barrier about the valve member outer wall section 3466. The windows 3483 are shaped, dimensioned, and positioned relative to the valve member 3460 in such manner as to suitably localize the point of fluid pressure application upon the outer wall section 3466, and thereby control the valve member's responsive deflection in cooperation with the tubular support section 3448.

When sufficient fluid pressure is applied through the windows 3483, the lateral edge portions of the valve member's distension flap structures 3464 deflect responsively inward, and the lips of these structures otherwise engaged at the separable seam 3465 are contorted apart. This responsive deflection may progress until the inwardly deflected portions of the distension flap structures 3464 are forced against the seat member's tubular support section 3448. This stops the distension flap structures 3464 against further deflection, thus defining the valve member's fully opened state—maintained by the ongoing application of fluid pressure. When the fluid pressure subsides, the resilient bias of the distension flap structures 3464 causes their return to the undeflected state, with their lips again forming contiguous sealing engagement along the separable seam 3465.

The distension flap structures 3464, in the undeflected state, preferably bear against opposing contact faces 3448' of the tubular section 3448 to form face seals thereagainst (about the respective first access ports 3445). Any outward pressure from within the container's storage compartment 510, or suction from without, only urges the distension flap structures further against the contact faces 3448', then, further reinforcing the face seals. This serves as a reliable safeguard should compromise of the lips' sealing engagement along the separable seam 3465 occur, and unwanted escape of liquid material occur therethrough as a result. Until the distension flap structures 3464 are again deflected during the normal course of response valve actuation, the face seals contain the escaping liquid material against further migration.

The deflectable valve member 3460 in this embodiment further includes a peripheral extension 3467 preferably disposed to remain substantially free of the applied fluid pressure's deflective effects. Such functional isolation of peripheral extension 3467 is ensured in part by positioning the bottom edge of the guard member wall section 3482 to serve effectively as a retaining wedge therefor. The extension 3467 preferably terminates at a deflectable vent flap 3468 radiating outwardly therefrom for flush engagement of the seat member's bottom-most flange 3444c.

The deflectable vent flap 3468 is appropriately shaped and dimensioned (particularly in its thickness dimension) in view of the material from which it is formed to, in its normal undeflected state, so conform to the flange surface that it seal against the passage of air therebetween, yet is freely deflected away from such sealing contact with the flange surface when subjected to sufficient pressure differential. Where the pressure on the vent flap side exceeds the pressure at the flange 3444c side, the vent flap 3468 is urged even more tightly against the flange surface, its sealing engagement of the surface (and its through hole(s) 3450) being reinforced all the more. Where the pressure at the flange 3444c side is sufficiently greater to overcome the inherent resilient bias of the vent flap 3468, that vent flap 3468 is deflected away from the flange surface and at least partially unseated from the through hole(s) 3450 to enable the passage of air therethrough. The vent flap 3468 thus operates against the flange 3444c to effectively form a one-way valve seal operable in this manner to be automatically actuated, independent of the distension flap structures' actuation.

Preferably, the seat member 3440 is angularly oriented relative to the base member 3420 such that each flange through hole 3450 displaced considerably from any base member vent port 3426. Again, this makes for a more circuitous route for any liquid material inadvertently permitted to escape through the vent port 3426 (by severe tipping of the container, for example, while the vent flap 3468 is deflected to its open configuration). Normally, the cause of such potential escape of liquid material through the vent port 3426 will operate in this embodiment to itself urge the closure of the vent flap 3468. For example, gravity will tend to draw the vent flap 3468 back towards the flange 3444c if the container 500 were tipped severely enough to cause the inadvertent escape of liquid material. Likewise, a severe force such as that due to over-squeezing of a flexible container 500 would itself tend to force the vent flap 3468 towards the flange 3444c, as much as forcing the liquid material out through the vent port 3426. Even if it were to progress that far, a flow of liquid material approaching the flange through hole 3450 would itself tend to urge that flap 3468 towards the flange 3444c when it encounters the vent flap 3468 on its way to the through hole 3450.

The wedged capture of the valve member's bottom peripheral extension 3467 by the guard member 3480 (and capturing seat member 3440) against the base member 3420 also serves to preserve the seal between the liquid material flow path and venting path established through the responsive valve portion 3400. In accordance with this embodiment, a receiving chamber 3427 is defined between the main body section 3462 of the valve member 3460 and the floor 3424 of the base member 3420. As mentioned, a venting chamber 3428 is also formed in accordance with this embodiment between the flange 3444c and surrounding surfaces of the base member 3420. These chambers 3427, 3428 communicate during operation with the first access port 3445 and flange through hole 3450 of the seat member 3440 to pass, respectively, the liquid material and venting air therethrough. It is important that these flow paths not compromise one another, and secure capture of the resilient valve member extension 3467 against the base member 3420 serves to maintain the chambers 3427, 3428 in sealed isolation toward that end.

When the received pressurized fluid stream is at least partially passed to the response valve portion 3400 via the control valve portion 2300, the pressurized fluid impinges upon the seat member's cover section 3442. Formed in this cover section 3442 is a fluid channel 3447 defined between inner and outer partitioning ribs 3442a, 3442b (which respectively engage the seal members 2365a, 2365b of the control valve portion 2300). At least one second access port 3446 is formed in this fluid channel 3447, such that the pressurized fluid collecting within the fluid channel 3447 drains through the second access port 3446 into a compartment 3475 formed between the valve member 3460 and surrounding portions of the seat member 3440. Upon sufficient accumulation of the pressurized fluid there, fluid pressure applies to the outer wall section 3466 of the valve member 3460 through the guard member's window 3483, as indicated by the arrows 3477. This, of course, yields a consequent parting of the valve member's lips at the separable seam 3465.

The resulting aspiration through the first access port 3445 (as described in preceding paragraphs) draws the liquid material from the storage container 510, in through the receiving port 3425, between the valve member's parted lips, through the first access port 3445, through the control valve portion's admission port, and into the fluid conduit 2337 for subsequent expulsion. Requisite venting is obtained by the entry of atmospheric air through one or more vent passages 3449 formed at an outer periphery of the seat member's cover section 3442, through the unsealed seams and joints between the seat and base members 3440, 3420, through the flange through hole 3450 (past the deflected vent flap 3468), around the vent chamber 3428, and out through the base member's vent port 3426, into the storage compartment 510.

In overall operation, then, the deflectable valve member 3460 is retained within a substantially rigid framework configured to guide flow of pressurized fluid around and to a predetermined part of that valve member 3460. This causes the duckbill-like distension flap structures 3464 to deflect and widen the slit opening along which they otherwise meet to a desired width and/or shape. This in turn permits the exit flow of liquid material from the storage compartment 510 therethrough. Where insufficient fluid pressure is available, the distension flaps 3464 return to their closed positions by their own resilient bias, coming together again to form a sealed seam at the slit.

The deflectable valve member 3460 is so configured that any reverse pressure originating from inside the storage compartment 510 against its sealed seam 3465 only urges the joined distension flaps 3464 together all the more, tightening and reinforcing the valve member's closure along the separable seam 3465 and face seal against the tubular support section 3448. Even if a user were to inadvertently over-squeeze a flexible container 500, no unintended and potentially hazardous escape of its stored liquid material would occur through the valve member 3460. Similarly, if a user were to upend the entire container 500 during use (with the valve member 3460 remaining open responsive to the applied fluid pressure), the excessive flow of liquid material occurring against the bottom of the valve member 3460 would also tend to urge the distension flaps 3464 together towards closure, in spite of the applied fluid pressure. Such built-in self-protective, safeguarding measures enhance the degree of protection actually realized against tampering actions or abusive handling which might otherwise defeat the system's controlled containment/dispensing function.

The preceding embodiments employ a venting feature to induce sufficient aspiration for dispensing the liquid material stored in a container. In certain other alternate embodiments of the present invention, other suitable techniques known in the art may be employed which are not aspiration based. In such embodiments employing, a collapsible bag-type container, for example, proper system operation may not require a venting feature.

Each of the preceding embodiments may also operate when inverted in orientation during use, so long as the tube 70 were shortened or removed within the container 500, and suitable flow of pressurized fluid were maintained. Moreover, while water or other liquid may be used as the pressurized fluid, a gaseous flow may also be used in certain alternate embodiments as the pressurized actuating fluid.

Referring to FIGS. 28-30G, there are shown different views of yet another embodiment of the present invention. In this embodiment, certain aspects of the fluid pressure-actuated valving features disclosed herein are incorporated in an in-line valve apparatus for controlling the flow of liquid material through a line, responsive to hydraulic or other suitable fluid pressure. As illustrated in the exemplary embodiment shown, a response valve portion such as disclosed in preceding embodiments is disposed within a separate, stand alone valve housing 4000, 4010, rather than within the neck of a bottle or other such storage container. A pressurized stream of fluid introduced through a control port CP1 disposed in the valve housing at 4010 then actuates the response valve portion much as described in preceding paragraphs, so as to selectively interrupt liquid material flow through the line.

The valve apparatus is preferably coupled as an in-line element, which when inserted in the line, serves as a fluid pressure-control gateway for the liquid material in the line. Depending on the application, the controlling fluid pressure may be independently provided by a pressurized fluid stream apart from the line liquid, or otherwise provided in suitable connection with that liquid material.

Referring to the exemplary in-line embodiment additionally illustrated in FIGS. 31-33G, a pair of valve sections each similar to that illustrated in FIGS. 28-30G are integrated to form a flow control tee valve apparatus. As illustrated, this tee valve apparatus includes at its distal end portions 4000 a control port CP1, CP2 and an outlet flow port FPB, FPC of a conduction port CDP. The tee valve apparatus also includes in the exemplary embodiment shown a shared flow port FPA communicating with the conduction ports of the integrated valve sections at 4010', 4010". This shared flow port—shown transversely extending directs the exiting passage of the liquid material once either or both of the valve sections' response valve portions are actuated to permit liquid material flow therethrough.

The tee valve apparatus is preferably configured to selectively control liquid material flow in the line depending on certain conditions both upstream or downstream of the apparatus. For instance, a user-controlled hydrostatic input from an upstream or downstream source such as a dispensing proportioner or the like may be employed to provide the required flow control. The flow ports serving as conduction port inlets/outlets and the control ports which emerge from the apparatus may be adapted in different combinations with the given line and control source(s) to realize various operational configurations, as illustrated in the following table (the control and flow ports referred to in the Table's examples are correspondingly marked CP1, CP2, FPA, FPB, FPC in FIG. 32 for illustrative purposes):

| Configuration Number | Control Port 1 | Control Port 2 | Conduction Flow Port A | Conduction Flow Port B | Conduction Flow Port C |
|---|---|---|---|---|---|
| 1 | Not pressurized | Not pressurized | Outbound | Inbound | Inbound |
| 2 | Not pressurized | Not pressurized | Outbound | Inbound only when pressure at Flow Port B ($P_B$) is greater than pressure at Flow Port C ($P_C$) | Inbound only when pressure at $P_C$ is greater than $P_B$ |
| 3 | Pressurized | Not pressurized | Outbound or inbound | Outbound or inbound | Inbound only when $P_C$ is greater than pressure at Flow Port A ($P_A$) or $P_C$ is greater than $P_B$ |
| 4 | Not pressurized | Pressurized | Outbound or inbound | Inbound only when $P_B$ is greater than $P_A$ or $P_B$ is greater than $P_C$ | Outbound or inbound |
| 5 | Pressurized | Pressurized | Outbound or inbound | Outbound or inbound | Outbound or inbound |
| 6 | Not pressurized | Not pressurized | Pressurized | Inbound only when $P_B$ is greater than $P_A$ | Inbound only when $P_C$ is greater than $P_A$ |
| 7 | Variable pressure applied | Variable pressure applied | Outbound-mixture of fluid from Flow Port B and Flow Port C-ratio | Inbound-restricted by $P_1$ | Inbound-restricted by $P_2$ |

| Configuration Number | Control Port 1 | Control Port 2 | Conduction Flow Port A | Conduction Flow Port B | Conduction Flow Port C |
|---|---|---|---|---|---|
| | | | determined by pressure at Control Port 1 ($P_1$) and pressure at Control Port 2 ($P_2$) in relation to $P_B$ and $P_A$ | | |

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular combinations of method steps may be reversed or interposed, all without departing from the spirit or scope of the invention as defined in the appended claims.

What is claimed is:

1. A valve apparatus for failsafe control of liquid material passage through a line comprising:
    a dispensing control unit for in-line coupling, said dispensing control unit including:
        a housing having an inlet port, an outlet port, and a conduction port extending therebetween for selectively passing the liquid material received from the line therethrough, the housing including a control port offset from said inlet and outlet ports, said control port being configured to direct a flow path of at least a portion of a pressurized fluid stream received thereby; and,
        a response valve portion disposed in said housing, said response valve portion being reconfigurable between first and second states responsive to the pressurized fluid stream directed thereto by said control port, said response valve portion in said first state sealing said conduction port against passage of the liquid material, and in said second state opening said conduction port for passage of the liquid material therethrough;
        said response valve portion being resiliently biased to said first state, whereby flow of the liquid material in the line is interrupted in the absence of suitable fluid pressure actuation therefore;
    wherein said response valve portion includes a deflectable member disposed in said conduction port, said deflectable member having a pair of distension flap structures, said distension flap structures extending in a forward direction in said first state to be conjoined in sealed manner along a separable seam and in said second state distended to separate one from the other along at least a portion of said separable seam for the flow of liquid material in a reverse direction therebetween.

2. The valve apparatus as recited in claim 1, wherein said response valve portion defines within the housing a fluid guide chamber for guiding at least a portion of the pressurized fluid stream to impinge transversely upon and deflect a predefined portion of said deflectable member to actuate responsive distension of at least one said distension flap structure.

3. The valve apparatus as recited in claim 2, wherein said response valve portion further includes a guard member extending about an outer wall section of said deflectable member, said guard member having at least one window formed therein to expose a portion of said outer wall section to said fluid guide chamber, whereby the pressurized fluid stream transversely impinges upon said exposed portion of said outer wall section through said window.

4. The valve apparatus as recited in claim 3, wherein said response valve portion includes a seat member defining a substantially rigid valve support disposed within said housing to extend at least partially between said distension flap structures, a first portion of said substantially rigid valve support defining at least one contact surface to be engaged in face sealed manner by at least one said distension flap structure in said first state for preserving the seal of said conduction port, a second portion of said substantially rigid valve support defining at least one stopping surface for stopping a predefined portion of at least one said deflectable member in said second state.

5. The valve apparatus as recited in claim 4, wherein said deflectable, guard, and seat members of said response valve are coaxially disposed about said conduction port within said housing.

6. The valve apparatus as recited in claim 1, wherein said housing includes an end cap coupled to a main body, said control and outlet ports being formed to extend from said end cap, said inlet port being formed to extend from said main body.

7. The valve apparatus as recited in claim 6, wherein said housing includes a pair of said end caps with said main body extending axially therebetween, said housing including a first set of said control and outlet ports extending from a first of said end caps and a second set of said control and outlet ports extending from a second of said end caps, a shared inlet port extending intermediately from said main body, whereby a T-valve configuration is defined.

8. The valve apparatus as recited in claim 7, comprising a pair of said response valves disposed in said main body in independently operable manner, a first of said response valves being operably coupled to said first control port and said shared inlet port to control a first conduction port to said first outlet port, a second of said response valves being operably coupled to said second control port and said shared inlet ports to control a second conduction port to said second outlet port.

9. The valve apparatus as recited in claim 5, wherein said housing includes an end cap coupled to a main body, said control and outlet ports being formed to extend from said end cap, said inlet port being formed to extend from said main body.

10. The valve apparatus as recited in claim 9, wherein said housing includes a pair of said end caps with said main body extending axially therebetween, said housing including a first set of said control and outlet ports extending from a first of said end caps and a second set of said control and outlet ports extending from a second of said end caps, a shared inlet port extending intermediately from said main body, whereby a T-valve configuration is defined.

11. The valve apparatus as recited in claim 10, comprising a pair of said response valves disposed in said main body in independently operable manner, a first of said response valves being operably coupled to said first control port and said shared inlet ports to control a first conduction port to said first outlet port, a second of said response valves being operably coupled to said second control port and said shared inlet port to control a second conduction port to said second outlet port.

12. An in-line valve apparatus for failsafe control of liquid material passage through a line comprising:
   a housing including:
      a main body having an inlet port extending therefrom; and
      at least one end cap coupled to said main body, said end cap having an outlet port and a control port extending therefrom, said control port being offset from said inlet and outlet ports, said control port being configured to direct a flow path of at least a portion of a pressurized fluid stream received thereby;
      wherein a conduction port is defined in said housing to extend between said inlet and outlet ports for selective passage of the liquid material received from the line therethrough, and,
   at least one response valve portion disposed in said housing, said response valve portion being operable to alternatively seal and unseal said conduction path opening responsive to the pressurized fluid stream selectively directed by said control port thereto, said response valve portion including a deflectable member having a pair of distension flap structures cooperatively forming a separable seam, said distension flap structures in a first state being continuously engaged one with the other along said separable seam and in a second state being separated one from the other along at least a portion of said separable seam for passage of the liquid material therethrough, said distension flap structures being biased to said first state and reconfigured to said second state responsive to the pressurized flow stream applied externally thereon;
   whereby flow of the liquid material in the line is interrupted in the absence of suitable fluid pressure actuation therefor.

13. The in-line valve apparatus as recited in claim 12, wherein said response valve portion defines within the housing a fluid guide chamber for guiding at least a portion of the pressurized fluid stream to impinge transversely upon and deflect a predefined portion of said deflectable member to actuate responsive distension of at least one said distension flap structure.

14. The in-line valve apparatus as recited in claim 13, wherein said response valve portion further includes a guard member extending about an outer wall section of said deflectable member, said guard member having at least one window formed therein to expose a portion of said outer wall section to said fluid guide chamber, whereby the pressurized fluid stream transversely impinges upon said exposed portion of said outer wall section through said window.

15. The in-line valve apparatus as recited in claim 14, wherein said response valve portion includes a seat member defining a substantially rigid valve support disposed within said housing to extend at least partially between said distension flap structures, a first portion of said substantially rigid valve support defining at least one contact surface to be engaged in face sealed manner by at least one said distension flap structure in said first state for preserving the seal of said conduction port, a second portion of said substantially rigid valve support defining at least one stopping surface for stopping a predefined portion of at least one said deflectable member in said second state.

16. The in-line valve apparatus as recited in claim 15, wherein said deflectable, guard, and seat members of said response valve are coaxially disposed about said conduction port within said housing.

17. The in-line valve apparatus as recited in claim 16, wherein said housing includes a pair of said end caps with said main body extending axially therebetween, said housing including a first set of said control and outlet ports extending from a first of said end caps and a second set of said control and outlet ports extending from a second of said end caps, a shared inlet port extending intermediately from said main body, said first and second control ports and said shared inlet port being coupled respectively to a pair of said response valves disposed in independently operable manner within said main body, whereby a T-valve configuration is defined.

18. The in-line valve apparatus as recited in claim 12, wherein said housing includes a pair of said end caps with said main body extending axially therebetween, said housing including a first set of said control and outlet ports extending from a first of said end caps and a second set of said control and outlet ports extending from a second of said end caps, a shared outlet port extending intermediately from said main body, whereby a T-valve configuration is defined.

19. The in-line valve apparatus as recited in claim 18, comprising a pair of said response valves disposed in said main body in independently operable manner, a first of said response valves being operably coupled to said first control port and said shared inlet ports to control a first conduction port to said first outlet port, a second of said response valves being operably coupled to said second control port and said shared inlet port to control a second conduction port to said second outlet port.

\* \* \* \* \*